US012527395B2

(12) United States Patent
Ferguson et al.

(10) Patent No.: US 12,527,395 B2
(45) Date of Patent: *Jan. 20, 2026

(54) DYNAMIC MORPHING SUPPORT MECHANISM, AND A DEPLOYABLE AND STOWABLE STRUCTURE THAT INCORPORATES THE MECHANISM

(71) Applicant: Gulfstream Aerospace Corporation, Savannah, GA (US)

(72) Inventors: Johnny Ferguson, Savannah, GA (US); Andrew Gillen, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 277 days.

This patent is subject to a terminal disclaimer.

(21) Appl. No.: 18/329,363

(22) Filed: Jun. 5, 2023

(65) Prior Publication Data

US 2024/0398107 A1    Dec. 5, 2024

(51) Int. Cl.
*A47B 1/06* (2006.01)
*A47B 5/04* (2006.01)
*A47B 96/20* (2006.01)

(52) U.S. Cl.
CPC .......... *A47B 1/06* (2013.01); *A47B 5/04* (2013.01); *A47B 96/206* (2013.01)

(58) Field of Classification Search
CPC .... A47B 1/06; A47B 5/04; A47B 3/04; A47B 96/206; B64D 11/0015; B64D 11/0638
See application file for complete search history.

(56) References Cited

U.S. PATENT DOCUMENTS

| | | | | |
|---|---|---|---|---|
| 2,038,838 | A | * | 4/1936 | Greyson ............... A47B 83/045 108/68 |
| 2,778,698 | A | * | 1/1957 | Gaylord ................... A47B 1/06 248/240.1 |
| 2,869,956 | A | * | 1/1959 | Gaines ................. A47B 83/045 312/297 |
| 4,929,862 | A | * | 5/1990 | Hamilton ................ E06B 9/115 312/297 |

(Continued)

FOREIGN PATENT DOCUMENTS

WO    WO-2019007804 A1 *  1/2019

*Primary Examiner* — Daniel J Rohrhoff
(74) *Attorney, Agent, or Firm* — Ingrassia Fisher & Lorenz, LLP

(57) ABSTRACT

A morphable support mechanism for a load-bearing support structure includes a first chain assembly, a second chain assembly, and working surface subcomponents coupled to the first chain assembly. Links in the first chain assembly have inward-facing structural features, and links in the second chain assembly have inward-facing structural features. The inward-facing structural features are configured to releasably couple together in response to concerted movement of the first and second chain assemblies along a predefined deployment path, and are configured to separate and decouple from each other in response to concerted movement of the first and second chain assemblies along a predefined stowage path. The working surface subcomponents cooperate to form a deployable working surface, and the inward-facing structural features interlock to be self-supporting when deployed such that the deployable working surface is load-bearing.

22 Claims, 48 Drawing Sheets

(56) References Cited

U.S. PATENT DOCUMENTS

| | | | | |
|---|---|---|---|---|
| 7,836,832 B2* | 11/2010 | Boyd | ................ | A47B 5/00 |
| | | | | 312/297 |
| 9,668,570 B2* | 6/2017 | Mojtabavi | ................ | A47C 9/06 |
| 10,737,636 B2* | 8/2020 | Catlin | ................ | B32B 3/30 |
| 11,326,833 B2* | 5/2022 | Scalf | ................ | A47F 3/0486 |
| 2017/0181536 A1* | 6/2017 | De Saulles | ................ | A47B 31/06 |
| 2024/0398106 A1* | 12/2024 | Ferguson | ................ | A47B 1/06 |

* cited by examiner

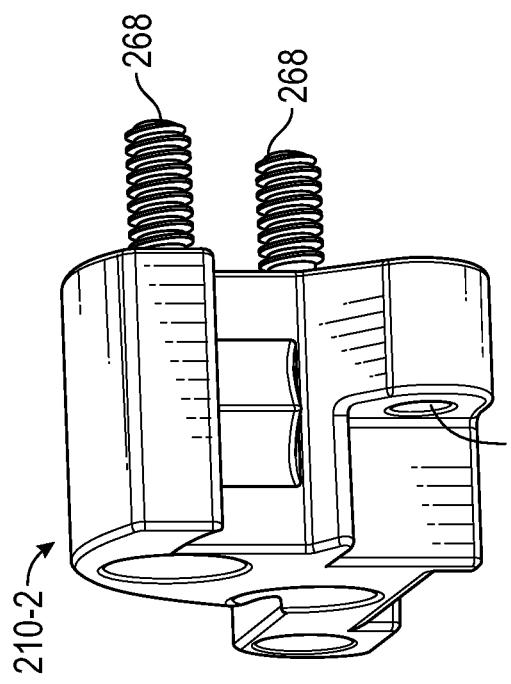
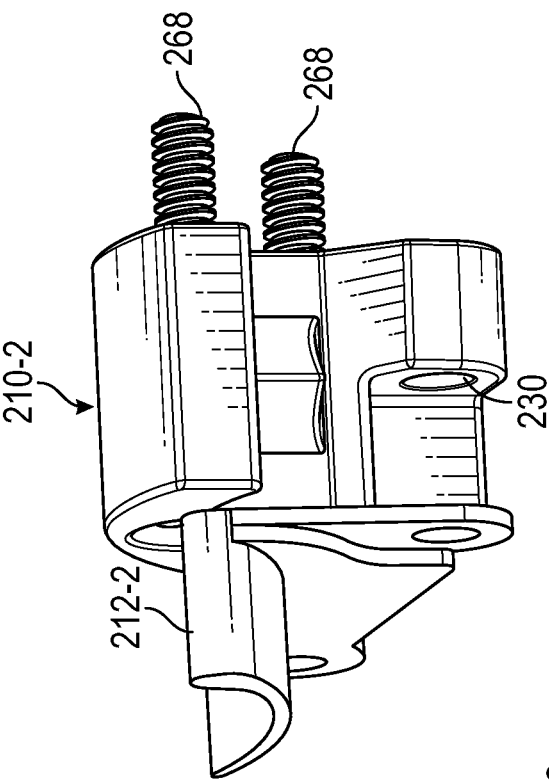
FIG. 12
FIG. 13
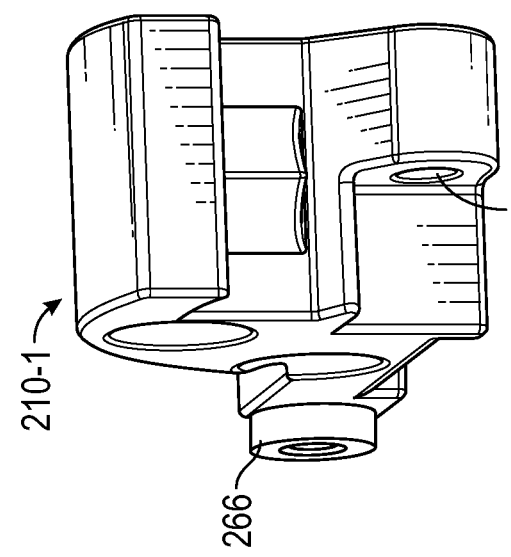
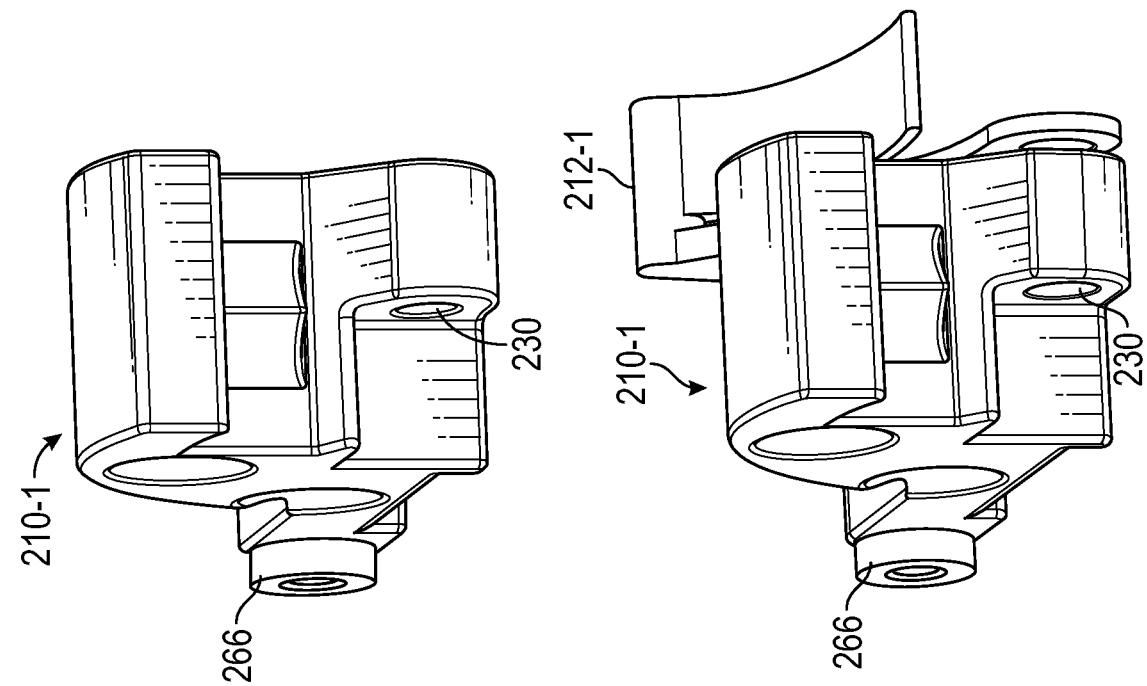

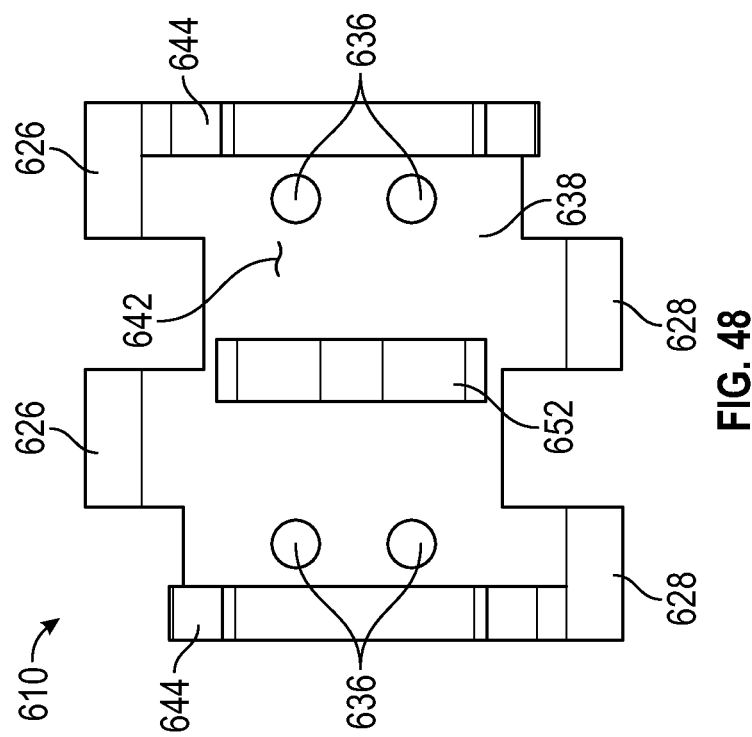
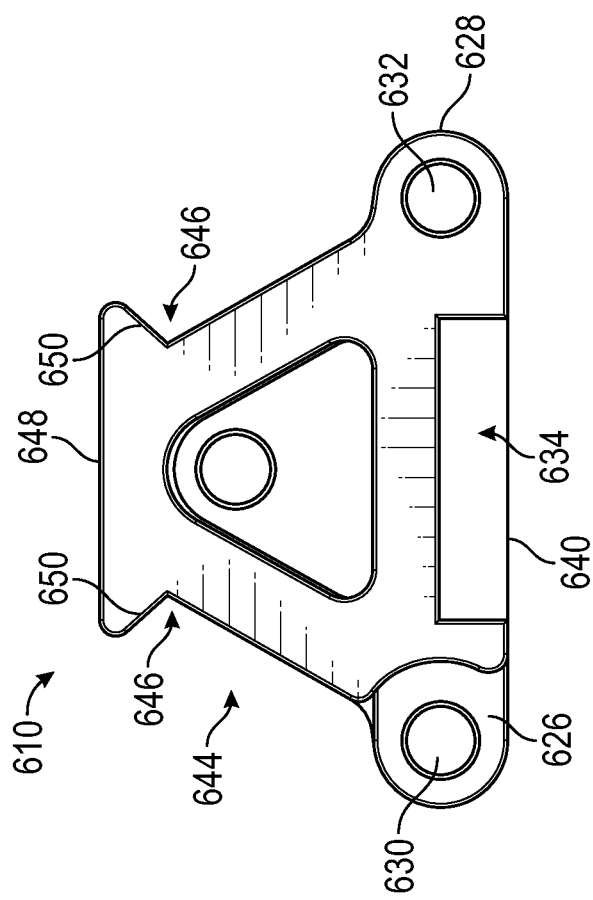

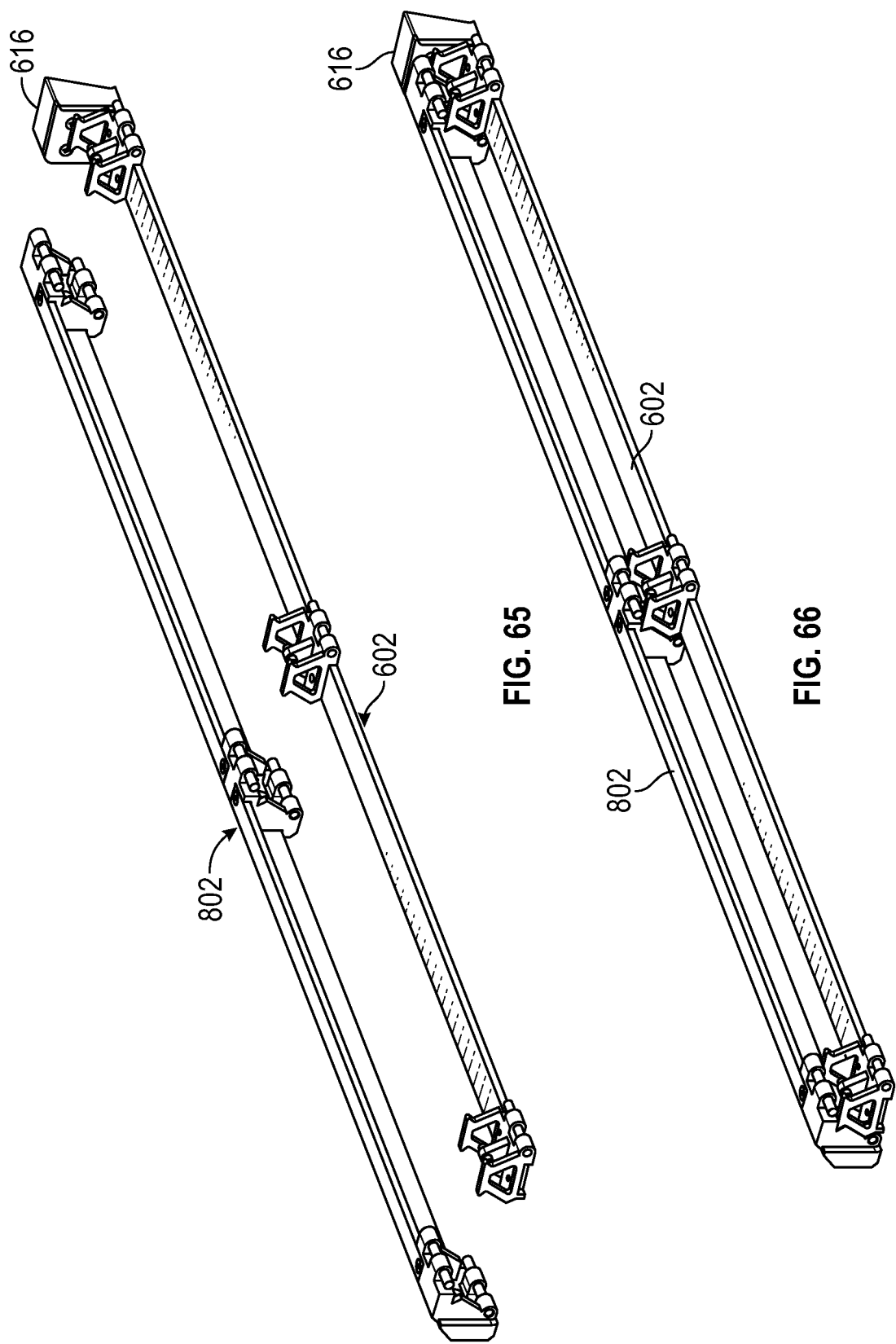

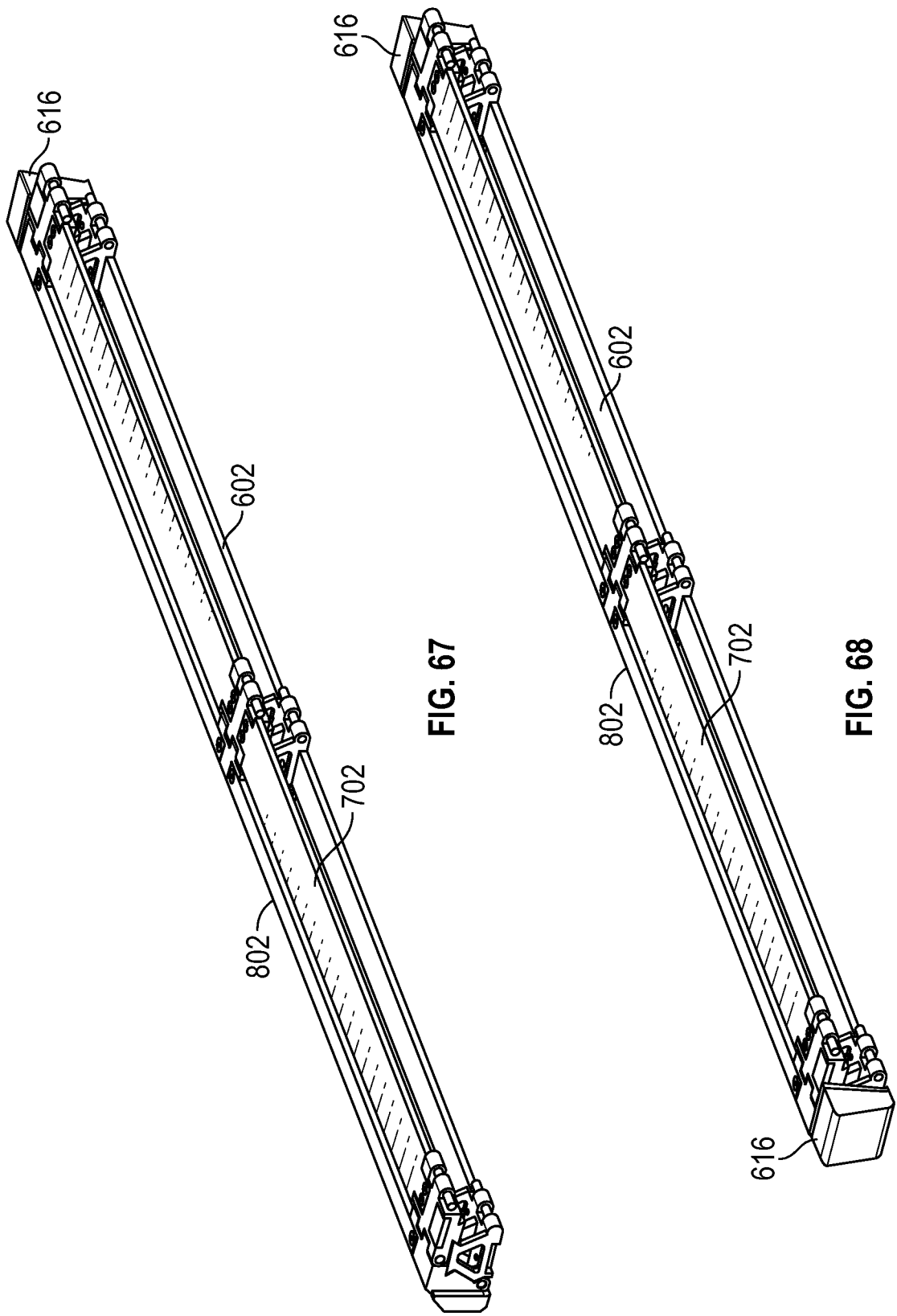

DYNAMIC MORPHING SUPPORT MECHANISM, AND A DEPLOYABLE AND STOWABLE STRUCTURE THAT INCORPORATES THE MECHANISM

TECHNICAL FIELD

Embodiments of the subject matter described herein relate generally to a deployable and stowable support structure that employs a dynamic morphing support mechanism. More particularly, embodiments of the subject matter relate to a retractable load-bearing support structure-such as a table, an armrest, a headrest, a door, or a wall—that is suitable for vehicle applications (aircraft, watercraft, automobiles, trains, spacecraft).

BACKGROUND

Deployable, retractable, and stowable components, structures, and support surfaces are often used in applications where physical space is limited. For example, vehicles such as aircraft may utilize tables, seat trays, armrests, cupholders, display devices, footrests, or doors that are deployed, extended, or otherwise removed from storage on demand. These and other types of rigid structures or support surfaces may be inconvenient or cumbersome to stow away when not in use. Moreover, conventional mechanisms that facilitate the deployment and stowage of physical components can be overly complex, noisy to operate, and/or difficult to install and maintain.

Accordingly, it is desirable to have a support mechanism or subassembly that can be used with a deployable and stowable structure, wherein the structure and its support mechanism can dynamically morph between a rigid load-bearing state and a compact, stowable, retracted state. Furthermore, other desirable features and characteristics will become apparent from the subsequent detailed description and the appended claims, taken in conjunction with the accompanying drawings and the foregoing technical field and background.

BRIEF SUMMARY

A morphable support mechanism for a load-bearing support structure is disclosed herein. Certain embodiments of the morphable support mechanism include: a first chain assembly, a second chain assembly, and a plurality of working surface subcomponents. The first chain assembly has a plurality of first chain links hinged together in series, and each of the first chain links includes first outward-facing structural features and first inward-facing structural features opposing the first outward-facing structural features. The second chain assembly has a plurality of second chain links hinged together in series, and each of the second chain links includes second inward-facing structural features. The first and second inward-facing structural features are configured to releasably couple together in response to concerted movement of the first and second chain assemblies along a predefined deployment path. The first and second inward-facing structural features are configured to separate and decouple from each other in response to concerted movement of the first and second chain assemblies along a predefined stowage path. The working surface subcomponents are respectively coupled to the plurality of first chain links, wherein a deployed number of the working surface subcomponents cooperate to form a deployable working surface. The first and second inward-facing structural features interlock to be self-supporting when deployed such that the deployable working surface is load-bearing.

Certain embodiments of the morphable support mechanism include: a first chain assembly having a plurality of first chain links hinged together in series; and a second chain assembly having a plurality of second chain links hinged together in series. Each of the first chain links includes: first outward-facing structural features; and first inward-facing structural features opposing the first outward-facing structural features. Each of the second chain links includes: second outward-facing structural features; and second inward-facing structural features opposing the second outward-facing structural features. The first and second inward-facing structural features are configured to releasably couple together in response to concerted movement of the first and second chain assemblies along a predefined deployment path. The first and second inward-facing structural features are configured to separate and decouple from each other in response to concerted movement of the first and second chain assemblies along a predefined stowage path. The first and second inward-facing structural features interlock to be self-supporting when deployed, such that a deployed arrangement of the first and second chain assemblies is load-bearing.

Also disclosed herein is a morphable load-bearing support structure. Certain embodiments of the morphable load-bearing support structure include: a plurality of upper assemblies hinged together in series; a plurality of lower assemblies hinged together in series; and a guide track arrangement configured to receive the upper and lower assemblies. Each upper assembly includes: an upper assembly leading edge section; an upper assembly leading hinge structure located at the upper assembly leading edge section; an upper assembly trailing edge section; an upper assembly trailing hinge structure located at the upper assembly trailing edge section; an outer surface that defines a portion of a deployable working surface; and upper assembly structural interlock features opposing the outer surface. The upper assembly leading hinge structure is configured to provide an upper assembly leading hinge axis of rotation, the upper assembly trailing hinge structure is configured to provide an upper assembly trailing hinge axis of rotation, and outer surfaces of a deployed number of the plurality of upper assemblies cooperate to form the deployable working surface. Each lower assembly includes: a lower assembly leading edge section; a lower assembly leading hinge structure located at the lower assembly leading edge section; a lower assembly trailing edge section; a lower assembly trailing hinge structure located at the lower assembly trailing edge section; and lower assembly structural interlock features. The lower assembly leading hinge structure is configured to provide a lower assembly leading hinge axis of rotation, and the lower assembly trailing hinge structure is configured to provide a lower assembly trailing hinge axis of rotation. The guide track arrangement accommodates sliding movement of the upper and lower assemblies. The upper assembly structural interlock features and the lower assembly structural interlock features are configured to releasably couple together in response to concerted movement of the upper and lower assemblies along a deployment path defined by the guide track arrangement. The upper and lower assemblies interlock to be self-supporting when deployed such that the deployable working surface is load-bearing. The upper assembly structural interlock features and the lower assembly structural interlock features are configured to separate and decouple from each other in response to concerted movement of the upper and lower assemblies along a stowage path defined by the guide track arrangement.

Certain embodiments of the morphable support mechanism include: a first chain assembly having a plurality of first chain links hinged together in series; a second chain assembly having a plurality of second chain links hinged together in series; and a plurality of support subcomponents respectively coupled to the plurality of first chain links. Each of the first chain links includes: a first base having an outward-facing surface and an inward-facing surface; and a first protrusion structure extending in a direction away from the inward-facing surface of the first base, the first protrusion structure having a first nonuniform side profile shape. Each of the second chain links includes: a second base having an outward-facing surface and an inward-facing surface; and a second protrusion structure extending in a direction away from the inward-facing surface of the second base, the second protrusion structure having a second nonuniform side profile shape. The first and second protrusion structures are configured to releasably couple together in response to concerted movement of the first and second chain assemblies along a predefined deployment path, and the first and second protrusion structures are configured to separate and decouple from each other in response to concerted movement of the first and second chain assemblies along a predefined stowage path. A deployed number of the support subcomponents cooperate to form a deployable support surface. The first and second protrusion structures interlock to be self-supporting when deployed such that the deployable support surface is load-bearing.

Certain embodiments of the morphable support mechanism include: a first chain assembly having a plurality of first chain links hinged together in series; and a second chain assembly comprising a plurality of second chain links hinged together in series. Each of the first chain links includes: a first base having an outward-facing surface and an inward-facing surface; and a first protrusion structure extending in a direction away from the inward-facing surface of the first base, the first protrusion structure having a first nonuniform side profile shape. Each of the second chain links includes: a second base having an outward-facing surface and an inward-facing surface; and a second protrusion structure extending in a direction away from the inward-facing surface of the second base, the second protrusion structure having a second nonuniform side profile shape. The first and second protrusion structures are configured to releasably couple together in response to concerted movement of the first and second chain assemblies along a predefined deployment path, and the first and second protrusion structures are configured to separate and decouple from each other in response to concerted movement of the first and second chain assemblies along a predefined stowage path. The first and second protrusion structures interlock to be self-supporting when deployed, such that a deployed arrangement of the first and second chain assemblies is load-bearing.

Certain embodiments of the morphable load-bearing support structure include: a plurality of upper assemblies hinged together in series; a plurality of lower assemblies hinged together in series; and a guide track arrangement configured to receive the upper and lower assemblies. Each upper assembly includes: an upper assembly leading edge section; an upper assembly leading hinge structure located at the upper assembly leading edge section; an upper assembly trailing edge section; an upper assembly trailing hinge structure located at the upper assembly trailing edge section; and an upper assembly protrusion structure. The upper assembly leading hinge structure is configured to provide an upper assembly leading hinge axis of rotation, and the upper assembly trailing hinge structure is configured to provide an upper assembly trailing hinge axis of rotation. Each lower assembly includes: a lower assembly leading edge section; a lower assembly leading hinge structure located at the lower assembly leading edge section; a lower assembly trailing edge section; a lower assembly trailing hinge structure located at the lower assembly trailing edge section; and a lower assembly protrusion structure. The lower assembly leading hinge structure is configured to provide a lower assembly leading hinge axis of rotation, and the lower assembly trailing hinge structure is configured to provide a lower assembly trailing hinge axis of rotation. The guide track arrangement accommodates sliding movement of the upper and lower assemblies. The upper assembly protrusion structures and the lower assembly protrusion structures are configured to releasably couple together in response to concerted movement of the upper and lower assemblies along a deployment path defined by the guide track arrangement, and the upper and lower assemblies interlock to be self-supporting and load-bearing when deployed. The upper assembly protrusion structures and the lower assembly protrusion structures are configured to separate and decouple from each other in response to concerted movement of the upper and lower assemblies along a stowage path defined by the guide track arrangement.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 12-15 are perspective views that depict assembly steps associated with the fabrication of the lower assembly shown in FIG. 4;

FIG. 47 is a side view of the lower link component;

FIG. 48 is a top view of the lower link component;

FIGS. 65-70 are perspective views that depict fabrication steps that involve the leading edge assembly shown in FIG. 57;

DETAILED DESCRIPTION

Figure 1:
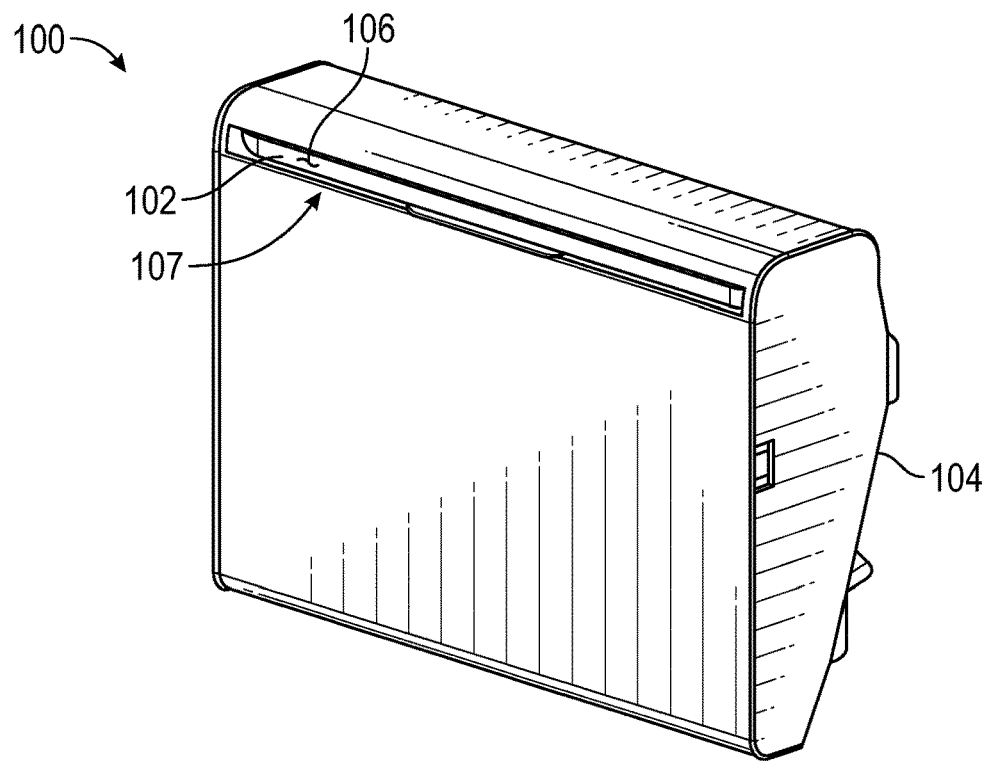
FIG. 1 is a perspective front view of a load-bearing support structure (e.g., a table) in a retracted and stowed state, according to certain embodiments of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Disclosed herein are dynamic morphing (shape-shifting) support mechanisms and related physical structures that can be deployed into a stable and load-bearing state and retracted into a compact and stowable state. In accordance with certain embodiments, the disclosed mechanisms and support structures can be utilized onboard a vehicle such as an aircraft. For example, the figures depict exemplary embodiments that are suitably configured to serve as stowable tables onboard an aircraft. However, it should be appreciated that embodiments of the disclosed subject matter can be utilized for other vehicle applications including, without limitation: trains; helicopters; automobiles; watercraft; monorails; amusement park rides; transportation systems; ski lifts; or the like. Moreover, embodiments of the disclosed subject matter can also be utilized with non-vehicle applications including, without limitation: residential applications; commercial applications; office space applications; tools; manufacturing facilities; recreational equipment; etc. These and other applications, use cases, and platforms are contemplated by this disclosure. For example, in addition to load-bearing surfaces, the support mechanisms and systems described below may be used in a vertical or curved arrangement, such as an application for mounting a display monitor.

Figure 2:
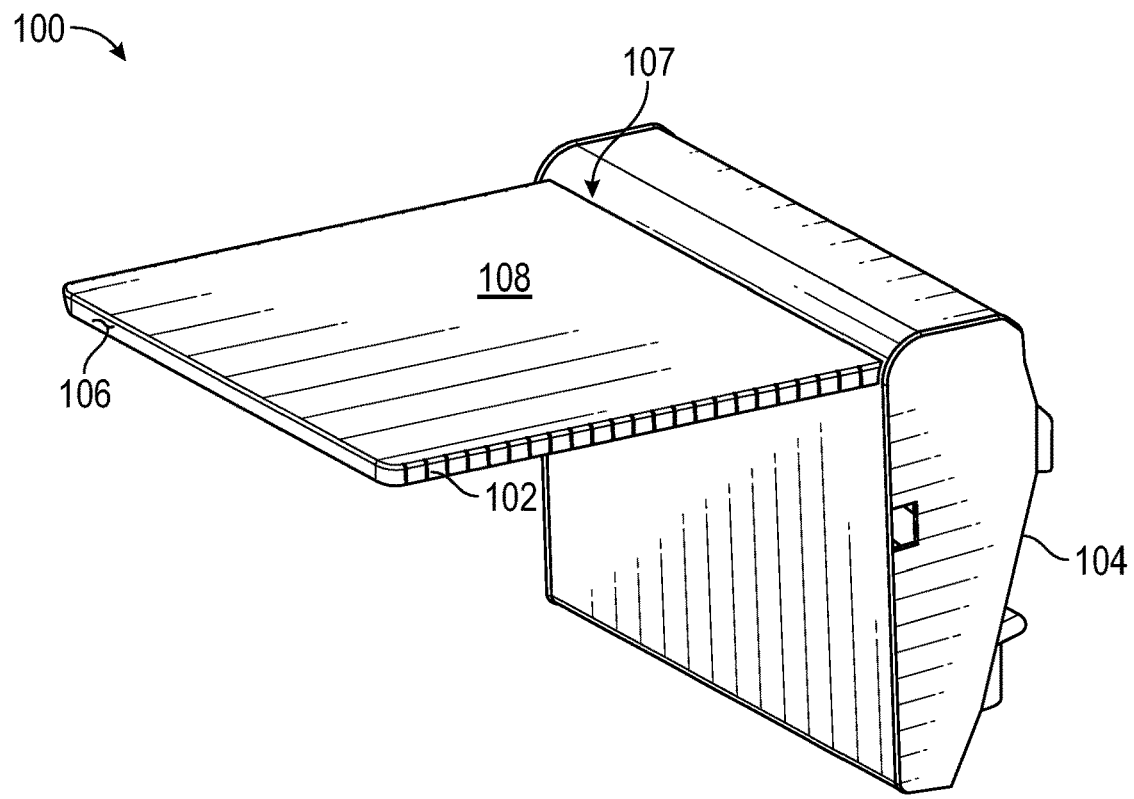
FIG. 2 is a perspective front view of the load-bearing support structure in an extended and deployed state.

Referring to the drawings, FIG. 1 is a perspective front view of a load-bearing support structure 100 in a retracted and stowed state, and FIG. 2 is a perspective front view of the load-bearing support structure 100 in an extended and deployed state. The illustrated embodiment of the support structure 100 is realized as a stowable table, which is suitable for aircraft cabin applications. Other platforms, use cases, and configurations for the support structure 100 are also contemplated by this disclosure, and the exemplary table implementation shown in the figures is not intended to be limiting, exhaustive, or restrictive in any way.

The support structure 100 includes a morphable support mechanism 102 that can be moved between a retracted and stowed state (depicted in FIG. 1) and an extended and deployed state (depicted in FIG. 2). When fully retracted and positioned in the stowed state, the entirety of the support mechanism 102 (or a substantial portion of it) resides within a suitably shaped, sized, and configured storage unit 104 that has an interior storage space defined therein. As shown in FIG. 1, a front section 106 or surface of the support mechanism 102 may be exposed or protruding from the storage unit 104 when the support mechanism 102 is in the stowed state. The exposed or protruding front section 106 may be utilized to facilitate removal and deployment of the support mechanism 102 from the storage unit 104 on demand.

The illustrated embodiment utilizes a support mechanism 102 that is designed and configured to accommodate movement along a predefined deployment path to transition it from the stowed state to the deployed state. In this regard, the support mechanism 102 can be deployed (extended from an opening 107 defined in the storage unit 104) to create a load-bearing deployable working surface 108. For this particular example, the deployed portion of the working surface 108 is flat and load-bearing on both of its major surfaces (e.g., the top surface and the bottom surface). The support mechanism 102 is also designed and configured to accommodate movement along a predefined stowage path to transition it from the deployed state to the stowed state. Although not always required, the stowage path for the support mechanism 102 corresponds to the deployment path for the support mechanism 102, wherein the deployment and stowage paths are opposite paths.

Figure 3:
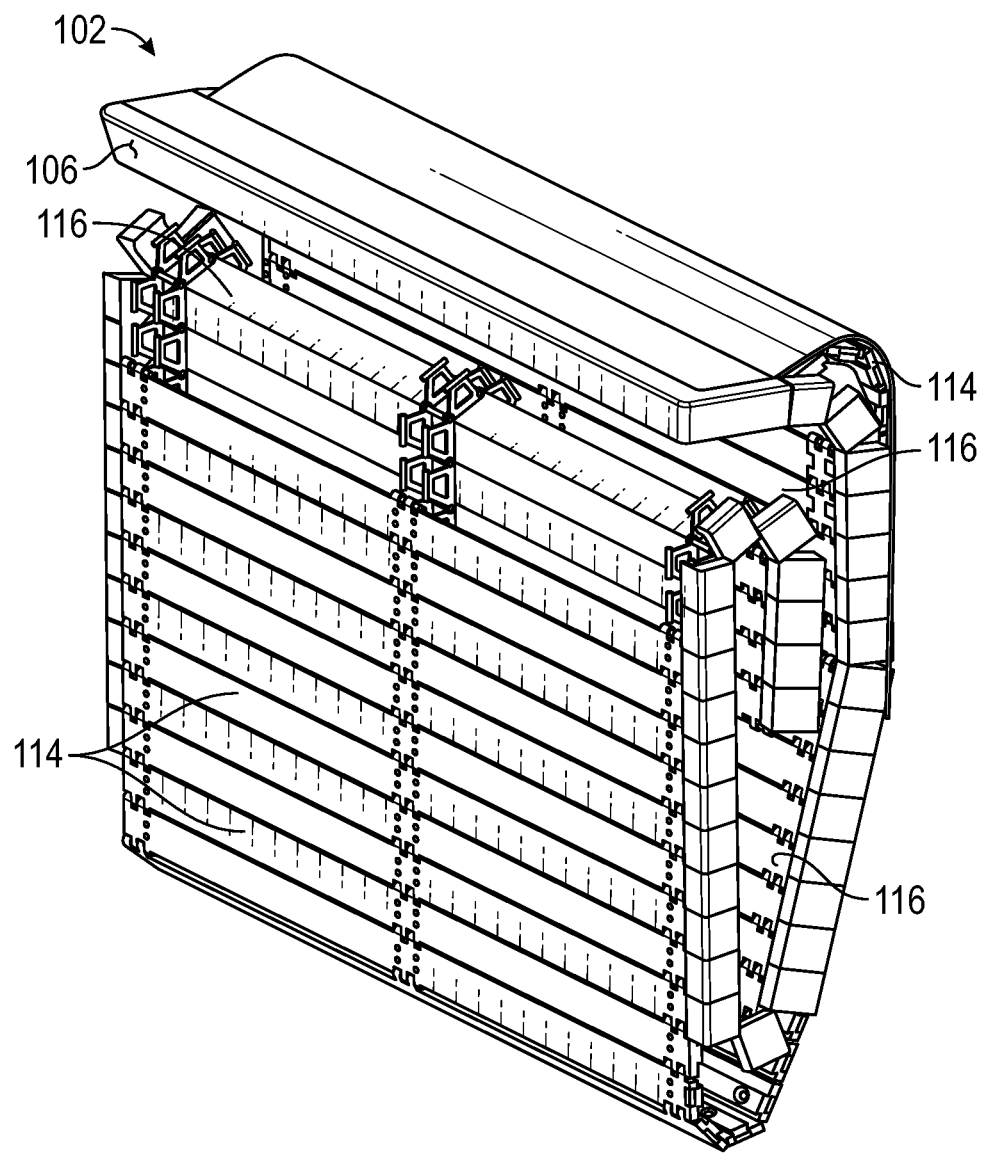
FIG. 3 is a perspective front view of an exemplary embodiment of a morphable support mechanism suitable for use with the load-bearing support structure, wherein the support mechanism is shown in a retracted and stowed state.

In accordance with certain embodiments, the interior space of the storage unit 104 is shaped and sized to accommodate folded storage of at least a portion of the support mechanism 102. In this context, FIG. 3 is a perspective front view of an exemplary embodiment the support mechanism 102, which is suitable for use with the support structure 100. In FIG. 3, the support mechanism 102 is shown in its retracted and stowed state, wherein at least a portion of the support mechanism 102 is folded to conserve space within the storage unit 104 (not shown in FIG. 3). As described in more detail below, various embodiments of the support mechanism 102 are implemented with a plurality of hinged upper assemblies 114 and a plurality of hinged lower assemblies 116 that mate and interlock with each other when deployed to form a self-supporting load-bearing component. When retracted for storage, however, the hinged upper and lower assemblies 114, 116 decouple from each other and become independently moveable relative to one another (see FIG. 3, which depicts an exemplary folded or wrapped arrangement of the support mechanism 102). Folded storage of the support mechanism 102 is desirable for applications where storage space is limited or restricted. The illustrated example of the storage unit 104 is appropriate for a console or short dividing wall application onboard a vehicle such as an aircraft, a piece of furniture, or the like. Other shapes, sizes, form factors, and configurations may also be used.

First Embodiment

Figure 4:
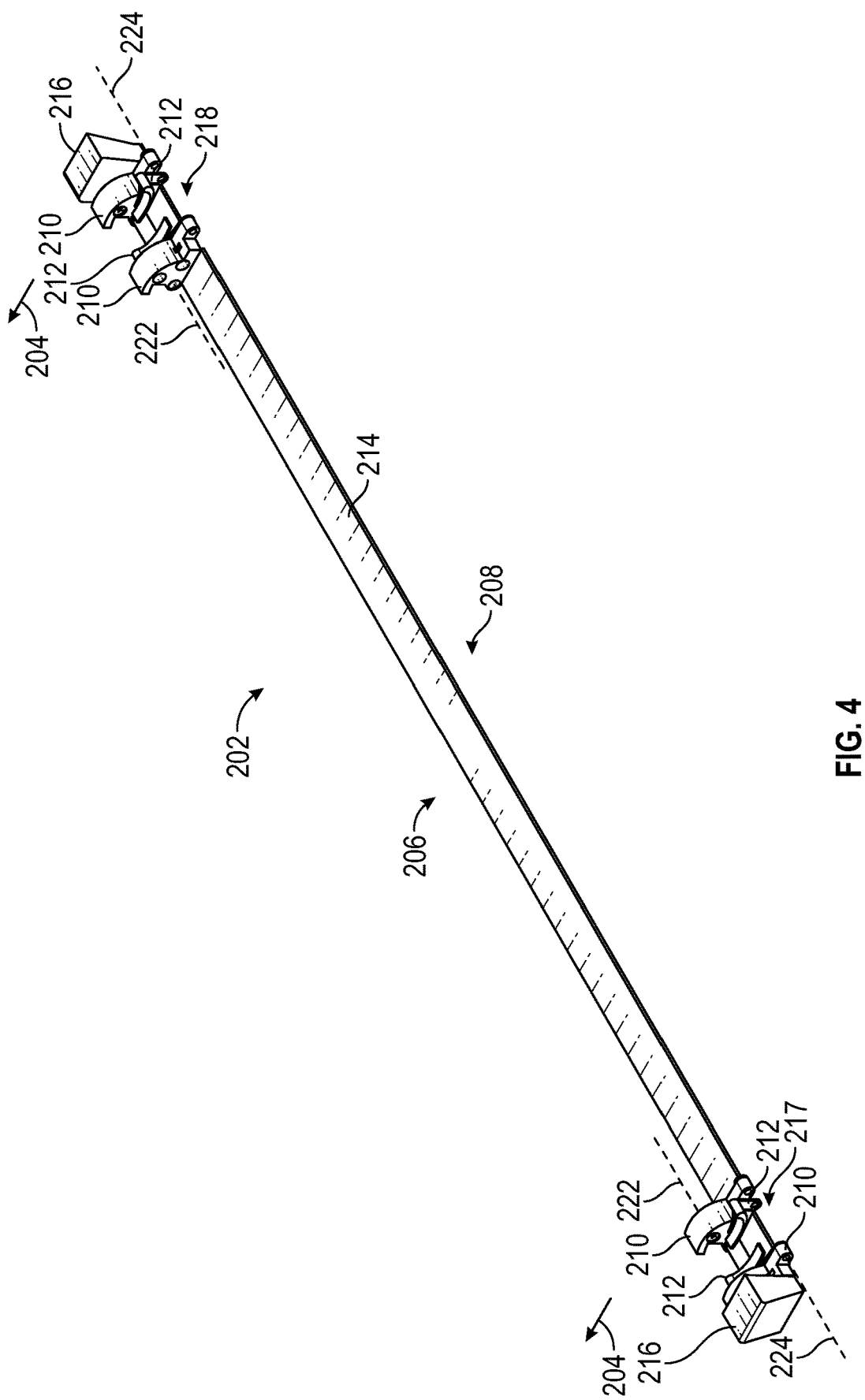
FIG. 4 is a perspective rear view of a lower assembly suitable for use with a first embodiment of the invention as disclosed herein.

FIGS. 4-43 depict various structures and features related to embodiments of a load-bearing support structure that employs at least one morphable support mechanism having structural features that resemble hooks or fingers, wherein the hooks interlock with each other when the support structure is deployed. FIG. 4 is a perspective top rear view of a lower assembly 202 suitable for use with the disclosed embodiment, and FIGS. 5-15 depict various components and subassemblies of the lower assembly 202. As explained in more detail below, embodiments of a load-bearing support structure utilize a plurality of these lower assemblies 202 hinged together in series to form a portion of the morphable support mechanism.

In FIG. 4, the directional arrows 204 point in the forward direction, which also corresponds to a deployment direction for the lower assembly 202. The opposite direction of the directional arrows 204 corresponds to a backward or stowage direction for the lower assembly 202. Accordingly, this description refers to a lower assembly leading edge section 206 (generally spanning the width of the lower assembly 202) and a lower assembly trailing edge section 208 (also generally spanning the width of the lower assembly 202), where "leading" and "trailing" are consistent with the forward/deployment direction indicated by the directional arrows 204. The depicted embodiment of the lower assembly 202 includes, without limitation: link components 210; spring assemblies 212; a lower support slat 214; and endcaps 216. These main components of the lower assembly 202 are coupled together using appropriate hardware, subcomponents, and/or material.

For this particular embodiment, the link components 210 are identical, and a pair of link components 210 are arranged to define one chain link. For example, two of the link components 210 cooperate to form a lower right chain link 217, and two of the link components 210 cooperate to form a lower left chain link 218 (where "left" and "right" refer to the respective sides when the lower assembly 202 is viewed from the front, e.g., directly at the leading edge section 206). Although FIG. 4 depicts an arrangement that includes two lower chain links, alternative embodiments of a lower assembly may include only one lower chain link or more than two lower chain links, as appropriate for the particular use case, the intended application of the load-bearing support structure, the shape and size of the deployable support surface, and various strength, durability, and load capacity requirements.

As shown and described in more detail below, the link components 210 are suitably configured and arranged to form a lower assembly leading hinge structure and a lower assembly trailing hinge structure. The leading hinge structure is located at or near the leading edge section 206, and the trailing hinge structure is located at or near the trailing edge section 208. The leading hinge structure of the lower assembly 202 is configured to provide a leading hinge axis of rotation 222, and the trailing hinge structure of the lower assembly 202 is configured to provide a trailing hinge axis of rotation 224. When a plurality of lower assemblies 202 are hinged together in series, the hinge structures allow adjacent lower assemblies 202 to rotate relative to each other on the leading and trailing hinge axes of rotation 222, 224. This hinged arrangement facilitates compact (folded or curved) storage of the lower assembly 202 if so desired.

Figure 5:
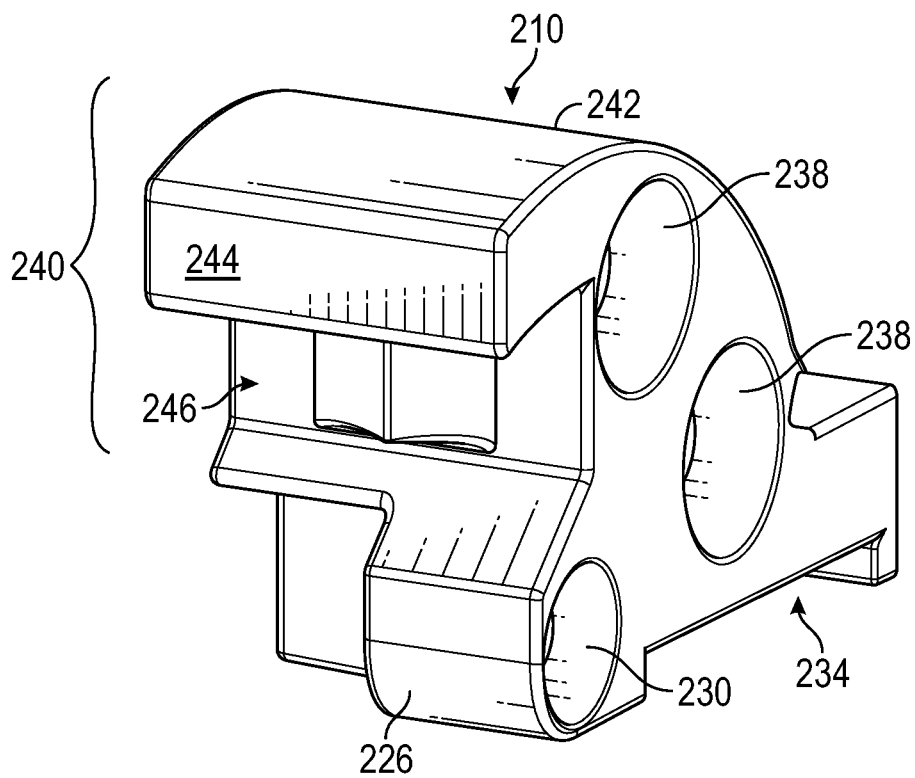
FIGS. 5 and 6 are perspective front views of an exemplary embodiment of a lower link component suitable for use with the lower assembly shown in FIG. 4.
Figure 6:
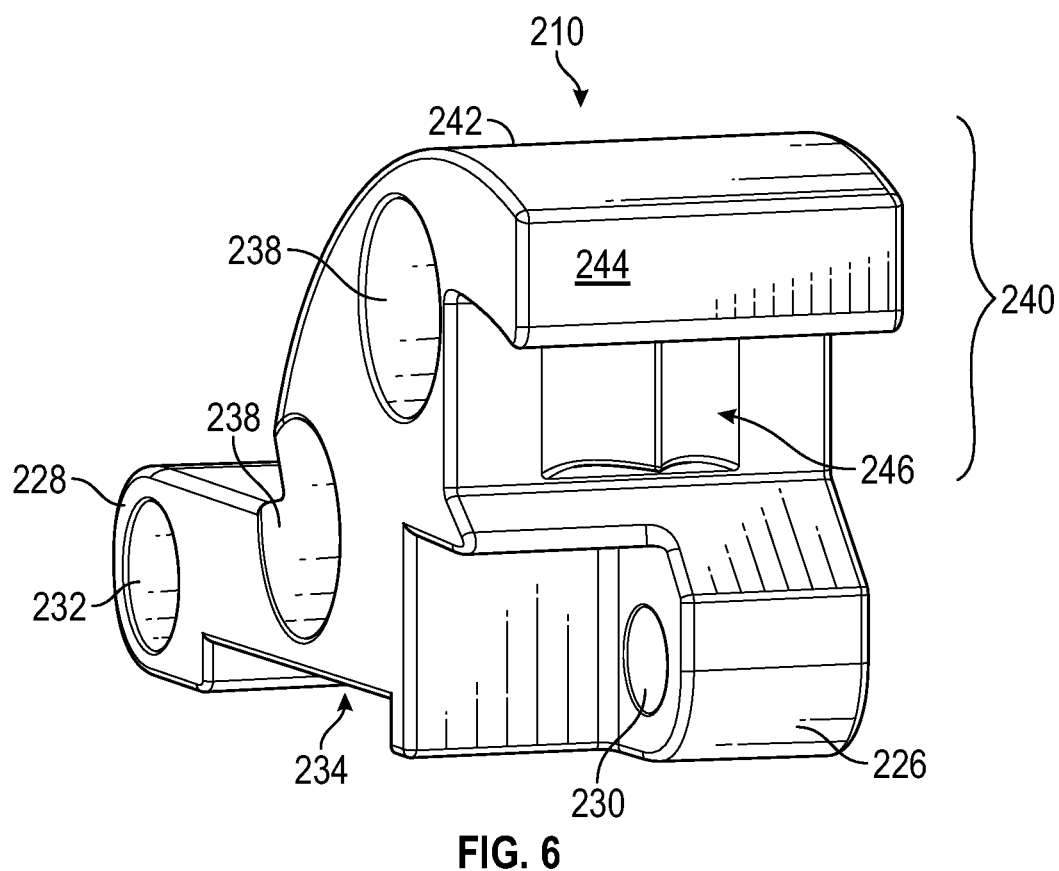
Figure 7:
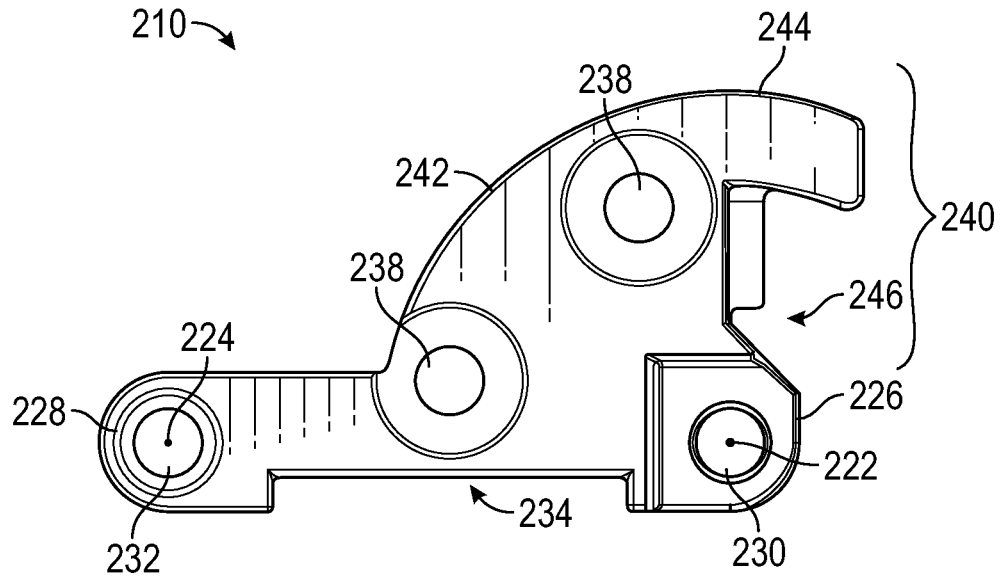
FIG. 7 is a side view of the lower link component.
Figure 8:
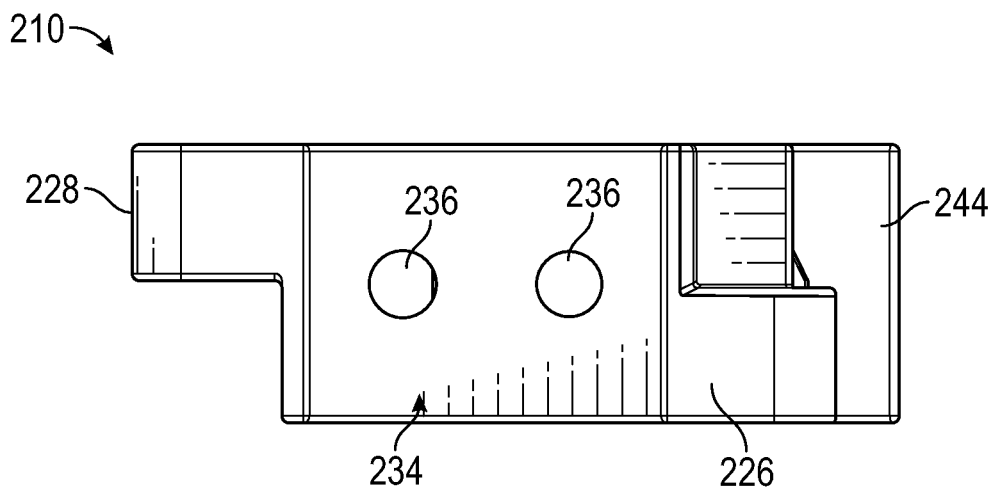
FIG. 8 is a bottom view of the lower link component.

FIGS. 5-8 depict different views of one link component 210 (for the lower assembly 202). FIG. 5 is a front right view, FIG. 6 is a front left view, FIG. 7 is a left side view, and FIG. 8 is a bottom view. The link component 210 may be fabricated from any suitable material having the desired strength and toughness, e.g., aluminum, nylon, a composite material, plastic, or the like.

The figures show the structural features that form the lower assembly leading hinge structure 226 and the lower assembly trailing hinge structure 228 of the lower assembly 202. The leading and trailing hinge structures 226, 228 occupy about half of the lowermost width of the link component 210. This configuration accommodates linking/hinging multiple link components 210 together in series. The leading hinge structure 226 includes a hole 230 formed therein to accommodate a hinge pin, a rod, a bolt, or any suitably configured fastener or coupling element. Similarly, the trailing hinge structure 228 includes a hole 232 formed therein to accommodate another hinge pin, rod, bolt, fastener, coupling element, or the like. A line passing through the center of the hole 230 corresponds to the leading hinge axis of rotation 222, and a line passing through the center of the hole 232 corresponds to the trailing hinge axis of rotation 224 (see FIG. 7).

The base of the link component 210 includes a slot 234 formed therein. The slot 234 is shaped, sized, and configured to receive a portion of the lower support slat 214 (see FIG. 15). The base of the link component 210 may also include any number of threaded holes or inserts 236 to receive threaded fasteners for coupling the lower support slat 214 to the link component 210. In certain embodiments, the link component 210 includes a number of through holes 238—which may be countersunk on one or both sides—to receive screws, bolts, or other fasteners for coupling the endcaps 216 to the link component 210 (see FIGS. 12-15). As shown in FIG. 4, the two outermost link components 210 have endcaps 216 attached thereto, while the other link components 210 are void of endcaps 216. For the illustrated implementation, the endcaps 216 are decorative endcaps that cooperate to provide an exposed sidewall surface for the lower assembly 202 when deployed (see FIG. 2 and FIGS. 33-35). To this end, the endcaps 216 may be fabricated from wood, imitation wood, plastic, metal, or any desired material, with or without additional decorative treatment, coating, or texture.

The link component 210 includes structural interlock features 240 for the lower assembly 202. As explained below, the structural interlock features 240 are shaped, sized, arranged, and configured to cooperate with counterpart structural interlock features of a compatible upper assembly. When deployed in an assembled load-bearing support mechanism, the structural interlock features 240 are oriented as inward-facing structural features (which oppose certain outward-facing structural features of the link component 210, e.g., the slot 234). In accordance with the illustrated embodiment, the structural interlock features 240 include, without limitation: a hook/finger structure 242 that terminates with a protrusion 244 extending in a direction that generally corresponds to the forward/deployment direction represented by the directional arrows 204 in FIG. 4. The upper surface of the hook/finger structure 242 is convex, with a side profile shape that curves upward from the base of the link component 210, crests at a point of maximum height of the link component 210, and curves downward until it terminates at the tip of the protrusion 244 (see FIG. 7). The protrusion 244 forms an overhanging shelf that defines a pocket space 246 below the shelf and above the leading hinge structure 226. An important aspect of the link component 210 is that the hook/finger structure 242 is radially centered on the forward pivot point (the hinge axis of rotation 222) of the link component 210. Moreover, the hook/finger structure 242 is narrowed slightly along its leading edge to facilitate proper alignment and engagement with a counterpart link component of an upper assembly, as described below.

Figure 9:
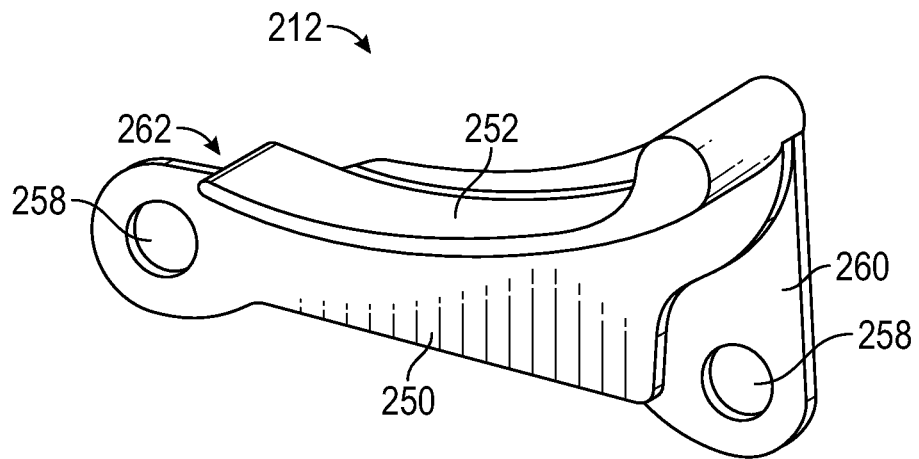
FIG. 9 is a perspective view of an exemplary embodiment of a spring assembly suitable for use with the lower assembly shown in FIG. 4.
Figure 10:
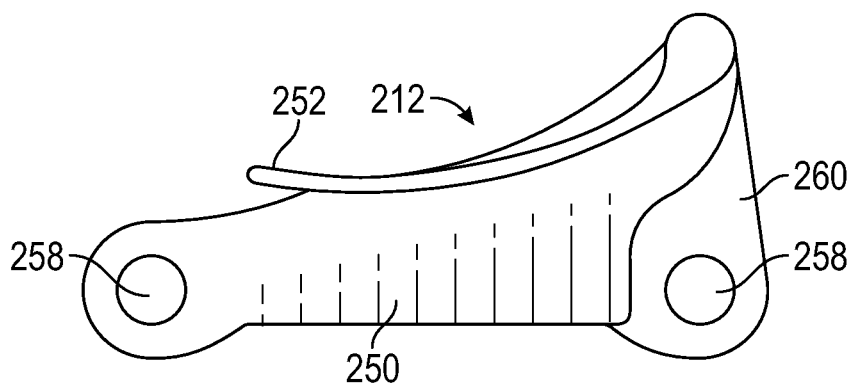
FIG. 10 is a side view of the spring assembly.
Figure 11:
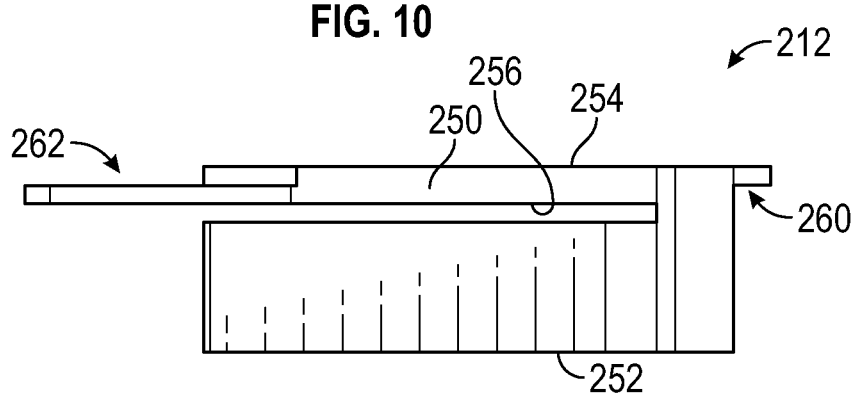
FIG. 11 is a top view of the spring assembly.
Figure 14:
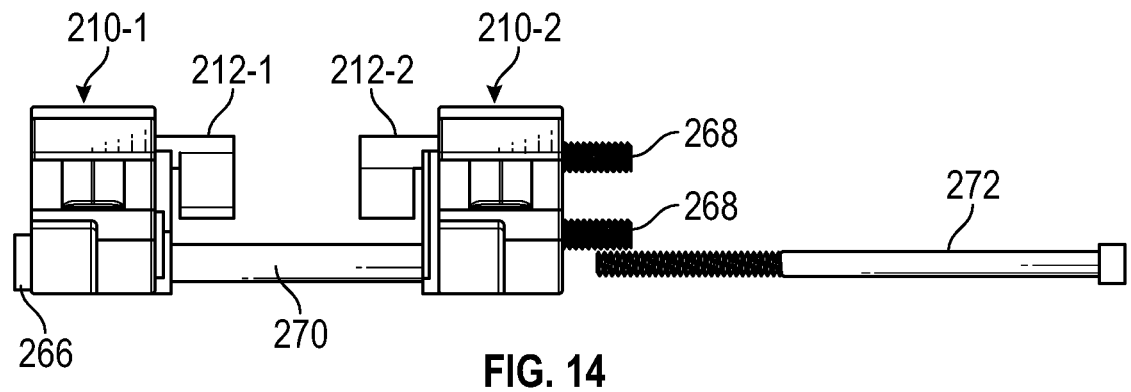
Figure 15:
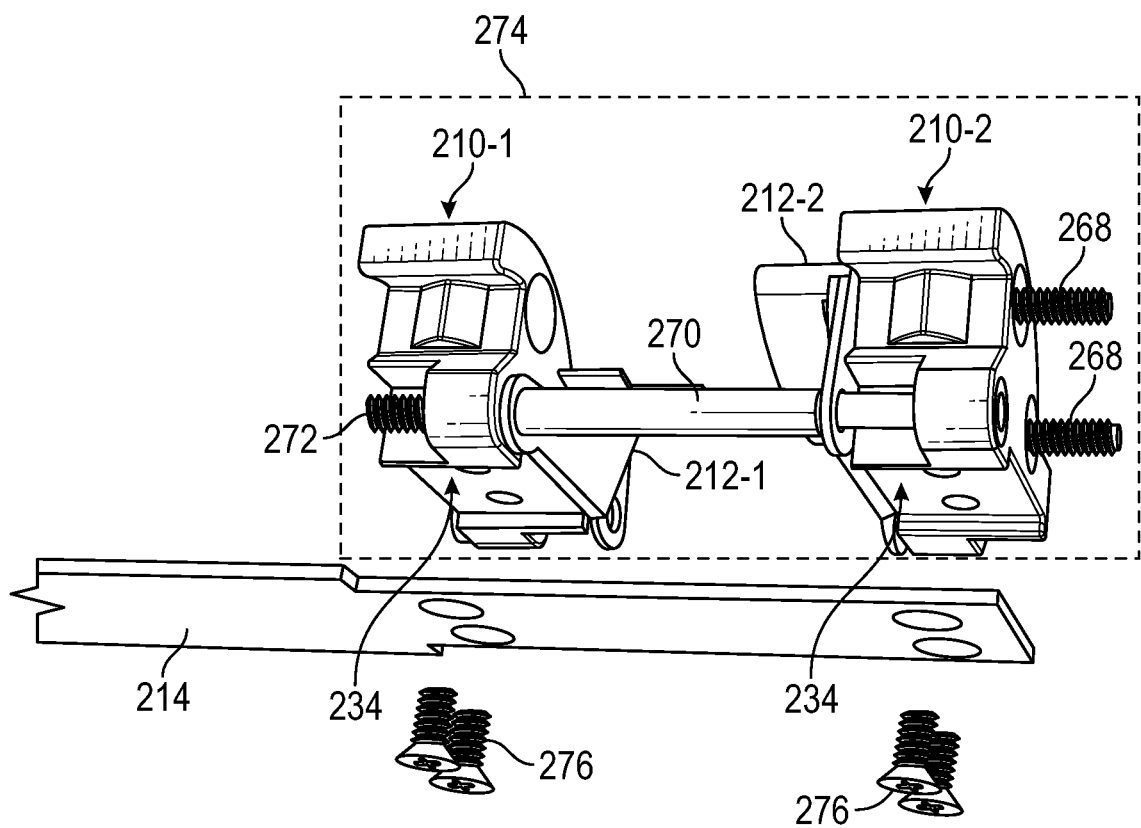

FIGS. 9-11 are different views of an exemplary embodiment of a spring assembly 212 suitable for use with the lower assembly 202. FIGS. 13-15 show spring assemblies 212 as installed with respective link components 210. As described in more detail below, the spring assemblies 212 are shaped, sized, configured, and positioned to engage at least one guide track when the lower assembly 202 is installed for use with a load-bearing support structure. In certain implementations, the spring assembly 212 is fabricated from a strong and resilient material, e.g., plastic, nylon, DELRIN, aluminum, or the like.

The depicted embodiment of the spring assembly 212 includes, without limitation, a sidewall 250 and a leaf spring 252 coupled to or integrated with the sidewall 250. The sidewall 250 is shaped and configured for coupling against an adjacent link component 210. More specifically, the outer surface 254 of the sidewall 250 faces the link component 210 when installed, and the inner surface 256 of the sidewall 250 faces another spring assembly 212 when installed (see FIGS. 13-15). The sidewall 250 includes two mounting holes 258 formed therein—the mounting holes 258 correspond to and align with the holes 230, 232 formed within the hinge structures 226, 228 of the link component 210. The sidewall 250 has a first recessed section 260 (on the inner side) and a second recessed section 262 (on the outer side). The recessed sections 260, 262 are shaped, sized, configured, and arranged to accommodate the linking/hinging of multiple spring assemblies 212 together in series.

In accordance with the illustrated embodiment, the leaf spring 252 is coupled to or integrated with an upper section of the sidewall 250. The leaf spring 252 may be realized as a thin plate-like structure having a curved side profile shape (see FIG. 10). For this particular example, the lower surface of the leaf spring 252 is convex, with a side profile shape that curves downward from the junction of the sidewall 250, reaches a point of minimum height at a point between the holes 258 (this point is closer to the second recessed section 262 than the first recessed section 260), and then curves slightly upward until it terminates at its distal edge. The shape, size, and deflection characteristics of the leaf spring 252 are designed to allow the leaf spring 252 to bend when it contacts a guide track, thus imparting an amount of force that retains the link component 210 on the guide track.

FIGS. 12-15 are perspective views that depict assembly steps associated with the fabrication of the lower assembly 202. FIG. 12 shows a first link component 210-1 after installation of an internally threaded insert 266 into the hole 232, and a second link component 210-2 after installation of threaded fasteners 268 into the holes 238. Although not depicted in FIGS. 12-15, a decorative endcap 216 is coupled to the side of the second link component 210-2 via the threaded fasteners 268. FIG. 13 shows the desired alignment and orientation of a first spring assembly 212-1 and a second spring assembly 212-2. Note that the leaf springs of the two spring assemblies 212-1, 212-2 are oriented in opposite directions. Also note that the two spring assemblies 212-1, 212-2 are arranged on the respective inner sides of the link components 210-1, 210-2, such that the two leaf springs oppose each other. FIG. 14 shows the desired alignment and positioning of a hollow roller 270 (the major longitudinal axis of the hollow roller 270 is aligned with the leading hinge axis of rotation 222 as defined by the holes 230). A bolt 272 or other type of fastener is shaped and sized for insertion through: the hole 230 of the second link component 210-2; the hole 258 of the second spring assembly 212-2; the hollow roller 270; the hole 258 of the first spring assembly 212-1; and the hole 230 of the first link component 210-1. FIG. 15 depicts an assembled lower chain link 274, which includes, without limitation, the various components surrounded by the dashed line. FIG. 15 also shows an end section of the lower support slat 214, which is shaped and sized to fit within the slots 234 of the link components 210-1, 210-2. Threaded fasteners 276 can be used to attach the lower support slat 214 to the two link components 210-1, 210-2 (refer again to FIG. 4).

Although not depicted in FIG. 15, the bolt 272 is used to couple another lower chain link 274 in series. In this regard, when two lower chain links 274 are hinged together, the bolt 272 passes through the leading hinge structures 226 of a trailing lower chain link 274 and through the trailing hinge structures 228 of a leading lower chain link 274. The threaded insert 266 of the leading lower chain link 274 receives the threaded end of the bolt 272, which is tightened to secure the two lower chain links 274 together while allowing them to rotate about the corresponding hinge axis of rotation. The bolt 272 may also be used to couple a final lower chain link 274 with a leading edge link (as described below with reference to FIG. 32).

Figure 16:
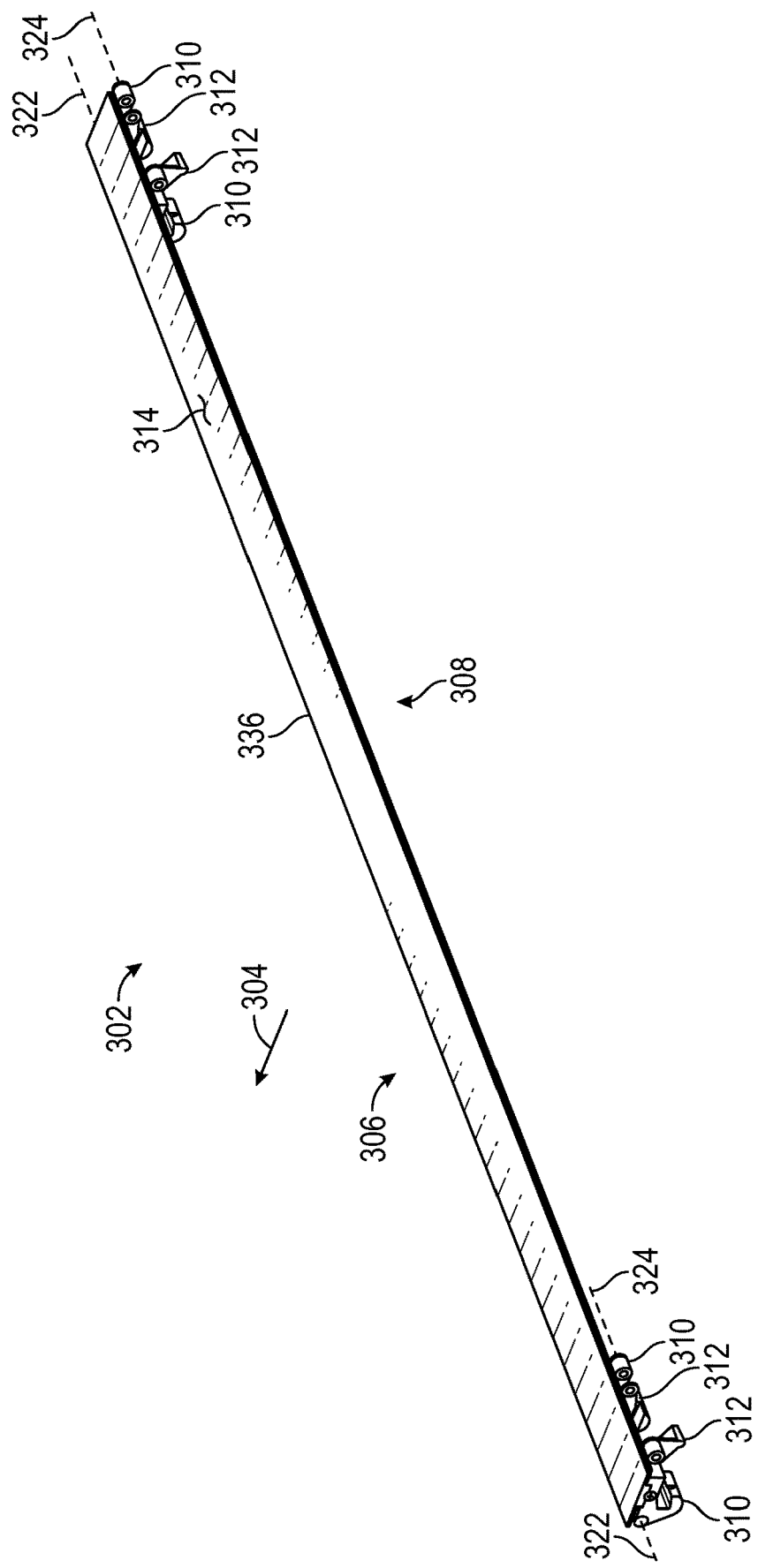
FIG. 16 is a perspective rear view of an upper assembly suitable for use with the first embodiment of the invention as disclosed herein.

FIGS. 16-24 relate to an exemplary embodiment of an upper assembly 302 suitable for use with the disclosed embodiment. FIG. 16 is a perspective top rear view of the upper assembly 302, and FIGS. 17-24 depict various components and subassemblies of the upper assembly 302. As explained in more detail below, embodiments of a load-bearing support structure utilize a plurality of these upper assemblies 302 hinged together in series to form a portion of the morphable support mechanism. Some of the structures, features, and functional characteristics of the upper assembly 302 are similar, identical, or equivalent to those described above for the lower assembly 202. For simplicity and brevity, such similar, identical, or equivalent aspects may not be redundantly described in detail here in the context of the upper assembly 302.

In FIG. 16, the directional arrow 304 points in the forward direction, which also corresponds to a deployment direction for the upper assembly 302. The opposite direction of the directional arrow 304 corresponds to a backward or stowage direction for the upper assembly 302. Accordingly, this description refers to an upper assembly leading edge section 306 and an upper assembly trailing edge section 308. The depicted embodiment of the upper assembly 302 includes, without limitation: link components 310; spring assemblies 312 (substantially hidden from view in FIG. 16); and an outer surface 314 that defines a portion of a deployable working surface. These main components of the upper assembly 302 are coupled together using appropriate hardware, subcomponents, and/or material.

For this particular embodiment, the link components 310 are identical, and a pair of link components 310 are arranged to define one chain link. Although FIG. 16 depicts an arrangement that includes two upper chain links (at the left and right sides of the upper assembly 302), alternative embodiments of an upper assembly may include only one upper chain link or more than two upper chain links, as appropriate for the particular use case, the intended application of the load-bearing support structure, the shape and size of the deployable support surface, and various strength, durability, and load capacity requirements.

As shown and described in more detail below, the link components 310 are suitably configured and arranged to form an upper assembly leading hinge structure and an upper assembly trailing hinge structure. The leading hinge structure is located at or near the leading edge section 306, and the trailing hinge structure is located at or near the trailing edge section 308. The leading hinge structure of the upper assembly 302 is configured to provide a leading hinge axis of rotation 322, and the trailing hinge structure of the upper assembly 302 is configured to provide a trailing hinge axis of rotation 324. When a plurality of upper assemblies 302 are hinged together in series, the hinge structures allow adjacent upper assemblies 302 to rotate relative to each other on the leading and trailing hinge axes of rotation 322, 324. This hinged arrangement facilitates compact (folded or curved) storage of the upper assembly 302 if so desired.

Figure 17:
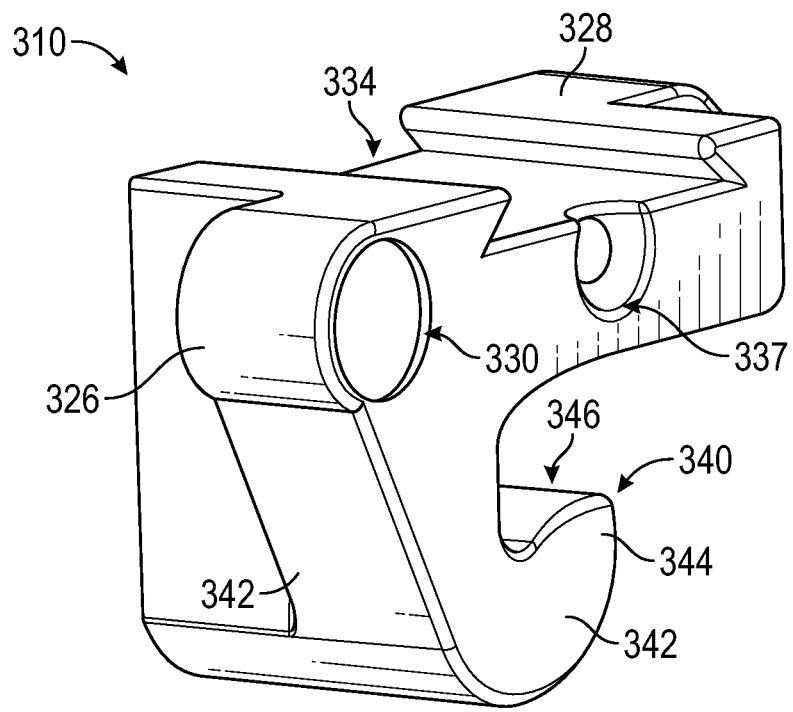
FIGS. 17 and 18 are perspective front views of an exemplary embodiment of an upper link component suitable for use with the upper assembly shown in FIG. 16.
Figure 18:
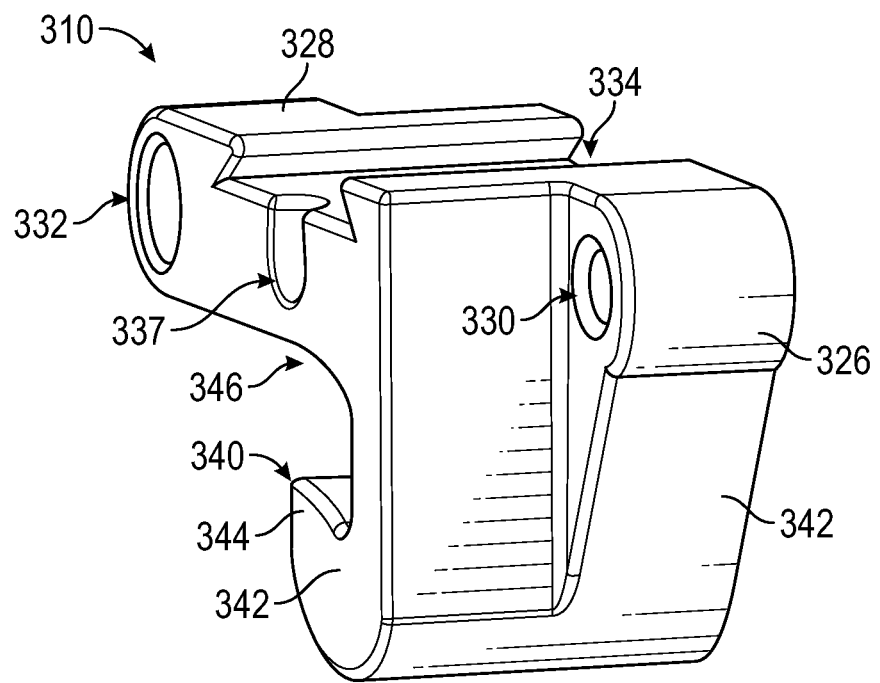
Figure 19:
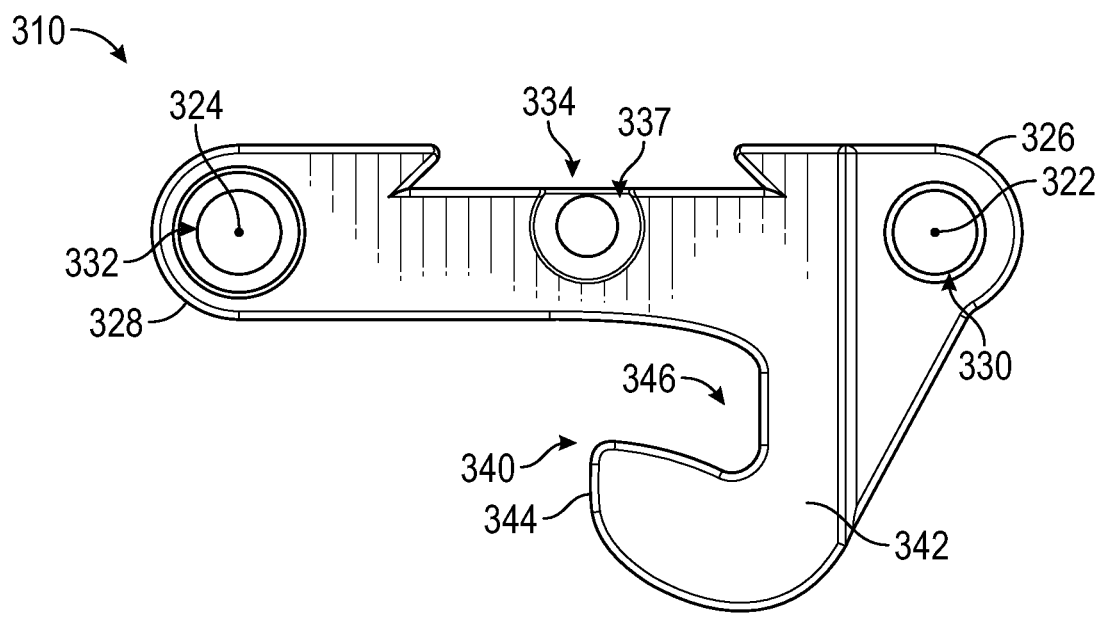
FIG. 19 is a side view of the upper link component.
Figure 20:
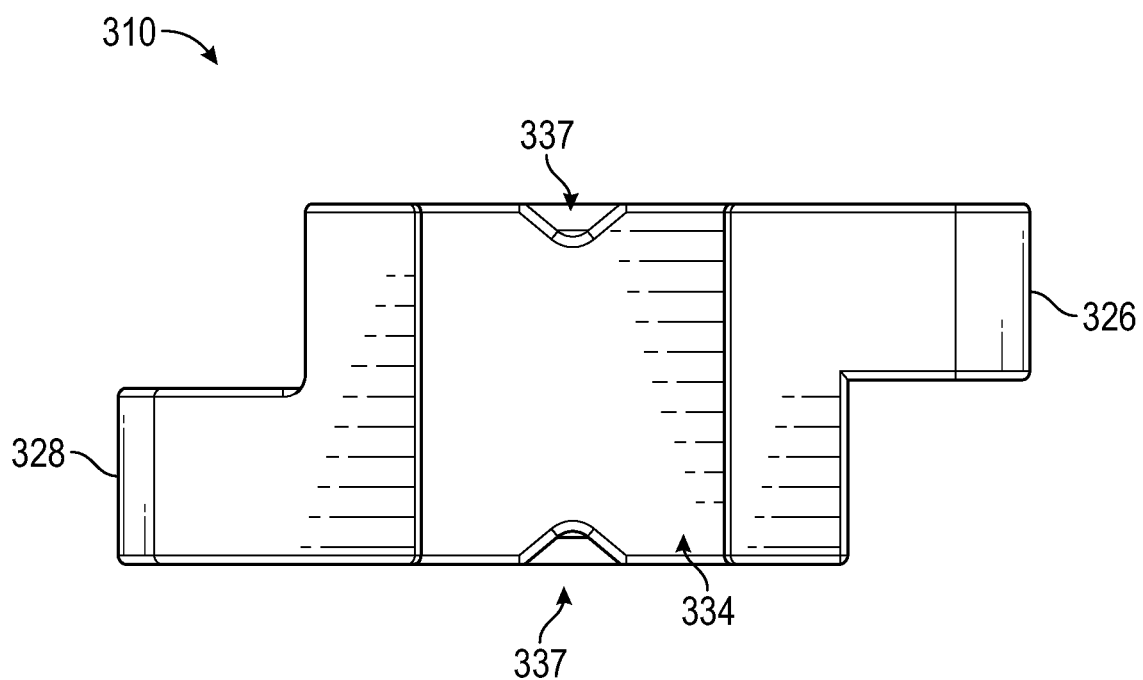
FIG. 20 is a top view of the upper link component.

FIGS. 17-20 depict different views of one link component 310 (for the upper assembly 302). FIG. 17 is a front right view, FIG. 18 is a front left view, FIG. 19 is a left side view, and FIG. 20 is a top view. The figures show the structural features that form the upper assembly leading hinge structure 326 and the upper assembly trailing hinge structure 328 of the upper assembly 302. The leading and trailing hinge structures 326, 328 occupy about half of the width of the link component 310, which accommodates the linking/hinging of multiple link components 310 together in series. The leading hinge structure 326 includes a hole 330 formed therein to accommodate a hinge pin, a rod, a bolt, or any suitably configured fastener or coupling element. Similarly, the trailing hinge structure 328 includes a hole 332 formed therein to accommodate another hinge pin, rod, bolt, fastener, coupling element, or the like. A line passing through the center of the hole 330 corresponds to the leading hinge axis of rotation 322, and a line passing through the center of the hole 332 corresponds to the trailing hinge axis of rotation 324 (see FIG. 19).

The top section of the link component 310 includes a slot 334 (which may be chamfered as shown) formed therein. The slot 334 is shaped, sized, and configured to receive a portion of a working surface subcomponent 336 that includes, carries, or defines the outer surface 314. (see FIG. 23 and FIG. 24). The top section of the link component 310 may also include at least one threaded hole or insert 337 (which may be countersunk) to receive threaded fasteners for securing the working surface subcomponent 336 to the link component 310. As shown in FIG. 16, the two outermost link components 310 receive the fasteners that are used to maintain the working surface subcomponent 336 in position after it has been installed into the slots 334. Although not utilized in the illustrated embodiment, the link component 310 can be suitably configured in a way that allows it to receive a decorative endcap (in the manner described above with reference to the endcaps 216 for the lower assembly 202).

The link component 310 includes structural interlock features 340 for the upper assembly 302. Notably, the structural interlock features 340 are shaped, sized, arranged, and configured to cooperate with the counterpart structural interlock features 240 of a link component 210 of the lower assembly 202. When deployed in an assembled load-bearing support mechanism, the structural interlock features 340 are oriented as inward-facing structural features (which oppose certain outward-facing structural features of the link component 310, e.g., the slot 334). In accordance with the illustrated embodiment, the structural interlock features 340 include, without limitation: a hook/finger structure 342 that terminates with a protrusion 344 extending in a direction that generally corresponds to the backward/stowage direction. The hook/finger structure 342 exhibits a side profile shape that begins at or near the leading hinge structure 326 with a straight angled leading edge that slopes backwards, curves back and downward until it reaches a lowermost point of the link component 310, and curves back and upward until it terminates at the tip of the protrusion 344 (see FIG. 19). The protrusion 344 forms an overhanging shelf that defines a pocket space 346 above the shelf and below the top section of the link component 310.

Figure 21:
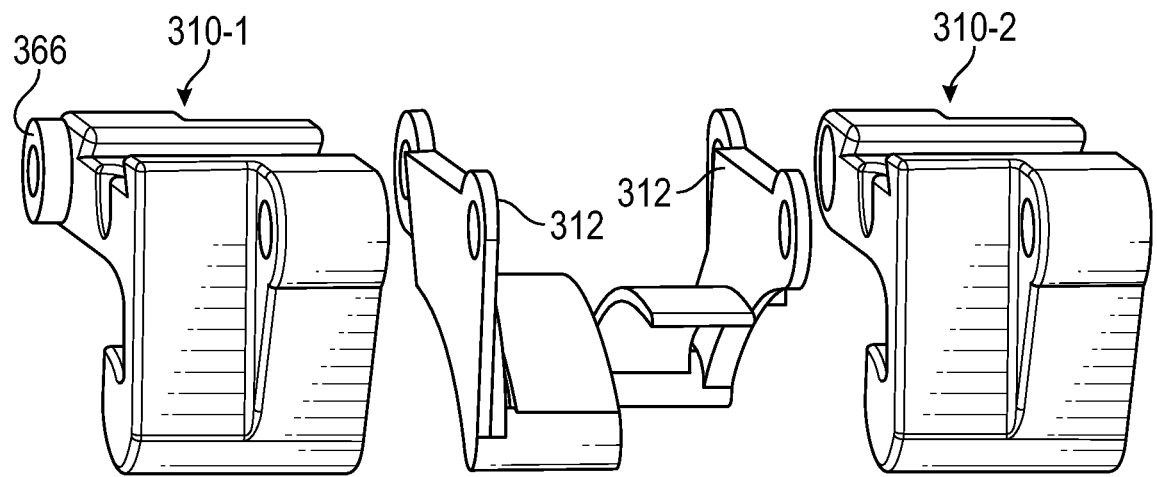
FIGS. 21-24 are perspective views that depict assembly steps associated with the fabrication of the upper assembly shown in FIG. 16.
Figure 22:
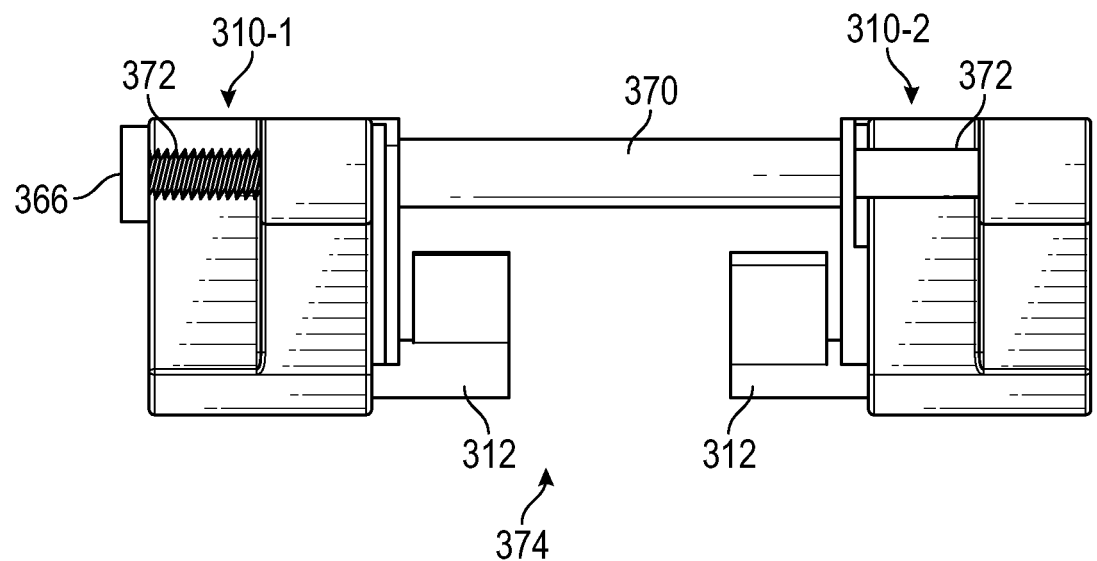
Figure 23:
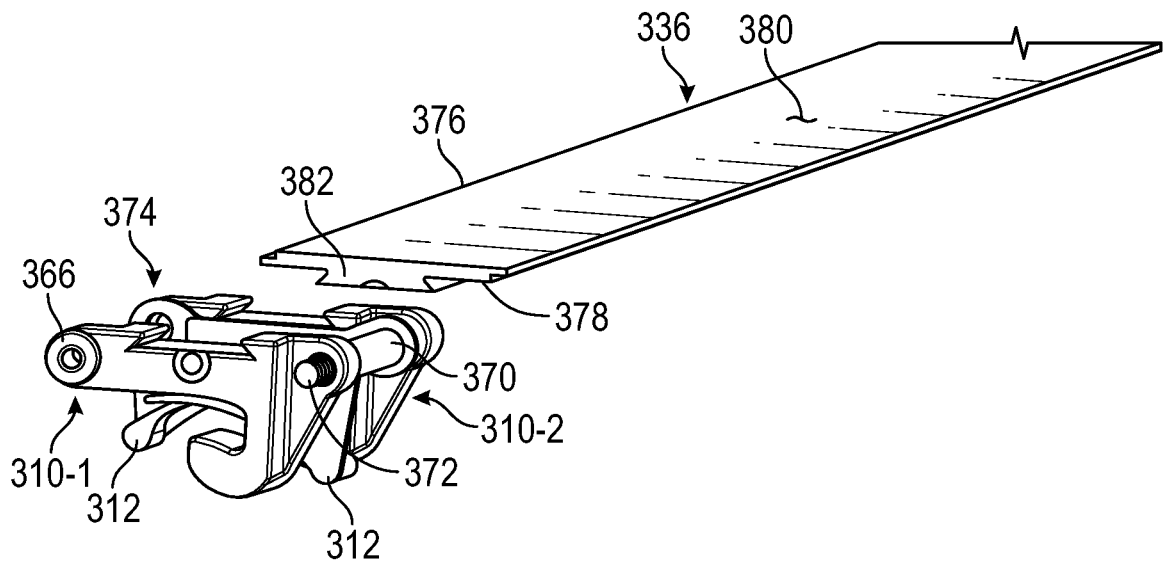
Figure 24:
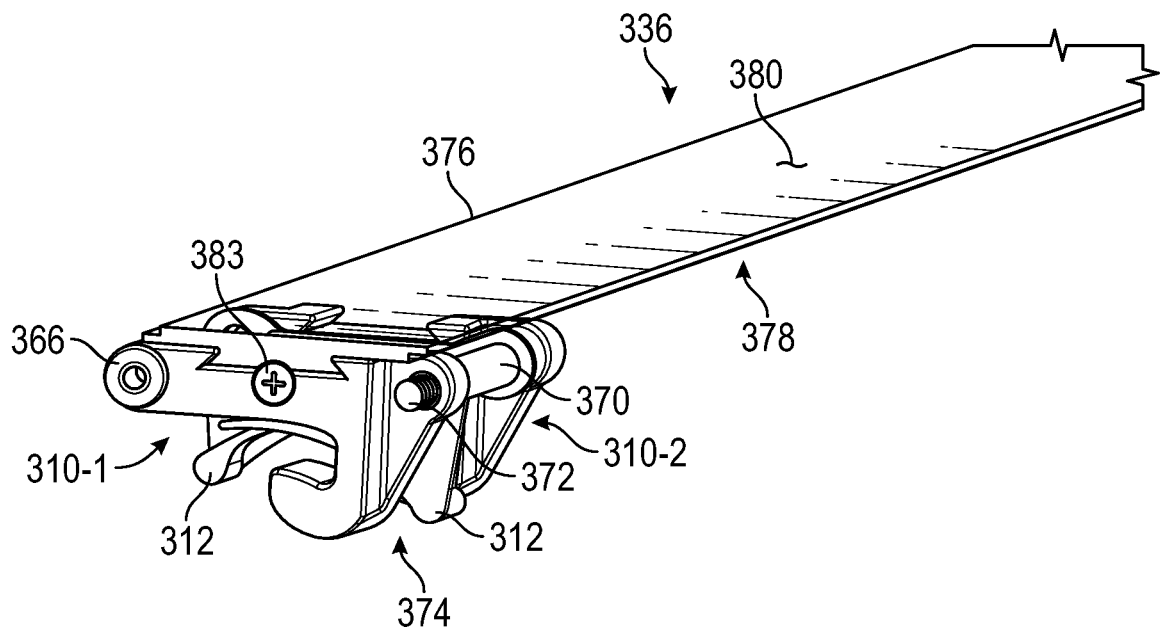

FIGS. 21-24 are perspective views that depict assembly steps associated with the fabrication of the upper assembly 302. FIG. 21 shows a first link component 310-1 after installation of an internally threaded insert 366 into the hole 332, a second link component 310-2, and spring assemblies 212 (as described with reference to FIGS. 9-11) before assembly. FIG. 22 shows the desired alignment and positioning of a hollow roller 370 (the major longitudinal axis of the hollow roller 370 is aligned with the leading hinge axis of rotation 322 as defined by the holes 330). A bolt 372 or other type of fastener is shaped and sized for insertion through: the hole 330 of the second link component 310-2; the hole 258 of one spring assembly 212; the hollow roller 370; the hole 258 of another spring assembly 212; and the hole 330 of the first link component 310-1. FIGS. 22-24 depict an assembled upper chain link 374, which includes the two link components 310-1, 310-2 coupled together.

FIG. 23 shows an end section of the working surface subcomponent 336, which is shaped and sized to fit within the slots 334 of the link components 310-1, 310-2. In accordance with certain embodiments, the working surface subcomponent 336 includes a slat 376 having an inner side 378 and an outer side 380 opposing the inner side 378. The inner side 378 has slat coupling features 382 that are configured to mate and couple with certain outward-facing structural features of the lower chain link 374, e.g., the slot 334. For the illustrated embodiment, the slat coupling features 382 include a protruding section of the slat 376 that has a side profile shape that corresponds to the side profile shape of the slot 334. This allows the slat 376 to be inserted into the slots 334 of the link components 310 (see FIG. 24). The outer side 380 of the slat 376 defines a portion of a deployable working surface of the load-bearing support structure, such that the outer sides 380 of a deployed number of slats 376 cooperate to form the deployed working surface. In accordance with certain embodiments, the slat 376 includes a layer of decorative material (e.g., a wood veneer, a patterned laminate material, a painted or treated layer of plastic, metal, or vinyl, or the like) that defines the outer side 380. In other embodiments, the slat 376 can be fabricated from a single piece of material, such as aluminum, having a decorative treatment or coating on its outer side 380. Threaded fasteners 383 can be used to attach or secure the working surface subcomponent 336 to a number of the link components 310 (refer to FIG. 16 and FIG. 24).

Although not depicted in FIG. 24, the bolt 372 is used to couple another upper chain link 374 in series. In this regard, when two upper chain links 374 are hinged together, the bolt 372 passes through the leading hinge structures 326 of a trailing upper chain link 374 and through the trailing hinge structures 328 of a leading upper chain link 374. The threaded insert 366 of the leading lower chain link 374 receives the threaded end of the bolt 372, which is tightened to secure the two upper chain links 374 together while allowing them to rotate about the corresponding hinge axis of rotation. A bolt 372 may also be used to couple a final upper chain link 374 with a leading edge link (as described below with reference to FIG. 32).

Figure 25:
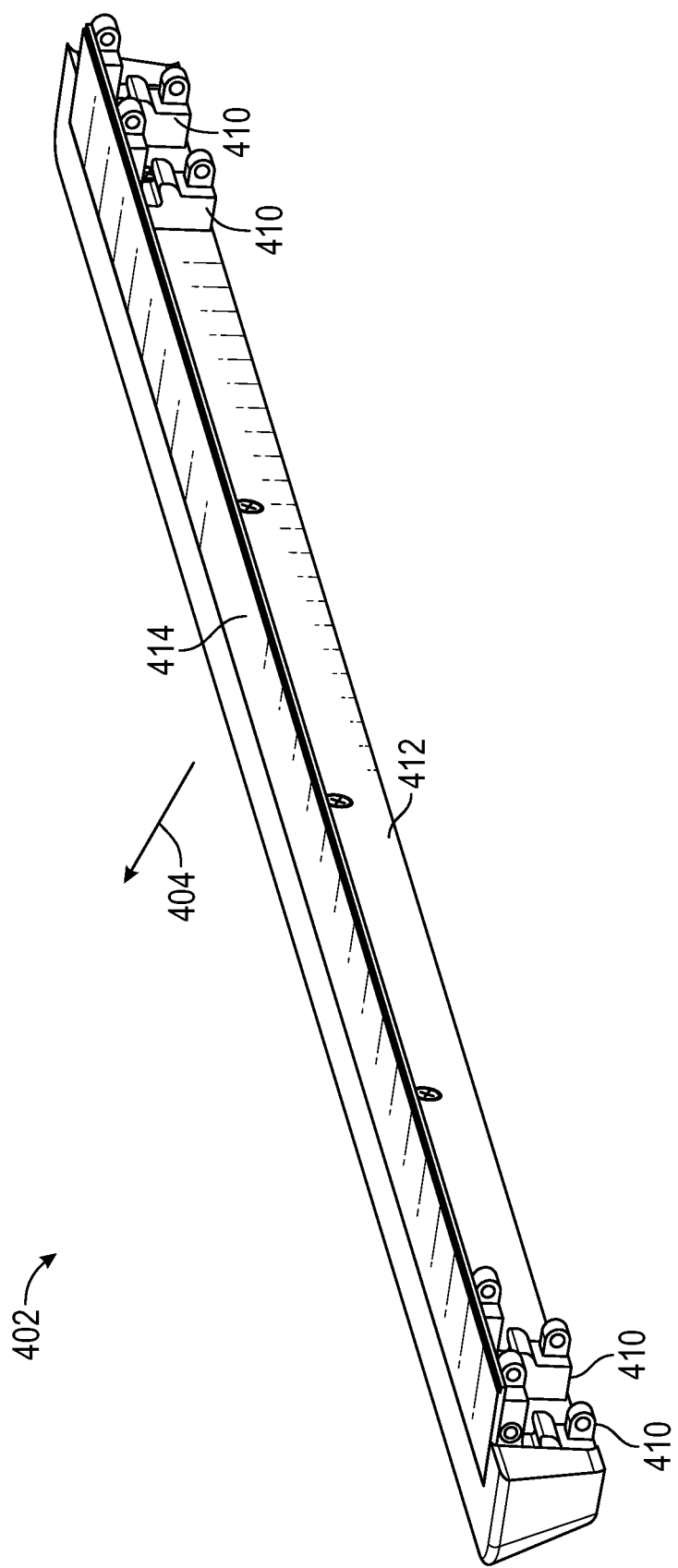
FIG. 25 is a perspective rear view of a leading edge assembly suitable for use with the first embodiment of the invention as disclosed herein.
Figure 29:
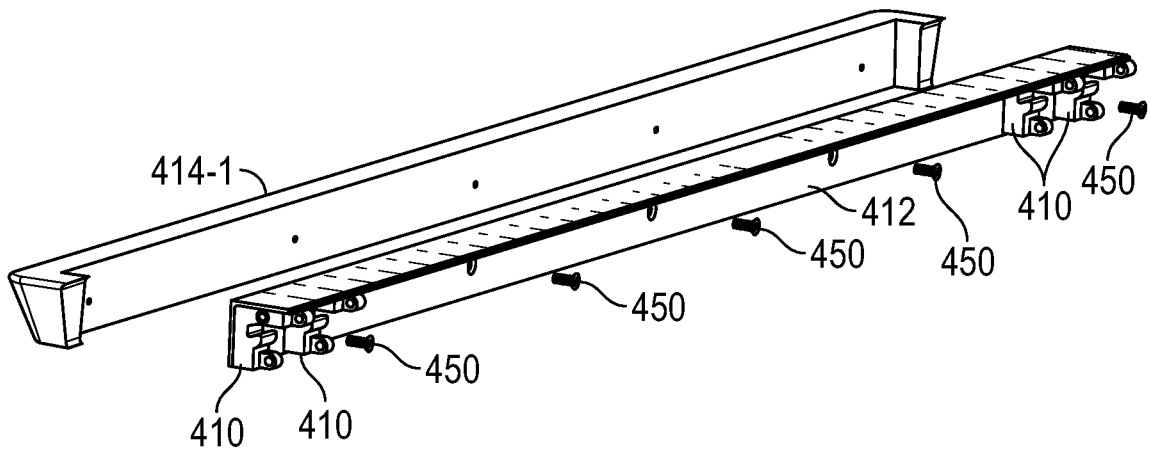
FIGS. 29 and 30 are perspective views that depict assembly steps associated with the fabrication of the leading edge assembly shown in FIG. 25.
Figure 30:
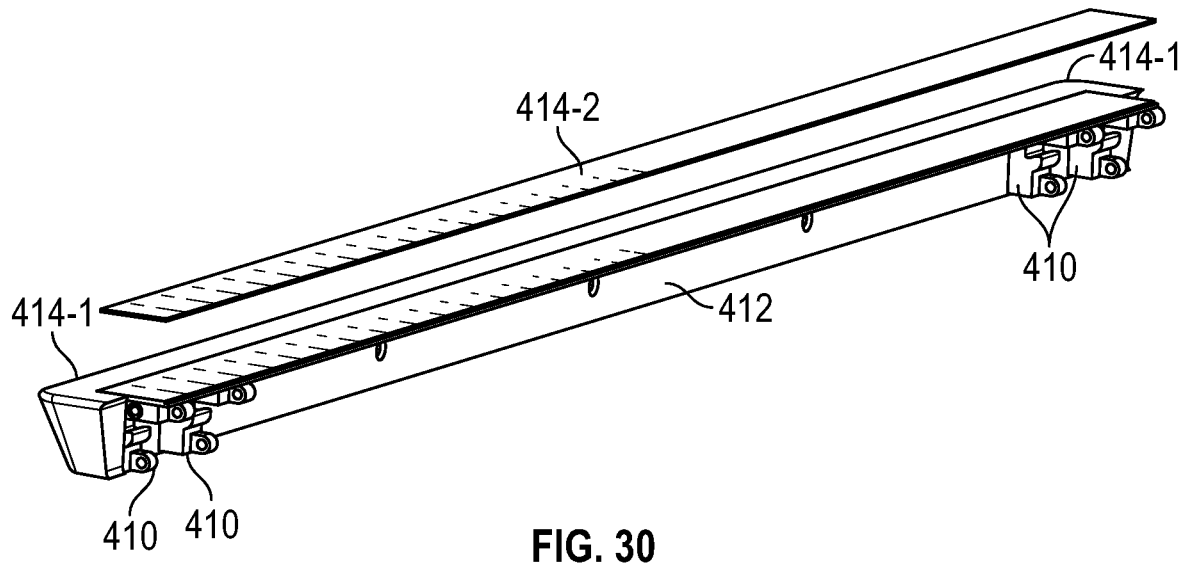
Figure 31:
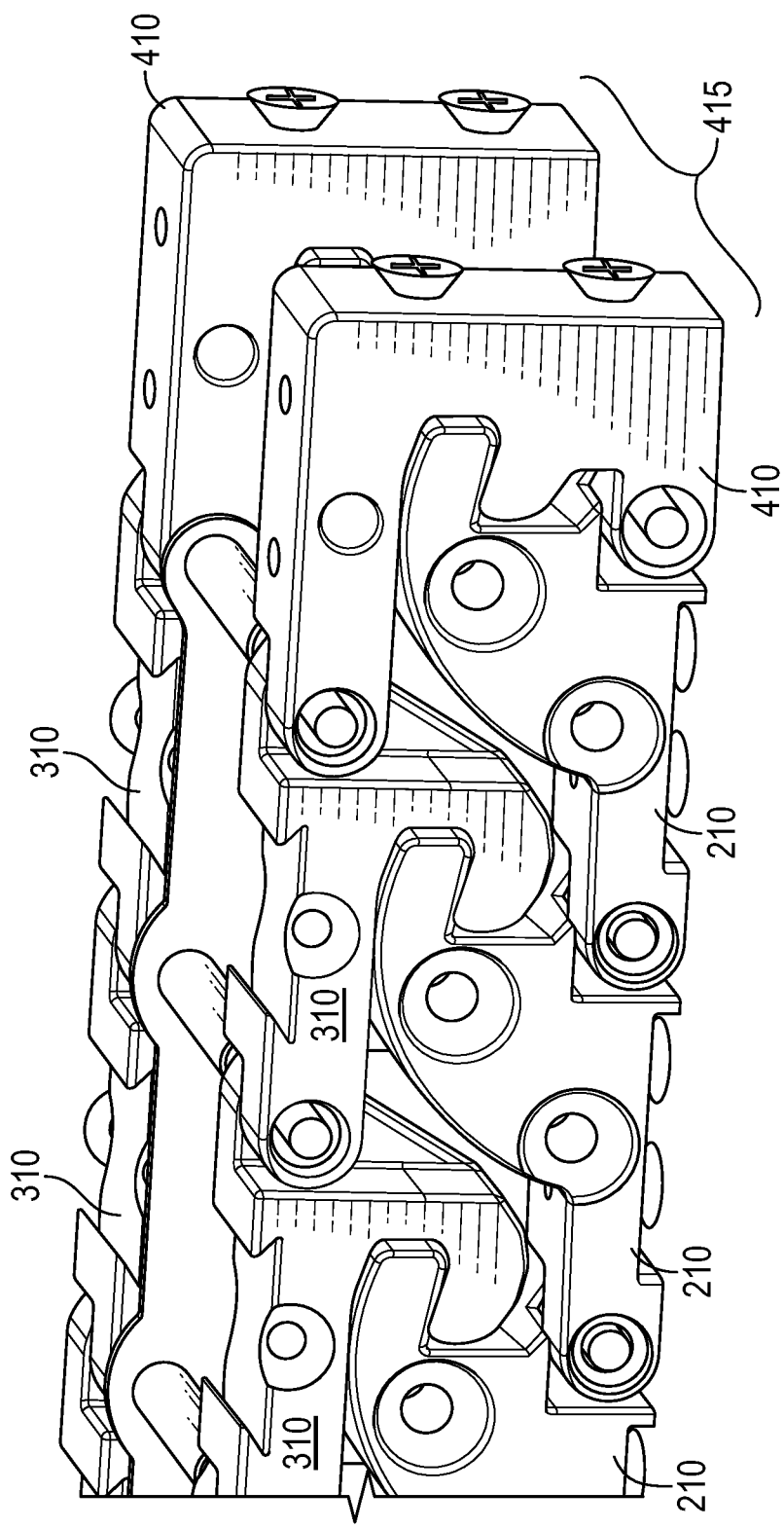
FIG. 31 is a perspective front view of chain assemblies, showing the manner in which upper link components, lower link components, and leading edge link components are coupled together in accordance with exemplary embodiments.

FIGS. 25-31 relate to an exemplary embodiment of a leading edge assembly 402 suitable for use with the disclosed embodiment. FIG. 25 is a perspective top rear view of the leading edge assembly 402, and FIGS. 26-30 depict various components and subassemblies of the leading edge assembly 402. FIG. 31 is a perspective top front view of chain assemblies, showing the manner in which upper link components, lower link components, and leading edge link components are coupled together in accordance with exemplary embodiments. Some of the structures, features, and functional characteristics of the leading edge assembly 402 are similar, identical, or equivalent to those described above for the lower assembly 202 and/or the upper assembly 302. For simplicity and brevity, such similar, identical, or equivalent aspects may not be redundantly described in detail here in the context of the leading edge assembly 402.

In FIG. 25, the directional arrow 404 points in the forward direction, which also corresponds to a deployment direction for the leading edge assembly 402. The opposite direction of the directional arrow 404 corresponds to a backward or stowage direction for the leading edge assembly 402. The depicted embodiment of the leading edge assembly 402 includes, without limitation: leading edge link components 410; a mounting bracket assembly 412; and at least one trim component 414 that includes or is fabricated from decorative material. These main components of the leading edge assembly 402 are coupled together using appropriate hardware, subcomponents, and/or material.

For this particular embodiment, the link components 410 are identical, and a pair of link components 410 are arranged to define one leading edge link 415 (see FIG. 31). Although FIG. 25 depicts an arrangement that includes two leading edge links (at the left and right sides of the leading edge assembly 402), alternative embodiments of a leading edge assembly may include only one leading edge link or more than two leading edge links, as appropriate for the particular use case, the intended application of the load-bearing support structure, the shape and size of the deployable support surface, and various strength, durability, and load capacity requirements.

As shown and described in more detail below with reference to FIG. 31, the link components 410 are suitably configured and arranged to form a top hinge structure and a bottom hinge structure for the leading edge assembly 402. The top hinge structure is arranged and configured for compatibility with the link components 310 of an upper assembly 302, and the bottom hinge structure is arranged and configured for compatibility with the link components 410 of a lower assembly 202. These hinge structures facilitate rotation of the corresponding upper and lower assemblies 302, 202 about the respective hinge axes of rotation defined by the hinge structures.

Figure 26:
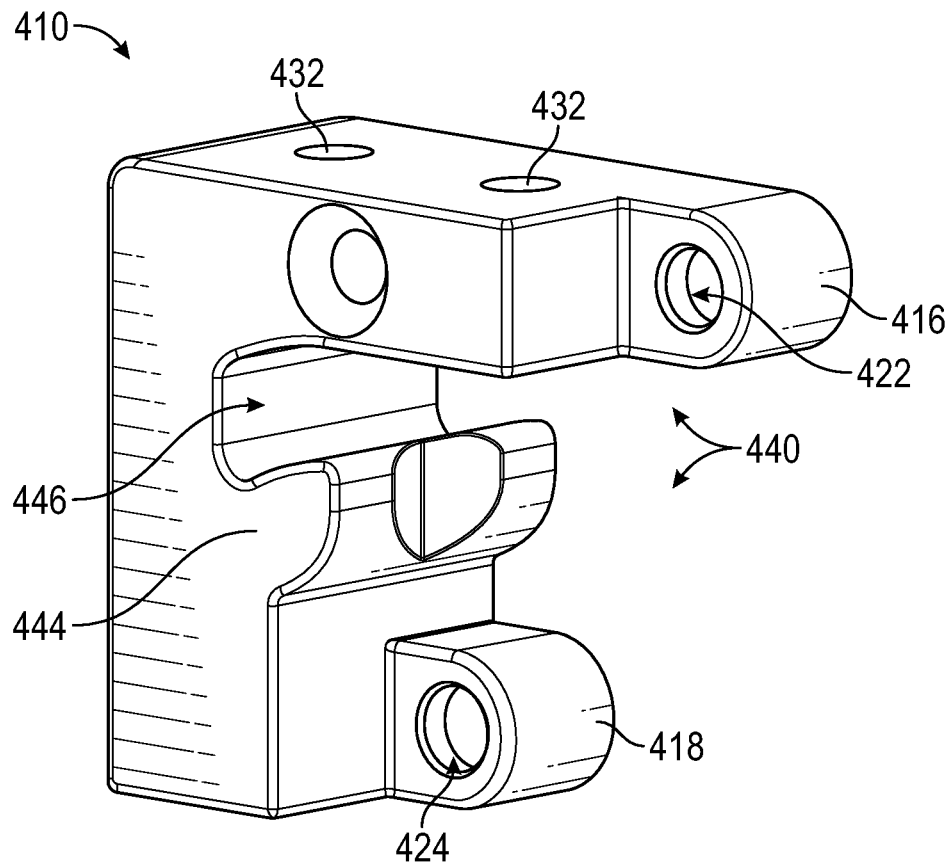
FIG. 26 is a perspective rear view of an exemplary embodiment of a leading edge link component suitable for use with the leading edge assembly shown in FIG. 25.
Figure 27:
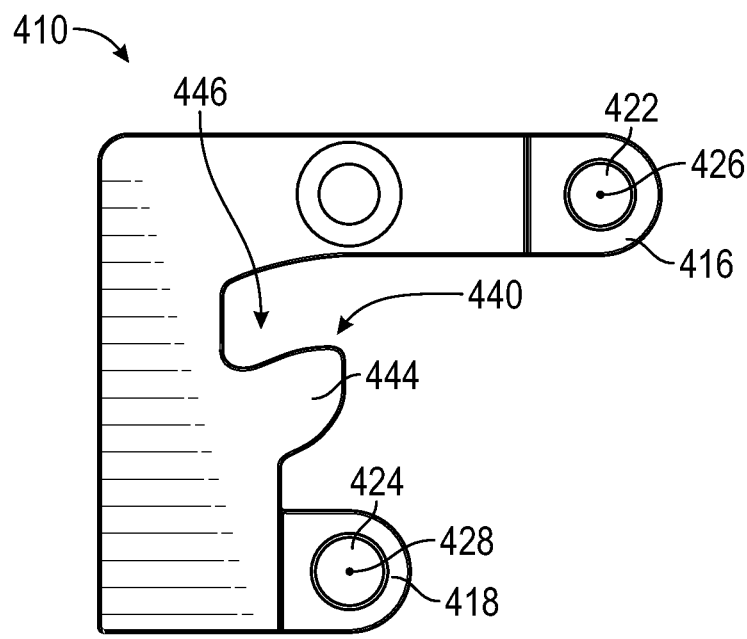
FIG. 27 is a side view of the leading edge link component.
Figure 28:
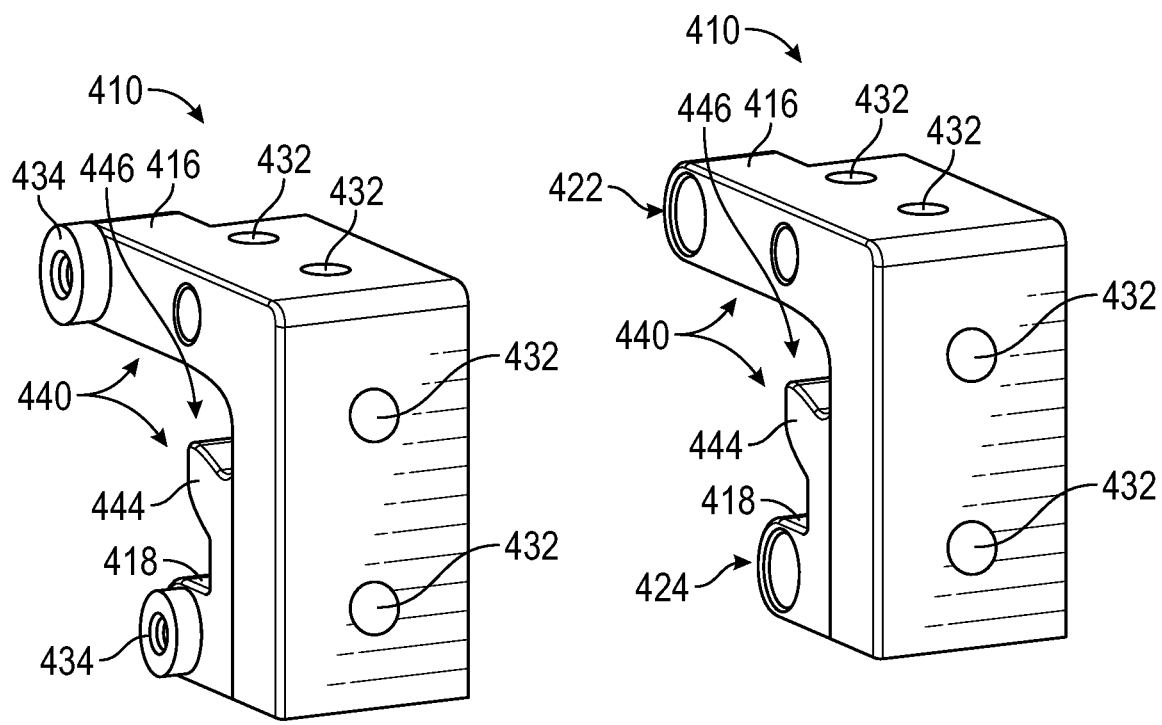
FIG. 28 is a perspective front view showing two instances of the leading edge link component.

FIGS. 26-28 depict different views of one link component 410 (for the leading edge assembly 402). FIG. 26 is a right rear view, FIG. 27 is a right side view, and FIG. 28 is a front left view that includes two link components 410 side by side. The figures show the structural features that form the top hinge structure 416 and the bottom hinge structure 418 of the leading edge assembly 402. The top and bottom hinge structures 416, 418 occupy about half of the width of the link component 410, which accommodates the linking/hinging of a lower assembly link component 210 and an upper assembly link component 310. The top hinge structure 416 includes a hole 422 formed therein to accommodate a hinge pin, a rod, a bolt, or any suitably configured fastener or coupling element. Similarly, the bottom hinge structure 418 includes a hole 424 formed therein to accommodate another hinge pin, rod, bolt, fastener, coupling element, or the like. A line passing through the center of the hole 422 corresponds to a top hinge axis of rotation 426, and a line passing through the center of the hole 424 corresponds to a bottom hinge axis of rotation 428 (see FIG. 27).

The top and/or front sections of the link component 410 may include any number of threaded holes 432 or threaded inserts to facilitate attachment to the mounting bracket assembly 412. Although not utilized in the illustrated embodiment, the sides of the link component 410 can be suitably configured in a way that allows it to receive a decorative endcap (in the manner described above with reference to the endcaps 216 for the lower assembly 202). As shown in FIG. 28, one of the two link components 410 includes threaded inserts 434 installed in the holes 422, 424

With additional reference to FIG. 31, the link component 410 includes structural interlock features 440 for the leading edge assembly 402. Notably, the structural interlock features 440 are shaped, sized, arranged, and configured to cooperate with the structural interlock features 240 of a link component 210 of the lower assembly 202 and/or to cooperate with the structural interlock features 340 of a link component 310 of the upper assembly 302. When deployed in an assembled load-bearing support mechanism, the structural interlock features 440 are oriented as backward-facing structural features. In accordance with the illustrated embodiment, the structural interlock features 440 include, without limitation: a protrusion 444 extending slightly upward. As shown in FIGS. 26-28, the protrusion 444 resides between the top and bottom hinge structures 416, 418. The protrusion 444 forms a shelf that defines a pocket space 446 above the shelf and below the top section of the link component 410. The pocket space 446 is shaped, sized, and configured to receive the protrusion 244 of a lower assembly link component 210.

FIG. 29 and FIG. 30 are perspective views that depict assembly steps associated with the fabrication of the leading edge assembly 402. FIG. 29 shows four of the link components 410 coupled to the mounting bracket assembly 412 (using, e.g., screws or bolts that are hidden from view in FIG. 29). FIG. 29 shows a front trim component 414-1 before attachment to the mounting bracket assembly 412, and FIG. 30 shows the front trim component 414-1 after attachment via threaded fasteners 450. FIG. 30 also includes a top trim component 414-2, which is shown before attachment to the top of the mounting bracket assembly 412. In certain embodiments, the top trim component 414-2 is affixed to the mounting bracket assembly 412 using a suitable adhesive or bonding material. The completed leading edge assembly 402 is shown in FIG. 25. The leading edge assembly 402 is coupled to the last instance of a lower assembly 202 and to the last instance of an upper assembly 302 by way of the various link components 210, 310, 410, as depicted in FIG. 31.

Figure 32:
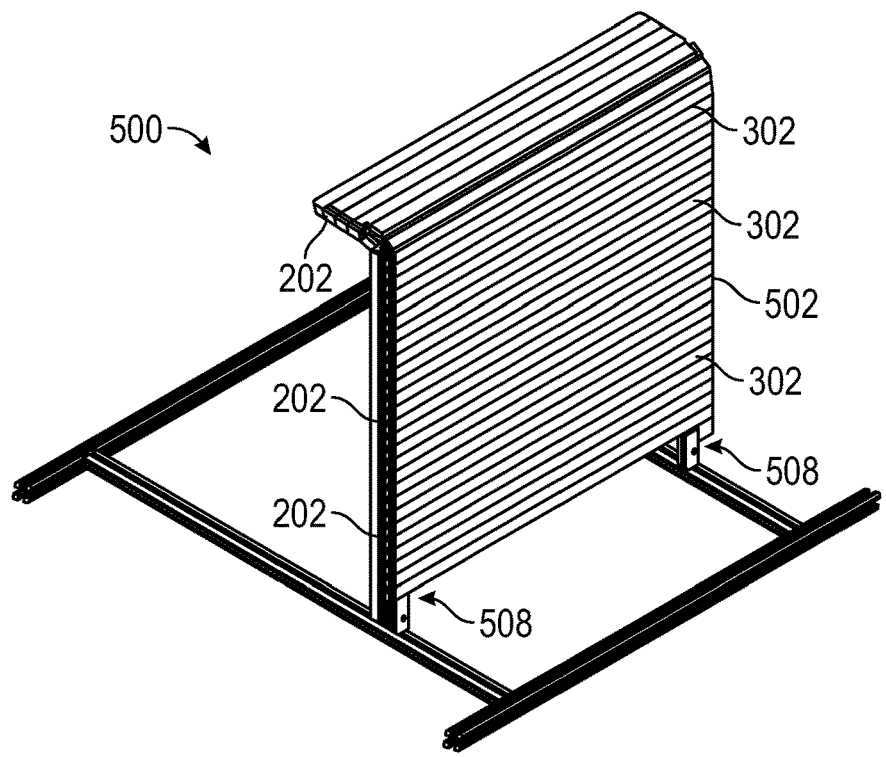
FIG. 32 is a perspective rear view of an embodiment of a load-bearing support structure in a stowed state.
Figure 33:
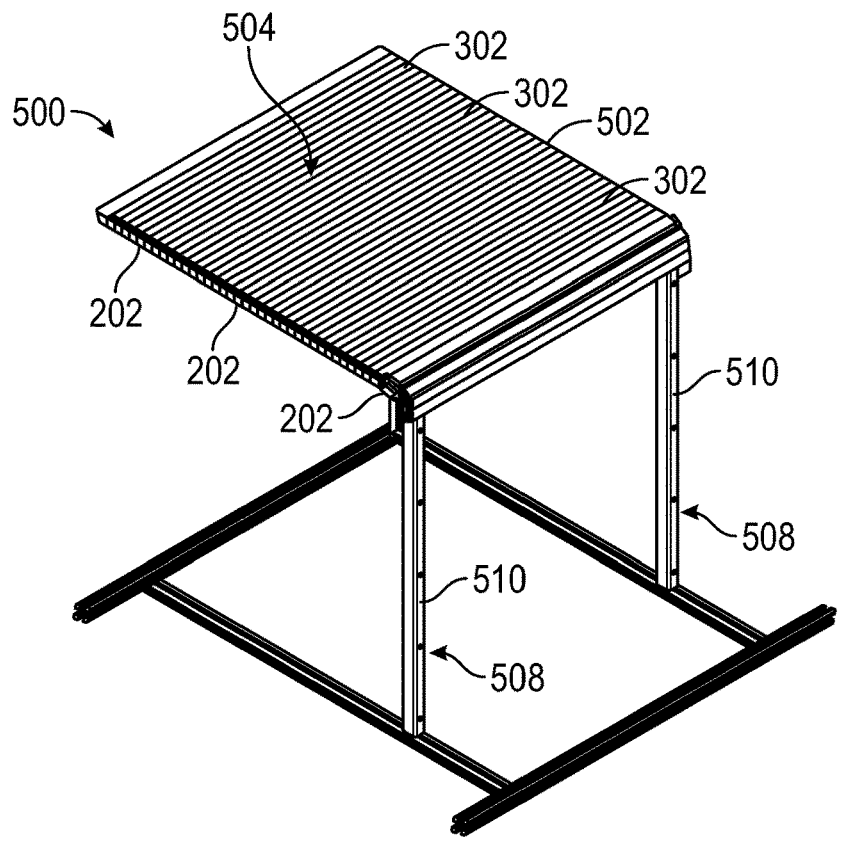
FIG. 33 is a perspective rear view of the load-bearing support structure in a deployed state.
Figure 34:
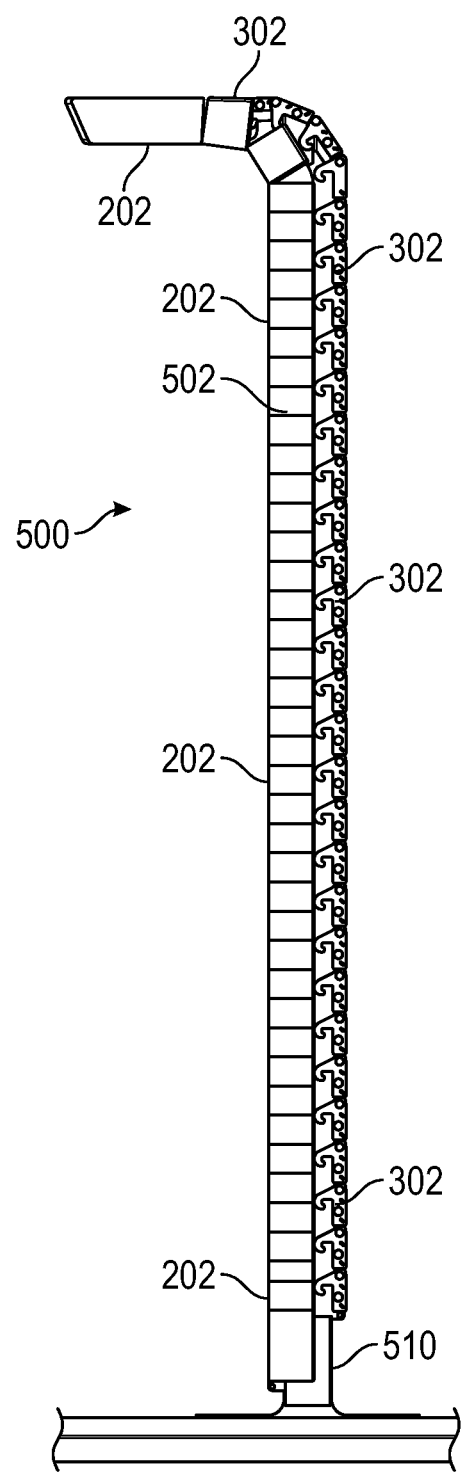
FIG. 34 is a side view of the load-bearing support structure in the stowed state.
Figure 35:
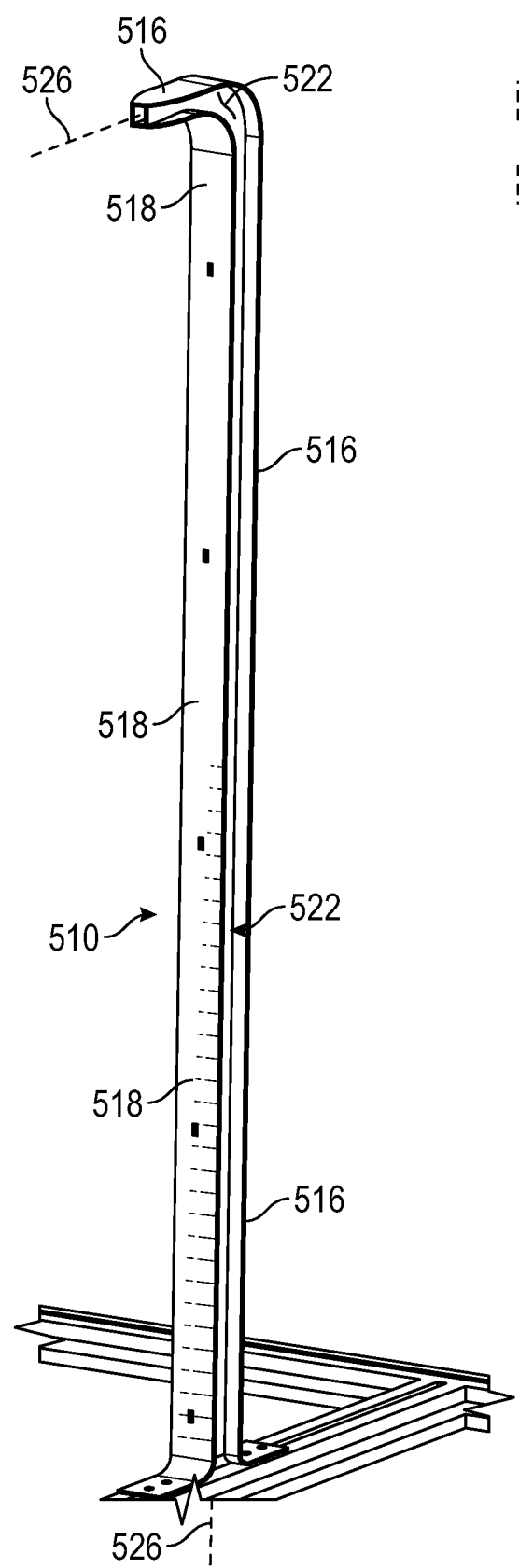
FIG. 35 is a perspective front view of an exemplary embodiment of a guide track suitable for use with the load-bearing support structure shown in FIGS. 32-34.
Figure 36:
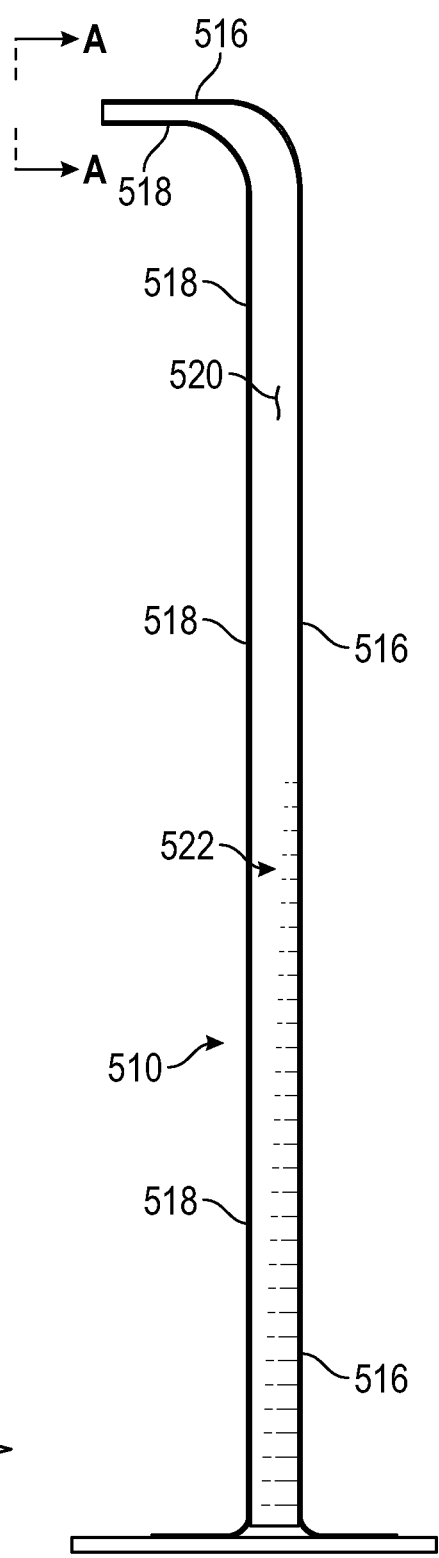
FIG. 36 is a side view of the guide track.

FIGS. 32-34 depict an exemplary embodiment of a load-bearing support structure 500 having a morphable support mechanism 502 that uses a plurality of the lower assemblies 202, a plurality of the upper assemblies 302, and the leading edge assembly 402. For simplicity and ease of description, the support structure 500 is depicted without any surrounding structure or associated storage unit. Moreover, the retracted and stowed orientation of the morphable support mechanism 502 is simplified relative to the implementation shown in FIGS. 1-3.

The support structure 500 includes a plurality of upper assemblies 302 hinged together in series, such that the leading edge section 306 of a rear instance of an upper assembly 302 is coupled to the trailing edge section 308 of a front instance of an upper assembly 302. As explained above, the upper assemblies 302 are coupled together via the leading and trailing hinge structures 326, 328 and the bolts 372. In this regard, the leading hinge structures 326 are located at the upper assembly leading edge sections 306, and the trailing hinge structures 328 are located at the upper assembly trailing edge sections 308. Similarly, the support structure 500 includes a plurality of lower assemblies 202 hinged together in series, such that the leading edge section 206 of a rear instance of a lower assembly 202 is coupled to the trailing edge section 208 of a front instance of a lower assembly 202. As explained above, the lower assemblies 202 are coupled together via the leading and trailing hinge structures 226, 228 and the bolts 272. In this regard, the leading hinge structures 226 are located at the lower assembly leading edge sections 206, and the trailing hinge structures 228 are located at the lower assembly trailing edge sections 208.

Figure 39:
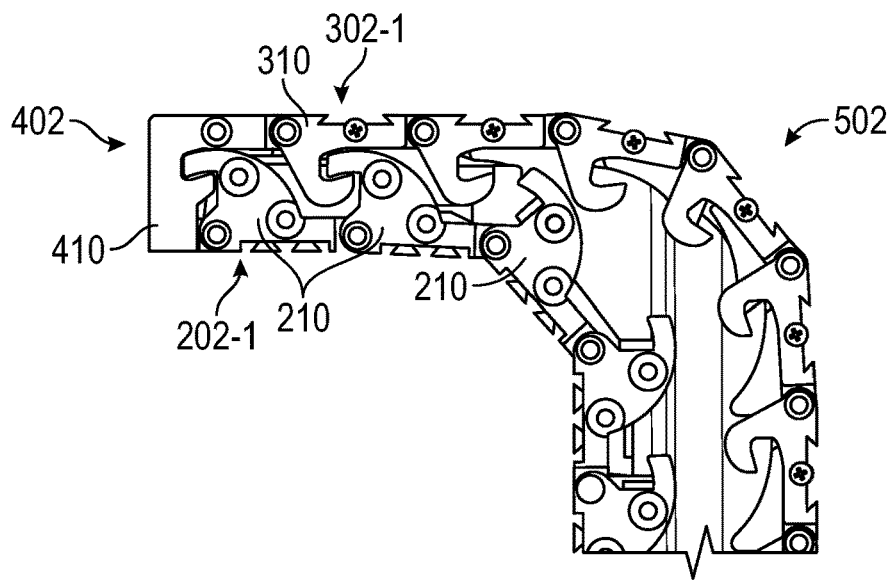
FIGS. 39-41 are side views of two chain assemblies, showing how the chain assemblies interlock with each other during deployment.
Figure 40:
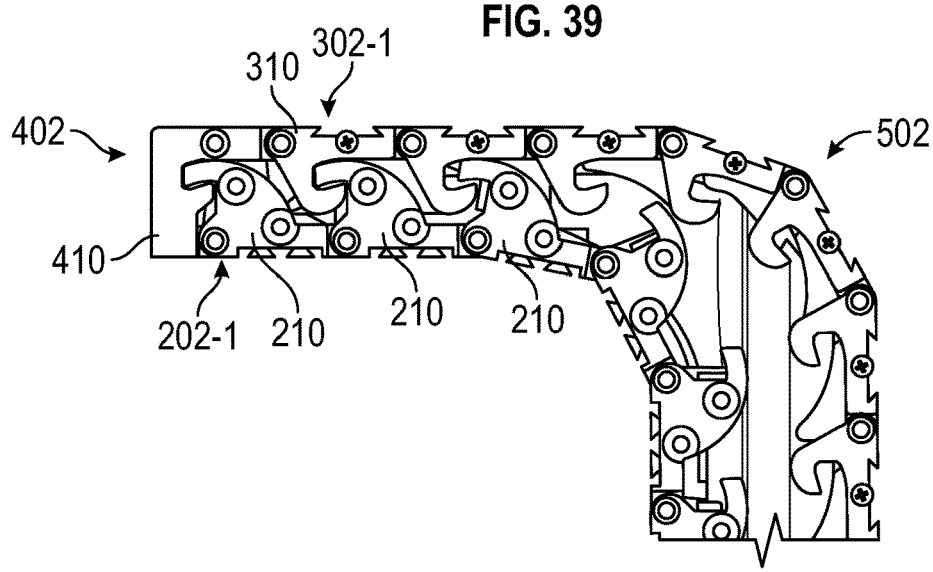
Figure 43:
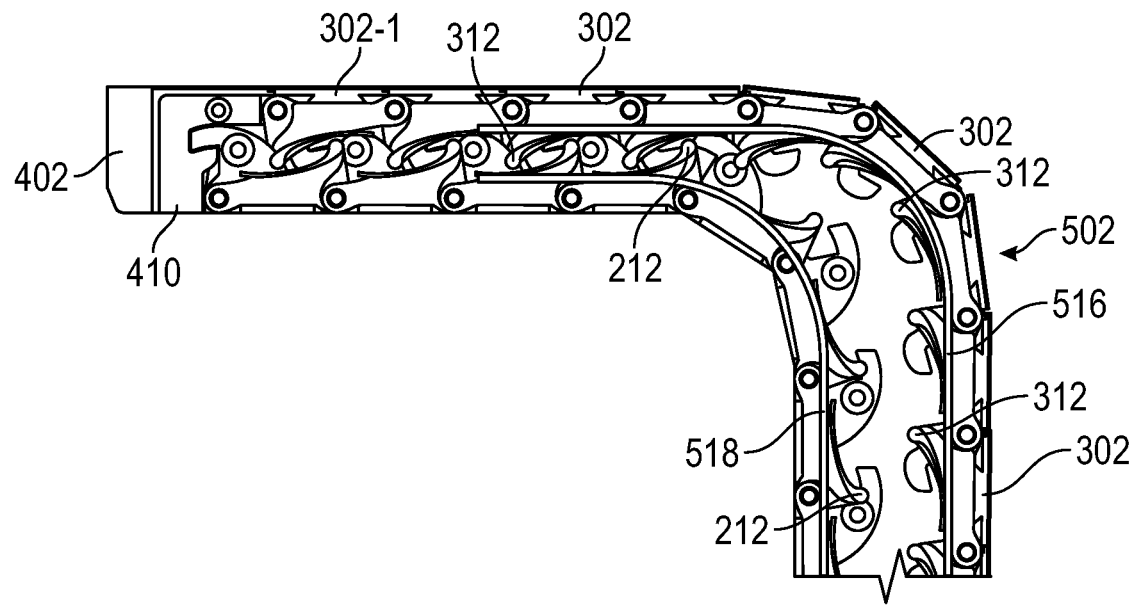
FIG. 43 is a side view of the load-bearing support structure shown in FIG. 42.

Referring to FIGS. 39, 40, and 43, the linked arrangement of upper assemblies 302 terminates with a final upper assembly 302-1, and the linked arrangement of lower assemblies 202 terminates with a final lower assembly 202-1. The final assemblies 202-1, 302-1 are coupled to the leading edge assembly 402 by way of their respective final chain links 274, 374. More specifically, the link components 210 of the final lower assembly 202-1 and the link components 310 of the final upper assembly 302-1 are coupled to the link components 410 of the leading edge assembly 402, wherein two link components 410 cooperate to form a leading edge link of the leading edge assembly 402 (see FIG. 31 and the related description above).

When assembled and deployed in the manner described herein, the lower link components 210 and the upper link components 310 are configured to function as chain links hinged together in series. The illustrated embodiment includes two upper chain assemblies (left and right sides) formed by the upper link components 310, and two lower chain assemblies (left and right sides) formed by the lower link components 210. Each upper chain link, which is realized with two upper link components 310, includes outward-facing structural features and inward-facing structural features opposing its outward-facing structural features. Likewise, each lower chain link, which is realized with two lower link components 310, includes outward-facing structural features and inward-facing structural features opposing its outward-facing structural features.

The inward-facing structural features of the upper link components 310 (e.g., the hook/finger structures 342) and the inward-facing structural features of the lower link components 210 (e.g., the hook/finger structures 242) are configured to releasably couple together in response to concerted movement of the upper and lower chain assemblies along a predefined deployment path. Conversely, the inward-facing structural features of the upper link components 310 (e.g., the hook/finger structures 342) and the inward-facing structural features of the lower link components 210 (e.g., the hook/finger structures 242) are configured to separate and decouple from each other in response to concerted movement of the upper and lower chain assemblies along a predefined stowage path.

The outward-facing structural features of the upper link components 310 (e.g., the slots 334) can be used to couple the working surface subcomponents 336 to the upper chain links. As shown in FIG. 33, a deployed number of the working surface subcomponents 336 cooperate to form a deployable working surface 504 of the support structure 500. When the upper and lower chain assemblies are deployed and coupled together in the manner described herein, the corresponding hook/finger structures 242, 342 interlock with one another to be self-supporting. As a result, the deployable working surface 504 is load-bearing when placed in the deployed position. In accordance with the depicted embodiment, the deployed section of the support structure 500 accommodates loading on the working surface 504 and loading of the structure below/opposite the working surface 504.

Figure 41:
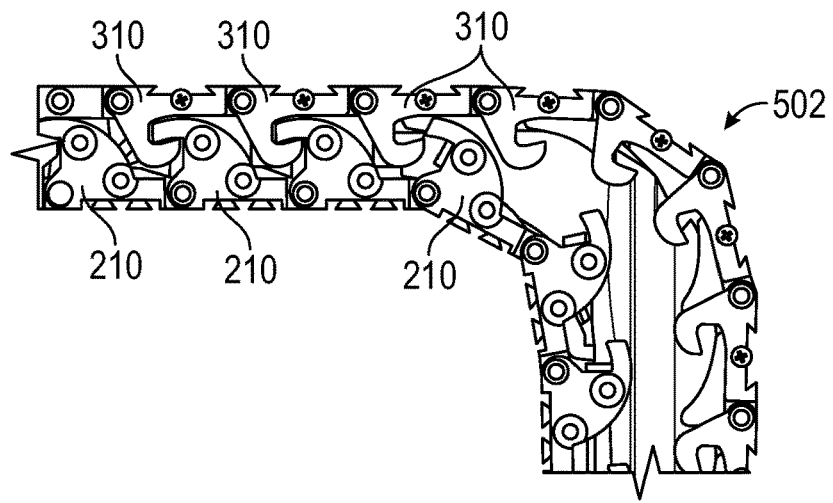

FIGS. 39-41 demonstrate how the upper and lower link components 310, 210 cooperate with one another to transition from a decoupled and separated state to a coupled and interlocked state. For the sake of clarity and simplicity, FIGS. 39-41 do not show some of the components that appear in other figures. FIGS. 39-41 are consistent with the orientation of the support structure 500 shown in FIGS. 32-34. In this regard, FIG. 39 is a side view corresponding to a first position, FIG. 40 is a side view corresponding to a second position, and FIG. 41 is a side view corresponding to a third position. The first position may represent an initial state, before deployment of the morphable support mechanism, the second position may represent an intermediate state (after deployment begins), and the third position may represent a final deployed position.

In FIGS. 39 and 40, the hook/finger structure of the leftmost link component 210 and the protrusion of the leading edge link component 410 are fully coupled and interlocked together. Notably, the shape of the hook/finger structure closely matches the shape of the pocket space defined in the leading edge link component 410, such that the hook/finger structure occupies most if not all of that pocket space. This tight fit is desirable to maintain the final lower assembly 202-1 in place, and to inhibit rotation of the final lower assembly 202-1 about its leading hinge axis of rotation. In FIG. 39, the hook/finger structure of the leftmost upper link component 310 has not yet fully engaged the hook/finger structure of the paired lower link component 210, and some space is visible near the respective protrusions. In FIG. 40, however, little to no space is visible between these protrusions (which extend in opposite directions when deployed as shown). To this end, the shape of the hook/finger structure of the lower link component 210 closely matches the shape of the pocket space defined in the counterpart upper link component 310, such that the hook/finger structure occupies most if not all of that pocket space. Similarly, the shape of the hook/finger structure of the upper link component 310 closely matches the shape of the pocket space defined in the counterpart lower link component 210, such that the hook/finger structure occupies most if not all of that pocket space. Consequently, when a pair of upper and lower link components 310, 210 are fully engaged and interlocked in this manner, the cooperating structures inhibit rotation of the associated upper and lower assemblies 302, 202.

The sequence of FIGS. 39-42 demonstrates how the inward-facing features of the upper and lower assemblies 302, 202 dynamically interact and engage in response to concerted movement of the upper and lower assemblies 302, 202 along a predefined deployment path. The reverse sequence of FIGS. 42-39 demonstrates how the inward-facing features of the upper and lower assemblies 302, 202 dynamically interact and disengage in response to concerted movement of the upper and lower assemblies 302, 202 along a predefined stowage path. For this particular embodiment, the deployment and stowage paths follow a common path, but in opposite directions. As shown in FIGS. 39-41, movement of the upper and lower assemblies 302, 202 along the deployment path causes them to move closer together, and causes the lower link components 210 to pivot until the hook/finger structures of the lower link components 210 engage and eventually interlock with their counterpart hook/finger structures of the upper link components 310. The interlocking feature prohibits rotation of the individual link components, creating a rigid linked structure from the upper and lower assemblies 302, 202. The offset position of the joints (the hinge axes) in the opposing assemblies 302, 202 inhibits vertical movement. As a result, the interlocked assemblies 302, 202 are rigid in all directions: up; down; and side to side.

Referring to FIGS. 32-38, 42, and 43, the support structure 500 includes a guide track arrangement 508 having at least one guide track 510. The depicted embodiment includes two guide tracks 510—one for the left side chain assemblies and one for the right side chain assemblies. The guide track arrangement 508 is suitably configured to receive the upper and lower assemblies 302, 202, and is designed to accommodate sliding movement of the upper and lower assemblies 302, 202 as required for deployment and stowage of the morphable support mechanism 502. More specifically, each guide track 510 is configured to receive an upper chain assembly (formed with the upper link components 310) and a lower chain assembly (formed with the lower link components 210), and each guide track 510 accommodates sliding movement of the chain assemblies as needed. To this end, each guide track 510 is shaped, sized, and arranged in a desired manner to define and provide the predefined deployment and stowage paths for the upper and lower assemblies 302, 202.

Each guide track 510 is also shaped, sized, arranged, and configured to transition the inward-facing structural features of the upper chain links (e.g., the protrusions 344) and the lower chain links (e.g., the protrusions 244) from a decoupled state to a coupled state in response to concerted movement of the chain assemblies along the deployment path defined by the guide track 510. Likewise, each guide track 510 is shaped, sized, arranged, and configured to transition the inward-facing structural features of the upper chain links (e.g., the protrusions 344) and the lower chain links (e.g., the protrusions 244) from the coupled state to the decoupled state in response to concerted movement of the chain assemblies along the stowage path defined by the guide track 510. FIGS. 39-41 depict the coupling/decoupling actions that result from such concerted movements.

Referring to FIGS. 35-38, 42, and 43, each guide track 510 of the illustrated support structure 500 includes various structural features that hold and guide the lower and upper assemblies 202, 302 as they move along the guide track 510. Depending on the particular embodiment, the guide track 510 may include any of the following structural features, without limitation and in any desired combination: one or more channels, one or more flanges, one or more rails, one or more tracks, one or more tunnels, one or more slots, one or more keys/keyways, one or more protrusions, one or more ribs, one or more grooves, or the like.

Figure 37:
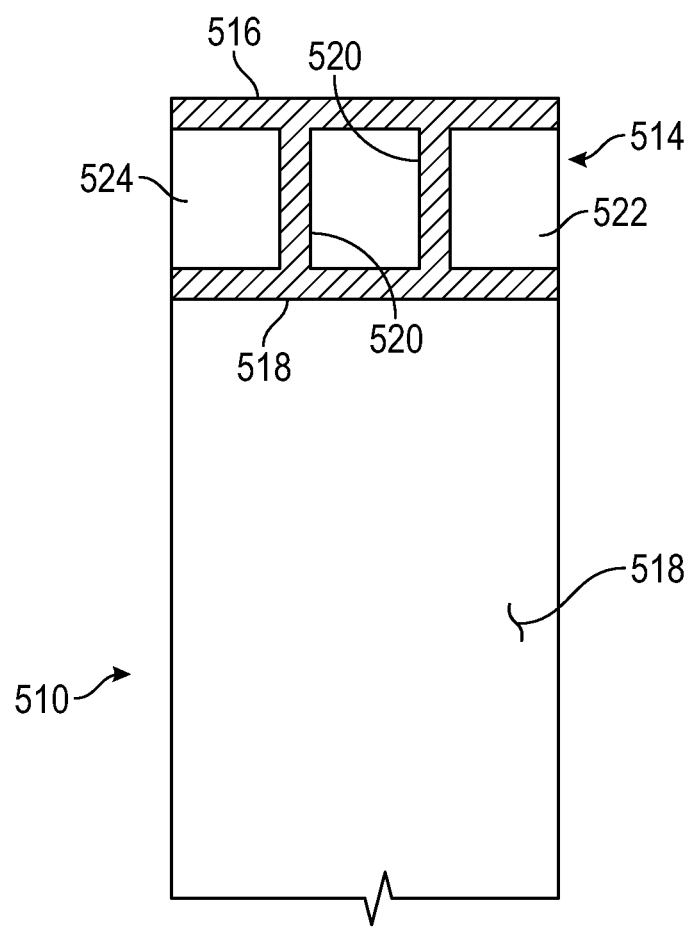
FIG. 37 is a front view of a portion of the guide track, as viewed from the perspective of line A-A in FIG. 36.

Although not always required, the depicted embodiment of the guide track 510 has a shape that resembles an I-beam, when viewed in cross section along a line or plane that is perpendicular to the major longitudinal axis of the guide track 510. FIG. 37 depicts the I-beam shape 514 as viewed from the line A-A in FIG. 36. The I-beam shape 514 is generally characterized by an upper flange 516, a lower flange 518 that opposes the upper flange 516, and a web 520 between the upper and lower flanges 516, 518. Although the web 520 is hollow in the depicted embodiment, it may be a solid web in other embodiments. The flanges 516, 518 and the web 520 cooperate to define a right open-sided channel 522 and a left open-sided channel 524. The web 520 separates the two channels 522, 524 such that the channel 522 is open to the right side of the guide track 510 and the channel 524 is open to the left side of the guide track 510. The guide track 510 has a major longitudinal axis 526 that is generally defined by a line centered in the web 520 that follows the path defined by the web 520 (see FIG. 35, which shows the longitudinal axis 526 entering and exiting the guide track 510). In certain exemplary embodiments, the guide track 510 employs a curved major longitudinal axis 526 that accommodates folded storage of the first and second chain assemblies when they are decoupled from each other and, therefore, folded storage of the corresponding lower and upper assemblies 202, 302. The guide track 510 shown in FIGS. 32-38, however, stores most of the lower and upper assemblies 202, 302 in a straight and unfolded state (other than the sections that reside in the curved neck region of the guide track 510). For comparison, the guide tracks used in the version shown in FIG. 3 are curved to accommodate the curved and folded configuration when stowed.

Figure 38:
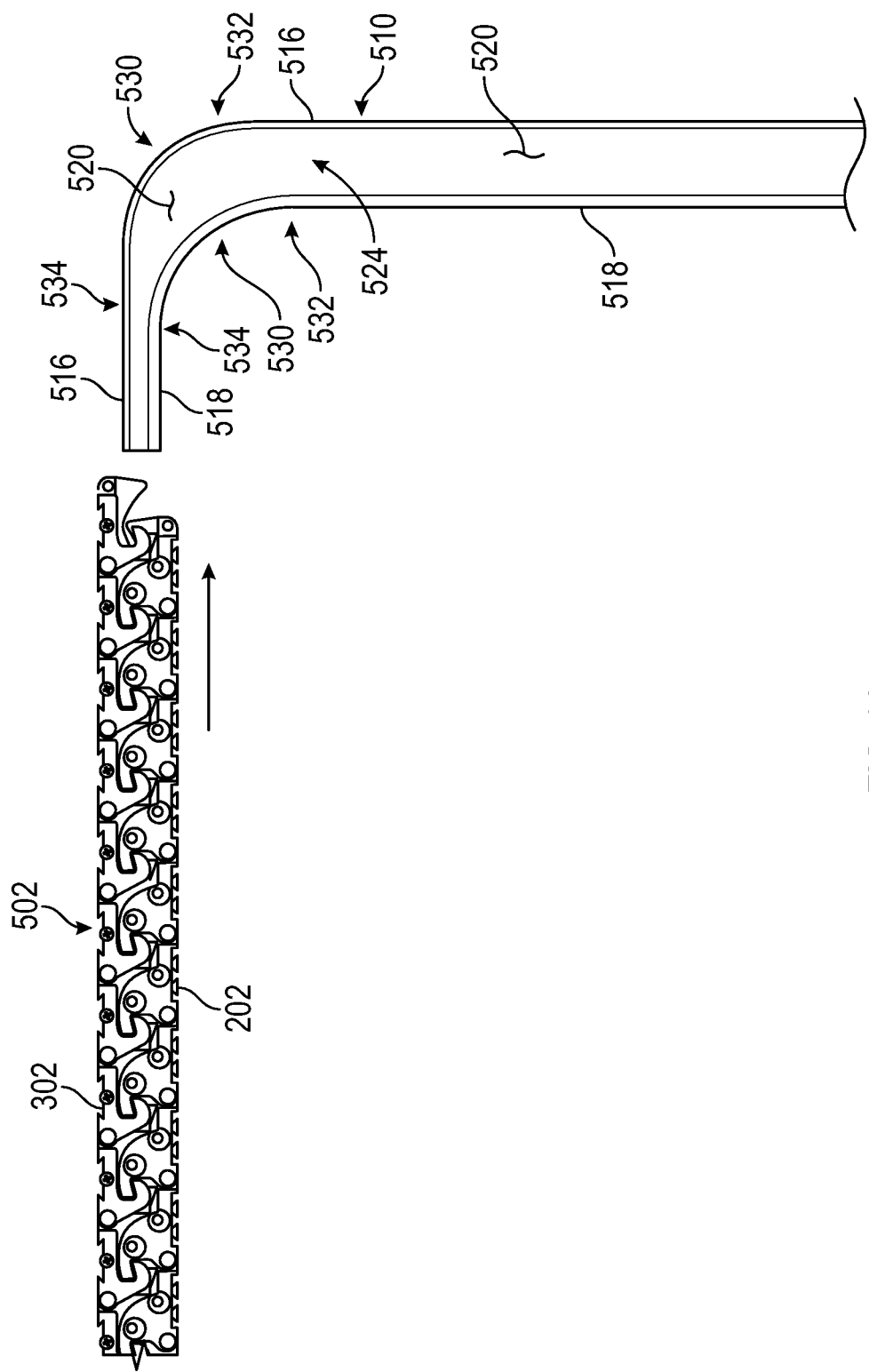
FIG. 38 is a side view that illustrates the manner in which cooperating chain assemblies are installed onto the guide track.

FIG. 38 shows how the lower and upper assemblies 202, 302 (coupled together) are introduced onto a guide track 510. The coupled assemblies 202, 302 can be aligned with the guide track 510 and moved laterally (to the right in FIG. 38) to engage the end of the guide track 510. The assemblies 202, 302 can be installed onto the guide track 510 and moved into the stowed position shown in FIG. 34. As explained previously, movement of the assemblies 202, 302 in the stowage direction results in decoupling of the assemblies 202, 302.

Figure 42:
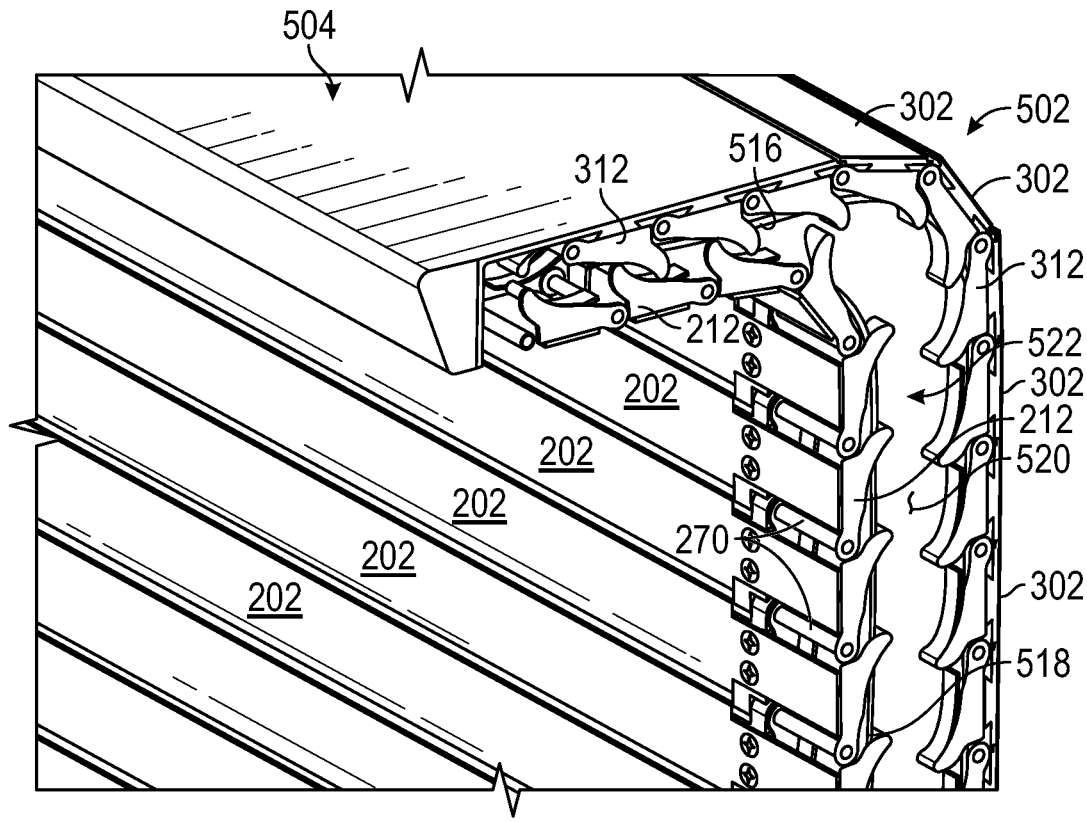
FIG. 42 is a front perspective view of an embodiment of a load-bearing support structure, with certain components removed to show the interaction between spring assemblies and a guide track.

FIGS. 42 and 43 illustrate the manner in which the spring assemblies 212, 312 engage features of the guide track 510. As explained above, each lower chain link of the lower assembly 202 includes two spring assemblies 212 (each spring assembly 212 has a leaf spring 252). Similarly, each upper chain link of the upper assembly 302 includes two spring assemblies 312 (each spring assembly 312 also has a corresponding leaf spring). The spring assemblies 212 engage at least the lower flange 518 of the guide track 510 to maintain the retracted portion of the lower assembly 202 and its lower chain assembly on the guide track 510 in a stowed state. Likewise, the spring assemblies 312 engage at least the upper flange 516 of the guide track 510 to maintain the retracted portion of the upper assembly 302 and its upper chain assembly on the guide track 510 in the stowed state. Referring also to FIG. 14, the bottom surfaces of the spring assemblies 212 engage and slide over the surface of the lower flange 518 that defines the channel 522, 524, while the hollow roller 270 engages and rolls over the outward-facing surface of the lower flange 518. The two opposing spring assemblies 212 flank the web 520 when installed on the guide track 510 (the web 520 would reside in the space between the spring assemblies 212-1, 212-2 shown in FIG. 14). The spring tension imparted by the leaf springs 252 "pinches" the lower flange 518 between the spring assemblies 212 and the hollow rollers 270. For the upper assembly 302, the spring assemblies 312 function to "pinch" the upper flange 516 of the guide track 510 between the spring assemblies 312 and the hollow rollers 370.

The guide track 510 includes a curved neck region 530 (see FIG. 38) that serves as a transition to couple/decouple the lower and upper assemblies 202, 302. For the depicted embodiment, a first end 532 of the curved neck region 530 is associated with a relatively wide spacing between the upper and lower flanges 516, 518 of the guide track, and a second end 534 of the curved neck region 530 is associated with a relatively narrow spacing between the upper and lower flanges 516, 518. The wide spacing keeps the lower and upper assemblies 202, 302 decoupled and spaced apart from each other, and the narrow spacing brings the lower and upper assemblies 202, 302 together in the coupled state. The curved neck region 530 enables the lower and upper assemblies 202, 302 to transition from the decoupled state to the coupled state (and vice versa) in response to concerted movement during deployment and stowage, as explained above with reference to FIGS. 39-41. The shape of the curved neck region 530 and the variable spacing between the upper and lower flanges 516, 518 urge the lower and upper assemblies 202, 302 into the desired positions when they are moved in concert during extension and retraction. When moved in the deployment direction, the lower assembly 202 moves closer to the upper assembly 302, and the hook/finger structures 242 of the lower assembly 202 pivot to enter the pocket spaces 346 of the upper assembly 302 and eventually fully engage the hook/finger structures 342 of the upper assembly 302. When moved in the stowage direction, the lower assembly 202 moves away from the upper assembly 302, and the hook/finger structures 242 of the lower assembly 202 pivot and naturally disengage and "fall away" from the hook/finger structures 342 of the upper assembly 302. Refer again to FIGS. 39-41, which demonstrate this activity.

When the support mechanism 502 is deployed, some of the link components 210, 310 remain uncoupled (carried by the guide track arrangement 508), and one or more pairs of link components 210, 310 may be in a partially coupled state. When the upper and lower assemblies 302, 202 are decoupled, they are constrained to the path identified by the guide track 510. The extended section of the guide track 510 containing a portion of the mated assemblies 302, 202 transfers torque to the guide track 510. The design of the system ensures the transfer of forces through the upper and lower assemblies 302, 202 to the guide track 510, which holds the deployed portion of the support mechanism 502 in place.

Although not implemented with the illustrated embodiment, the load-bearing support structure 500 may include a suitably configured storage unit that fully or partially surrounds the guide tracks 510. The storage unit can be shaped and sized to accommodate stowage of the morphable support mechanism 502 (including the chain assemblies, the upper and lower assemblies 302, 202, etc.) when in the stowed state. Moreover, the storage unit may include an opening defined or formed therein, wherein the opening is shaped and sized to accommodate passage of the morphable support mechanism 502 when the upper and lower assemblies 302, 202 are coupled together in the deployed state. See, for example, the embodiment shown in FIG. 1 and FIG. 2.

Second Embodiment

FIGS. 44-79 depict various structures and features related to embodiments of a load-bearing support structure that employs at least one morphable support mechanism having structural features that resemble a truss architecture, wherein elements of the truss architecture interlock with each other when the support structure is deployed. Many aspects of the first and second embodiments are common. Indeed, some of the structures, features, and functional characteristics of the second embodiment of the support structure are similar, identical, or equivalent to those described above for the first embodiment of the support structure. For simplicity and brevity, such similar, identical, or equivalent aspects may not be redundantly described in detail here in the context of the second embodiment.

Figure 44:
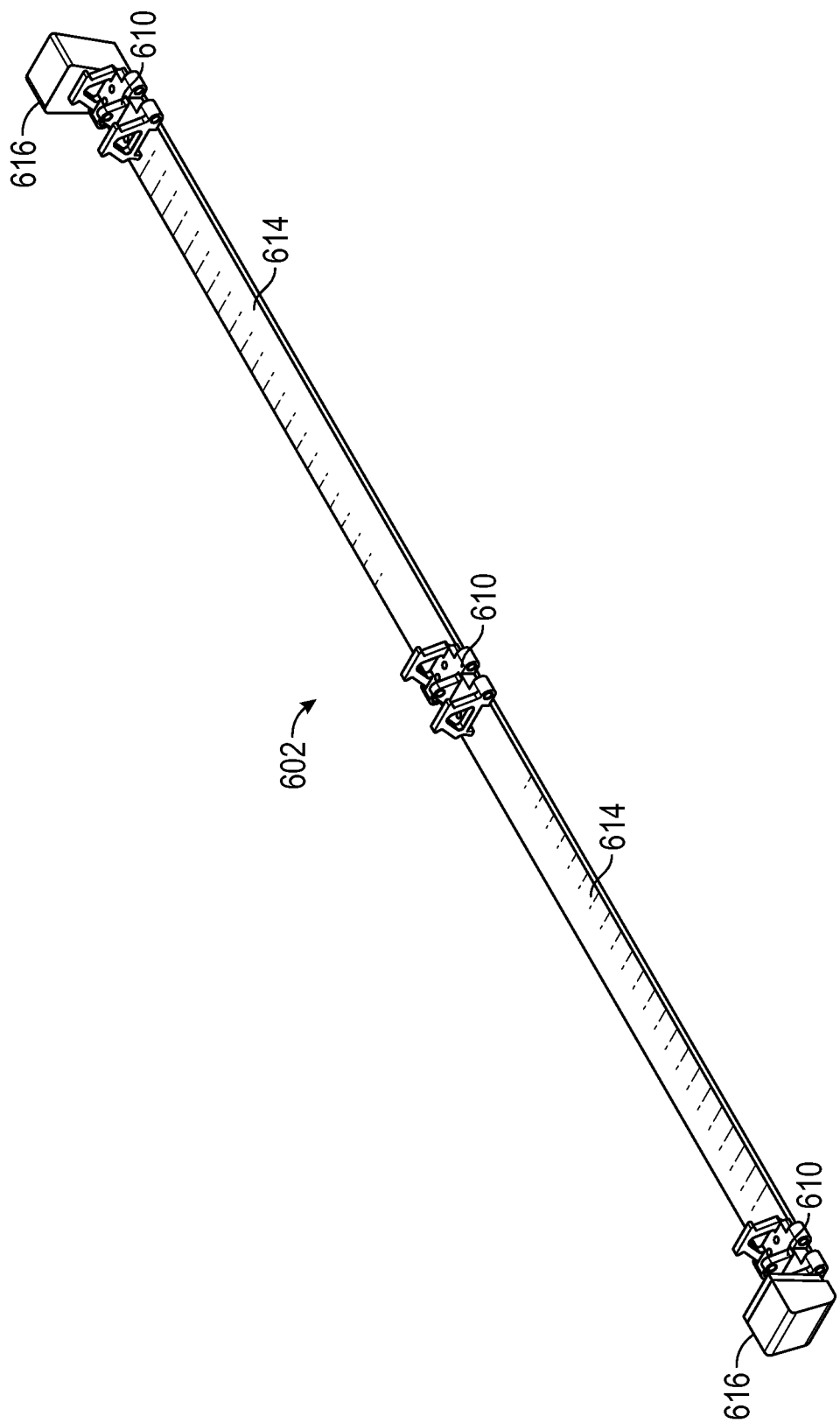
FIG. 44 is a perspective rear view of a lower assembly suitable for use with a second embodiment of the invention as disclosed herein.

FIG. 44 is a perspective top rear view of a lower assembly 602 suitable for use with the disclosed embodiment, and FIGS. 45-50 depict various components and subassemblies of the lower assembly 602. As explained in more detail below, embodiments of a load-bearing support structure utilize a plurality of these lower assemblies 602 hinged together in series to form a portion of the morphable support mechanism. The depicted embodiment of the lower assembly 602 includes, without limitation: link components 610; lower support slats 614; and endcaps 616. These main components of the lower assembly 602 are coupled together using appropriate hardware, subcomponents, and/or material.

For this particular embodiment, the link components 610 are identical, and the lower assembly 602 includes three of them (one at or near the left side, one at or near the right side, and one located between the left and right sides). Although FIG. 44 depicts an arrangement that includes three link components 610, alternative embodiments of a lower assembly may include only one lower link component or more than three lower link components, as appropriate for the particular use case, the intended application of the load-bearing support structure, the shape and size of the deployable support surface, and various strength, durability, and load capacity requirements.

As shown and described in more detail below, the link components 610 are suitably configured and arranged to form a lower assembly leading hinge structure and a lower assembly trailing hinge structure. The leading hinge structure is located at or near the leading edge section of the lower assembly 602, and the trailing hinge structure is located at or near the trailing edge section of the lower assembly 602. The leading hinge structure of the lower assembly 602 is configured to provide a leading hinge axis of rotation, and the trailing hinge structure of the lower assembly 602 is configured to provide a trailing hinge axis of rotation. When a plurality of lower assemblies 602 are hinged together in series, the hinge structures allow adjacent lower assemblies 602 to rotate relative to each other on the leading and trailing hinge axes of rotation. This hinged arrangement facilitates compact (folded or curved) storage of the lower assembly 602 if so desired.

Figure 45:
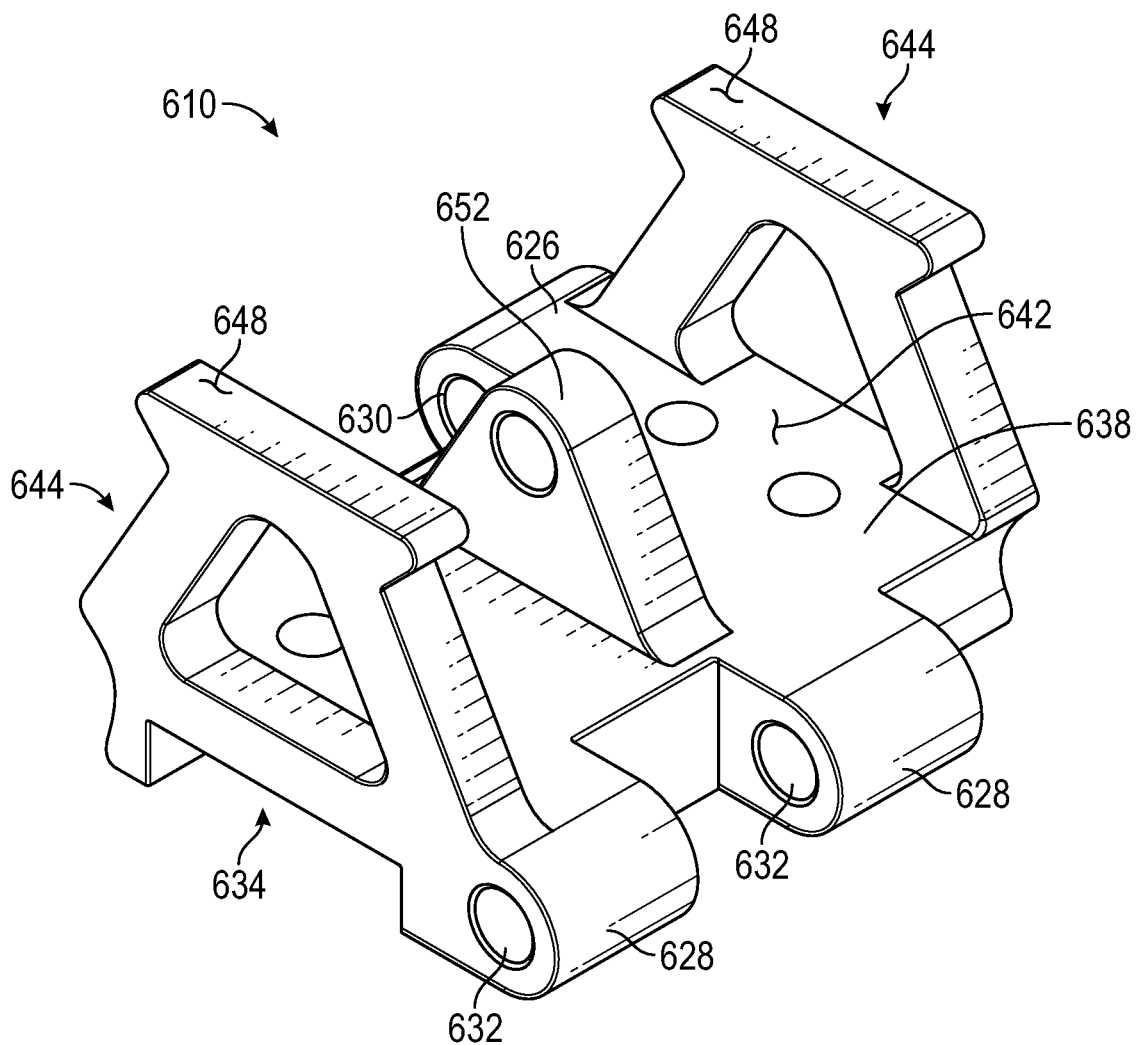
FIG. 45 is a perspective top view of an exemplary embodiment of a lower link component suitable for use with the lower assembly shown in FIG. 44.
Figure 46:
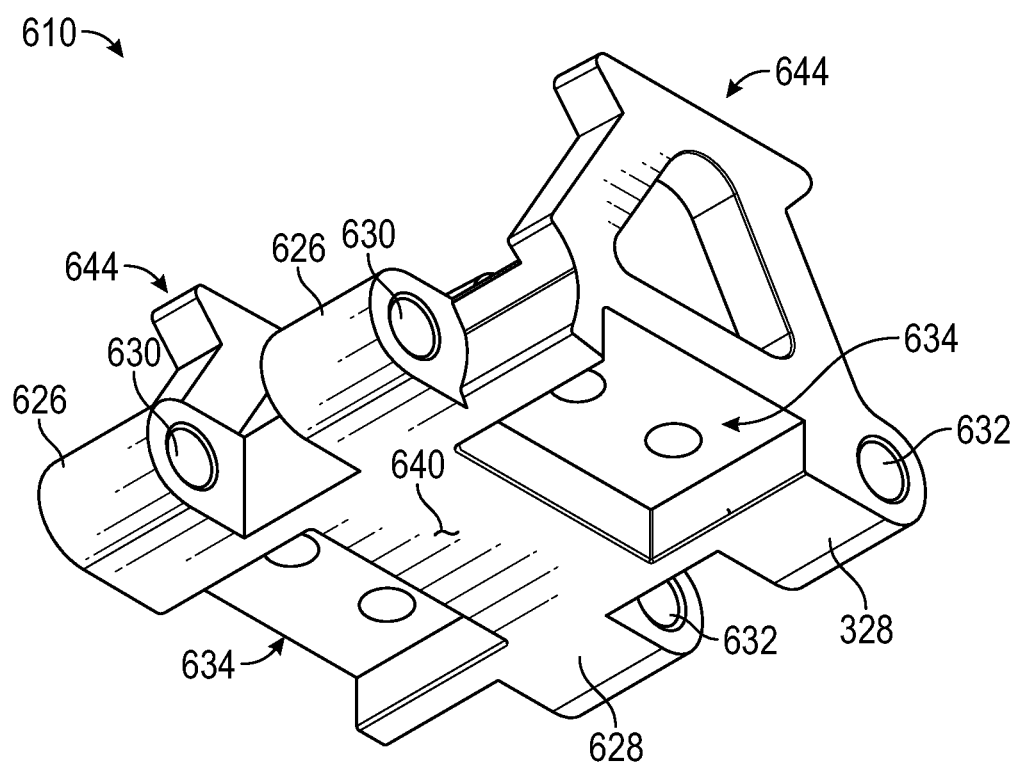
FIG. 46 is a perspective bottom view of the lower link component.

FIGS. 45-48 depict different views of one link component 610 (for the lower assembly 602). FIG. 45 is a perspective top view, FIG. 46 is a perspective bottom view, FIG. 47 is a side view, and FIG. 48 is a top view. The link component 610 may be fabricated from any suitable material having the desired strength and toughness, e.g., aluminum, nylon, a composite material, plastic, or the like.

The figures show the structural features that form the lower assembly leading hinge structure 626 and the lower assembly trailing hinge structure 628 of the lower assembly 602. The leading and trailing hinge structures 626, 628 are offset relative to each other. This offset configuration accommodates the linking/hinging of multiple link components 610 together in series. The leading hinge structure 626 includes a hole 630 formed therein to accommodate a hinge pin, a rod, a bolt, or any suitably configured fastener or coupling element. Similarly, the trailing hinge structure 628 includes a hole 632 formed therein to accommodate another hinge pin, rod, bolt, fastener, coupling element, or the like. A line passing through the center of the hole 630 corresponds to the leading hinge axis of rotation, and a line passing through the center of the hole 632 corresponds to the trailing hinge axis of rotation.

The base of the link component 610 includes slots 634 formed therein. At least one slot 634 is shaped, sized, and configured to receive a portion of a lower support slat 614, and at least one slot 634 is shaped, sized, and configured to receive a bracket utilized for mounting of an endcap 616 (see FIG. 49 and FIG. 50). In accordance with the depicted embodiment, the base of the link component 610 is symmetrical and it has two identical slots 634 formed therein; the end of the lower support slat 614 and the end of the mounting bracket are shaped and sized in a similar manner to fit in the slots 634. The base of the link component 610 may also include any number of threaded holes 636 (labeled in FIG. 48) or inserts to receive threaded fasteners for coupling the lower support slats 614 and the mounting brackets to the link components 610. As shown in FIG. 44, each of the two outermost link components 610 has an endcap 616 and a lower support slat 614 attached thereto, while the center link component 610 has two lower support slats 614 and no endcap 616 attached thereto. For the illustrated implementation, the endcaps 616 are decorative endcaps that cooperate to provide an exposed sidewall surface for the lower assembly 602 when deployed (see FIG. 2 and FIGS. 69-72).

The link component 610 includes a base 638 having an outward-facing surface 640 and an inward-facing surface 642. For the depicted embodiment, edges of the slots 634 terminate at the outward-facing surface 640, and the link component 610 includes a suitably configured and arranged protrusion structure 644 extending in a direction away from the inward-facing surface 642. In other words, the protrusion structure 644 rises above and extends from the inward-facing surface 642. The disclosed implementation of the protrusion structure 644 includes two similarly shaped, sized, and configured protrusions (located at or near the two sides of the link component 610). Referring to FIG. 47, the protrusion structure 644 has a nonuniform side profile shape that is characterized by: a lower region that resembles a truncated triangle; and an upper region that resembles a truncated inverted triangle. The lower region extends upward from the base 638 and transitions from its widest width (the horizontal dimension in FIG. 47) at or near the base 638 to its narrowest width at a neck region 646. The neck region 646 corresponds to the junction between the upper and lower regions of the protrusion structure 644. In this regard, the upper region transitions from its narrowest width at the neck region 646 to its widest width at or near the top surface 648 of the protrusion structure 644. The angled sidewalls of the upper region form at least one chamfered section 650 of the nonuniform side profile shape of the protrusion structure 644.

Figure 49:
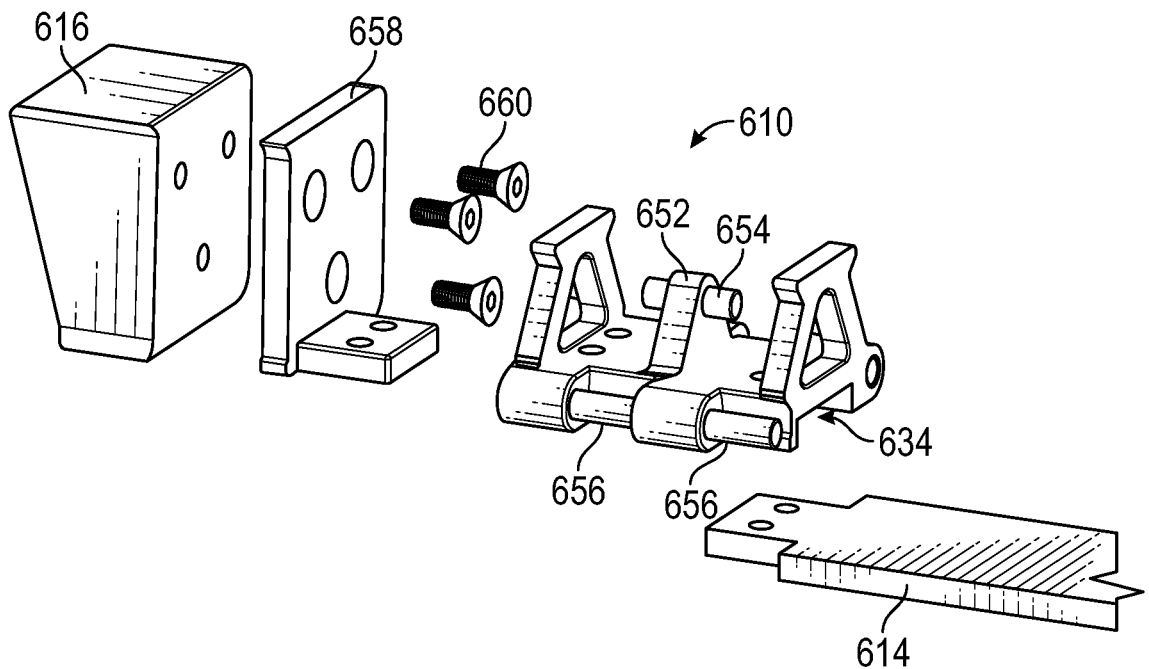
FIGS. 49 and 50 are perspective views that depict assembly steps associated with the fabrication of the lower assembly shown in FIG. 44.
Figure 50:
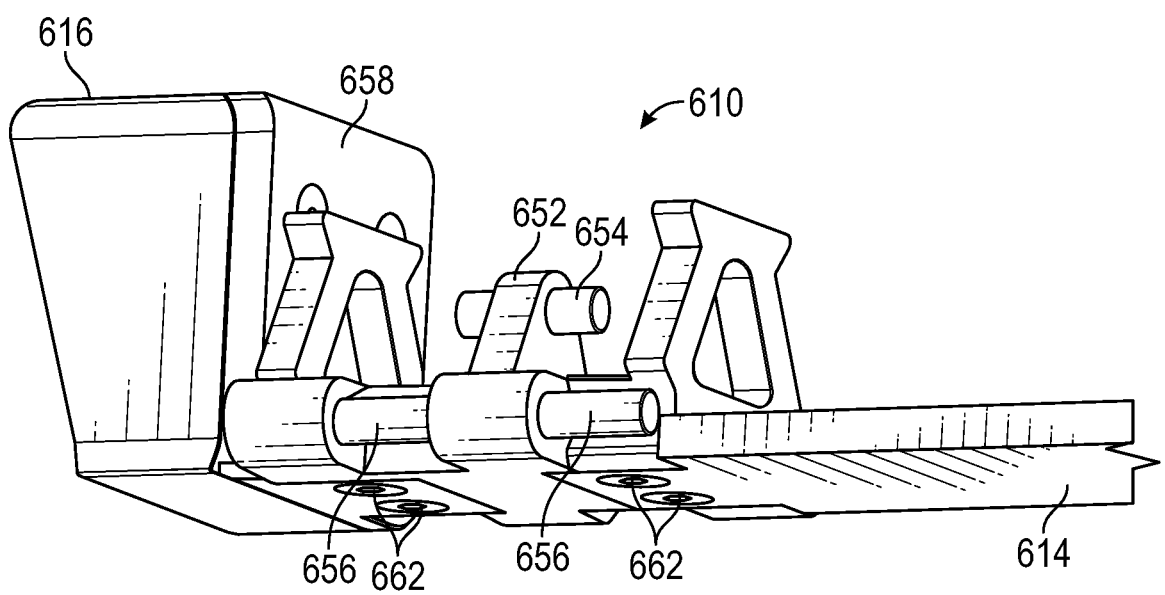

The link component 610 also includes a pin support 652 that is shaped, sized, and positioned to accommodate a guide pin (see FIGS. 49 and 50). As described in more detail below, the guide pin is shaped, sized, configured, and positioned to engage a guide track when the lower assembly 602 is installed for use with a load-bearing support structure. The guide pin travels along a path defined by the guide track, which in turn causes the link component 610 and the corresponding lower assembly 602 to travel in a predetermined and restricted manner.

FIGS. 49 and 50 are perspective views that depict assembly steps associated with the fabrication of the lower assembly 602. FIG. 49 shows a link component 610 after installation of a guide pin 654 into the pin support 652. FIG. 49 also shows a hinge pin 656 installed in one of the two hinge structures of the link component 610. The guide pin 654 and the hinge pin 656 can be coupled to their respective support structures using any technique, e.g., by press fitting, threading, welding, bonding, or the like. It should be appreciated that hinge pins 656 are utilized to connect a plurality of link components 610 together in series. As explained below, hinge pins 656 can also be used to connect link components 610 to hinge structures of a leading edge assembly. FIG. 49 also shows a bracket 658 and threaded fasteners 660 that can be used to secure an endcap 616 to the bracket 658. FIG. 49 also shows an end section of the lower support slat 614, which is shaped and sized to fit within one of the slots 634 of the link component 610.

FIG. 50 depicts one side of a lower assembly 602 after the components shown in FIG. 49 have been installed. Threaded fasteners 662 can be used to attach the lower support slat 614 to the link component 610, and to attach the bracket 658 (with the endcap 616) to the link component 610. With reference to FIG. 44, the opposing side of the lower assembly 602 is similarly constructed, using a second lower support slat 614. The two lower support slats 614 are joined with a third instance of the link component 610.

Figure 51:
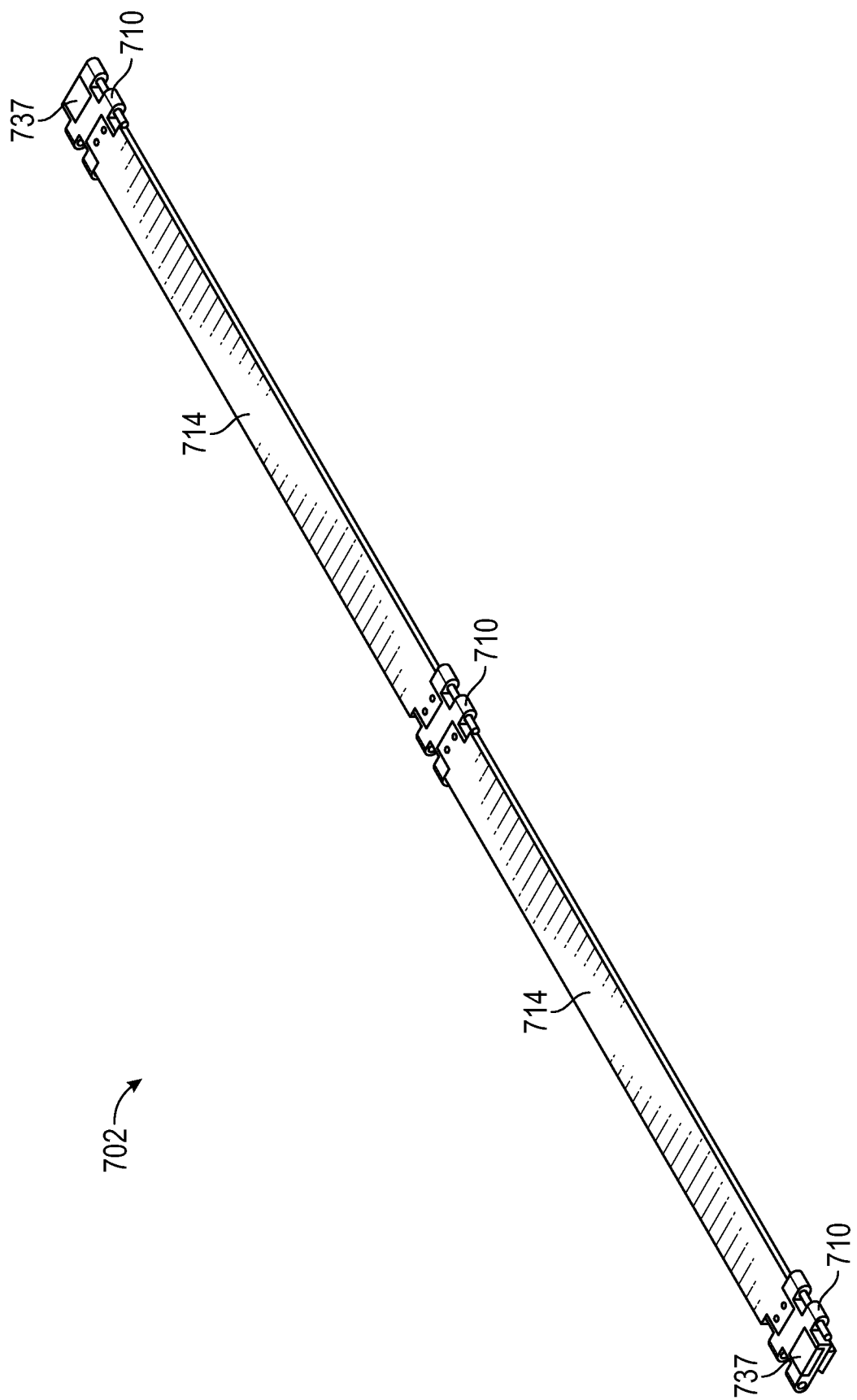
FIG. 51 is a perspective rear view of an upper assembly suitable for use with the second embodiment of the invention as disclosed herein.

FIGS. 51-56 relate to an exemplary embodiment of an upper assembly 702 suitable for use with the disclosed second embodiment. FIG. 51 is a perspective top view of the upper assembly 702, and FIGS. 52-56 depict various components and subassemblies of the upper assembly 702. As explained in more detail below, embodiments of a load-bearing support structure utilize a plurality of these upper assemblies 702 hinged together in series to form a portion of the morphable support mechanism. Some of the structures, features, and functional characteristics of the upper assembly 702 are similar, identical, or equivalent to those described above for the lower assembly 602. For simplicity and brevity, such similar, identical, or equivalent aspects may not be redundantly described in detail here in the context of the upper assembly 702.

The depicted embodiment of the upper assembly 702 includes, without limitation: link components 710; and upper support slats 714 (or equivalent support subcomponents) that, when deployed, cooperate to form a deployable support surface. These main components of the upper assembly 702 are coupled together using appropriate hardware, subcomponents, and/or material.

For this particular embodiment, the link components 710 are identical, and the upper assembly 702 includes three of them (one at or near the left side, one at or near the right side, and one located between the left and right sides). Although FIG. 51 depicts an arrangement that includes three link components 710, alternative embodiments of an upper assembly may include only one upper link component or more than three upper link components, as appropriate for the particular use case, the intended application of the load-bearing support structure, the shape and size of the deployable support surface, and various strength, durability, and load capacity requirements.

As shown and described in more detail below, the link components 710 are suitably configured and arranged to form an upper assembly leading hinge structure and an upper assembly trailing hinge structure. The leading hinge structure is located at or near the leading edge section of the upper assembly, and the trailing hinge structure is located at or near the trailing edge section of the upper assembly. The leading hinge structure of the upper assembly 702 is configured to provide a leading hinge axis of rotation, and the trailing hinge structure of the upper assembly 702 is configured to provide a trailing hinge axis of rotation. When a plurality of upper assemblies 702 are hinged together in series, the hinge structures allow adjacent upper assemblies 702 to rotate relative to each other on the leading and trailing hinge axes of rotation. This hinged arrangement facilitates compact (folded or curved) storage of the upper assembly 702 if so desired.

Figure 52:
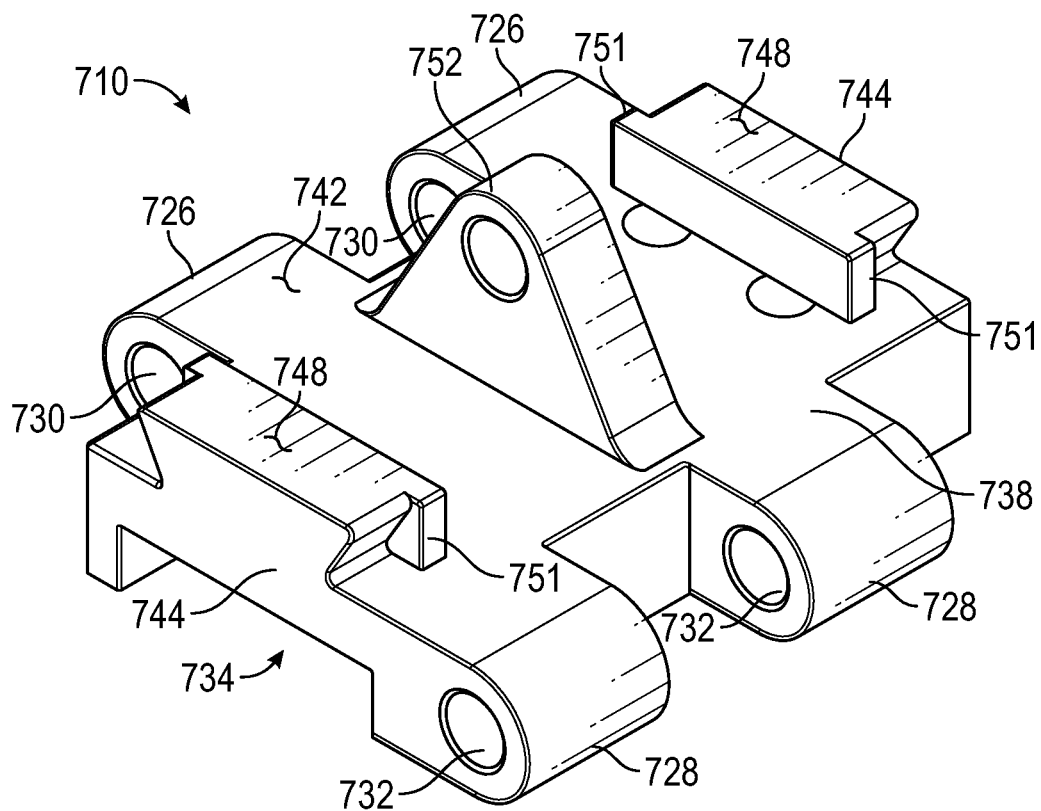
FIG. 52 is a perspective top view of an exemplary embodiment of an upper link component suitable for use with the upper assembly shown in FIG. 51.
Figure 53:
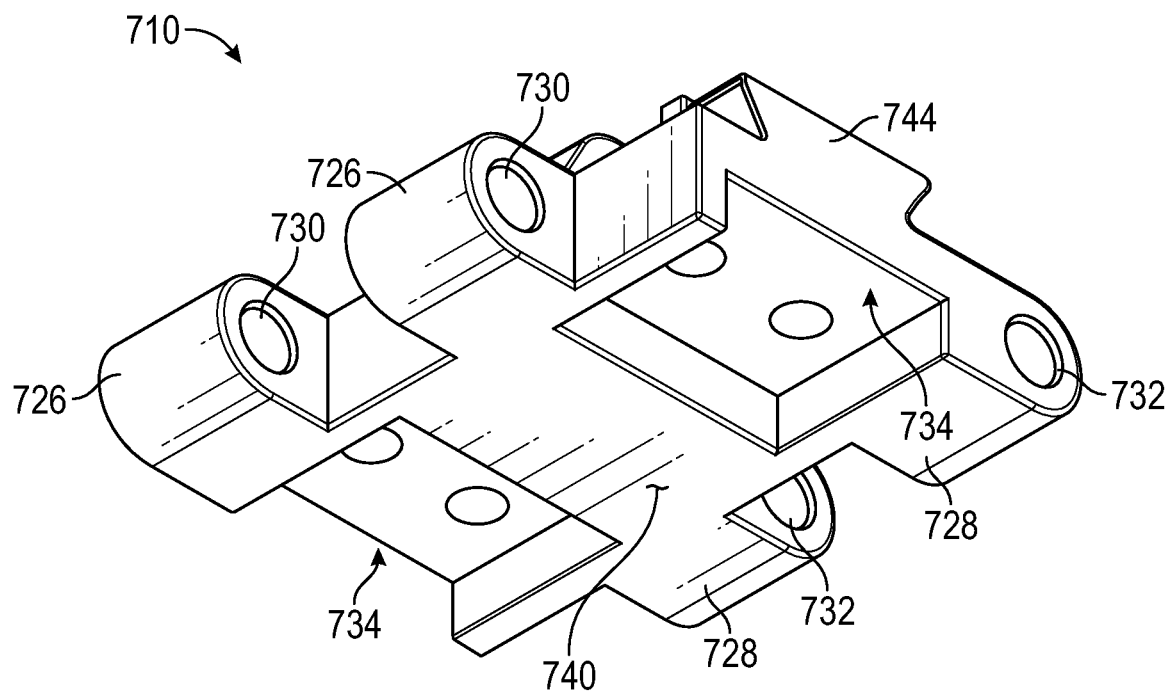
FIG. 53 is a perspective bottom view of the upper link component.
Figure 54:
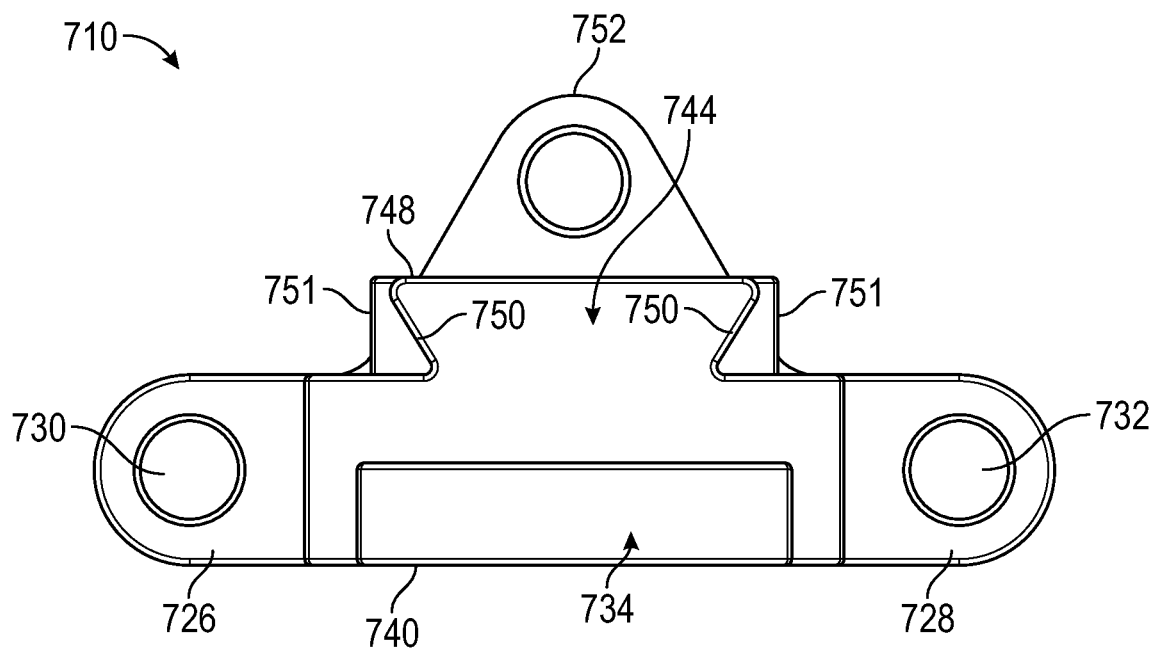
FIG. 54 is a side view of the upper link component.
Figure 55:
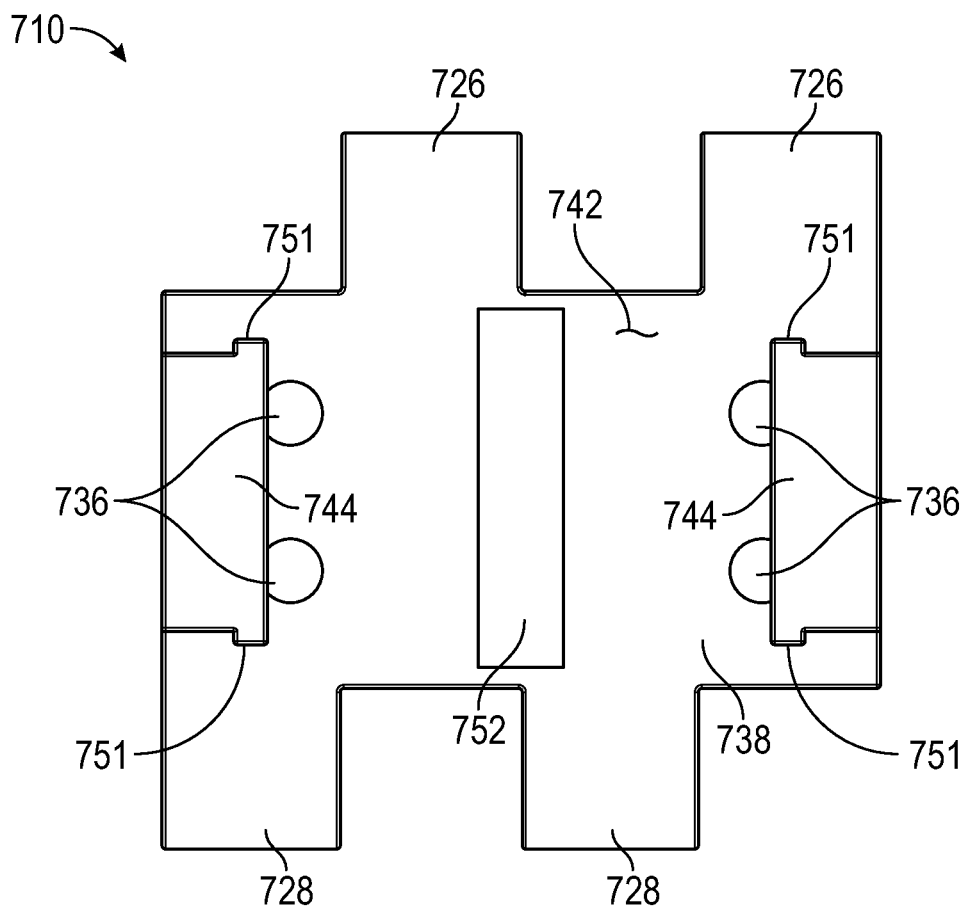
FIG. 55 is a top view of the upper link component.

FIGS. 52-55 depict different views of one link component 710 (for the upper assembly 702). FIG. 52 is a top perspective view, FIG. 53 is a bottom perspective view, FIG. 54 is side view, and FIG. 55 is a top view. The figures show the structural features that form the upper assembly leading hinge structure 726 and the upper assembly trailing hinge structure 728 of the upper assembly 702. The leading and trailing hinge structures 726, 728 are offset relative to each other to accommodate the linking/hinging of multiple link components 710 together in series. The leading hinge structure 726 includes a hole 730 formed therein to accommodate a hinge pin, a rod, a bolt, or any suitably configured fastener or coupling element. Similarly, the trailing hinge structure 728 includes a hole 732 formed therein to accommodate another hinge pin, rod, bolt, fastener, coupling element, or the like. A line passing through the center of the hole 730 corresponds to the leading hinge axis of rotation, and a line passing through the center of the hole 732 corresponds to the trailing hinge axis of rotation.

The base of the link component 710 includes slots 734 formed therein. At least one slot 734 is shaped, sized, and configured to receive a portion of an upper support slat 714, and at least one slot 734 is shaped, sized, and configured to receive a magnetic block utilized for securing a flexible working surface component to the upper assembly (see FIG. 56). In accordance with the depicted embodiment, the base of the link component 710 is symmetrical and it has two identical slots 734 formed therein; the end of the upper support slat 714 and the magnetic block are shaped and sized in a similar manner to fit in the slots 734. The base of the link component 710 may also include any number of threaded holes 736 (labeled in FIG. 55) or inserts to receive threaded fasteners for coupling the upper support slats 714 to the link components 710. As shown in FIG. 51, each of the two outermost link components 710 has a magnetic block 737 and an upper support slat 714 attached thereto, while the center link component 710 has two upper support slats 714 and no magnetic block 737 attached thereto.

The link component 710 includes a base 738 having an outward-facing surface 740 and an inward-facing surface 742. For the depicted embodiment, edges of the slots 734 terminate at the outward-facing surface 740, and the link component 710 includes a suitably configured and arranged protrusion structure 744 extending in a direction away from the inward-facing surface 742. In other words, the protrusion structure 744 rises above and extends from the inward-facing surface 742. The disclosed implementation of the protrusion structure 744 includes two similarly shaped, sized, and configured protrusions (located at or near the two sides of the link component 710). Referring to FIG. 54, the protrusion structure 744 has a nonuniform side profile shape that resembles a truncated inverted triangle. The truncated triangle region of the protrusion structure 744 extends upward from the base 738 and transitions from its narrowest width (the horizontal dimension in FIG. 54) at or near the base 738 to its widest width at or near the top surface 748 of the protrusion structure 744. The angled sidewalls of the truncated triangle region form at least one chamfered section 750 of the nonuniform side profile shape of the protrusion structure 744.

The link component 710 also includes alignment tabs 751, which may be formed as part of the protrusion structure 744. As shown in FIGS. 52-55, the link component 710 includes four alignment tabs 751, which are located interior of the protrusions. Each alignment tab 751 provides an outward-facing bearing surface that restricts side-to-side movement of cooperating link components 610. Moreover, each trapezoidal shaped protrusion of the link component 710 acts as a keystone when the upper assembly 702 mates with the lower assembly 602 (see FIG. 76 and FIG. 77). When the assemblies 602, 702 are joined together in this manner, the alignment tabs 751 provide an alignment assist to the lower link components 610, and inhibit side-to-side shifting of mated link components 610, 710.

The link component 710 also includes a pin support 752 that is shaped, sized, and positioned to accommodate a guide pin (see FIG. 56) that engages a guide track when the upper assembly 702 is installed for use with a load-bearing support structure. The guide pin travels along a path defined by the guide track, which in turn causes the link component 710 and the corresponding upper assembly 702 to travel in a predetermined and restricted manner.

Figure 56:
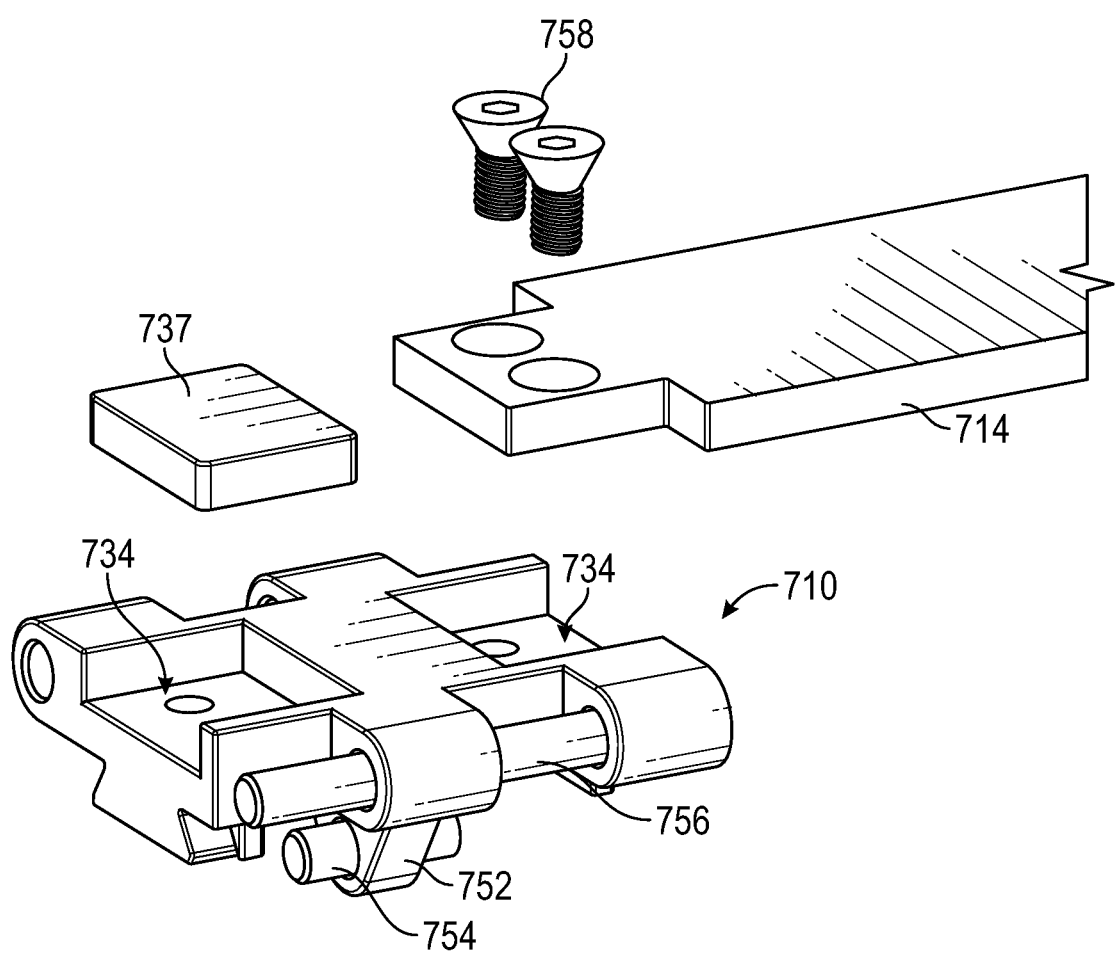
FIG. 56 is an exploded perspective view that depicts assembly steps associated with the fabrication of the upper assembly shown in FIG. 51.

FIG. 56 is an exploded perspective view that depicts assembly steps associated with the fabrication of the upper assembly 702. FIG. 56 shows a link component 710 after installation of a guide pin 754 into the pin support 752. FIG. 56 also shows a hinge pin 756 installed in one of the two hinge structures of the link component 710. The hinge pins 756 are utilized to connect a plurality of link components 710 together in series. As explained below, hinge pins 756 can also be used to connect link components 710 to hinge structures of a leading edge assembly. FIG. 49 also shows a magnetic block 737 that fits within one of the slots 734. The magnetic block 737 may be secured to the link component 710 by way of press fitting, a bonding or adhesive material, a fastener, snap fitting, or the like. FIG. 56 also shows an end section of the upper support slat 714, which is shaped and sized to fit within one of the slots 734 of the link component 710. Threaded fasteners 758 can be used to attach the upper support slat 714 to the link component 710.

FIG. 51 depicts the upper assembly 702 after the components shown in FIG. 56 have been installed. The link components 710 at the left and right sides of the upper assembly 702 are each coupled to one upper support slat 714 and one magnetic block 737. The two upper support slats 714 are joined with a third instance of the link component 710 (which is void of any magnetic blocks 737).

Figure 57:
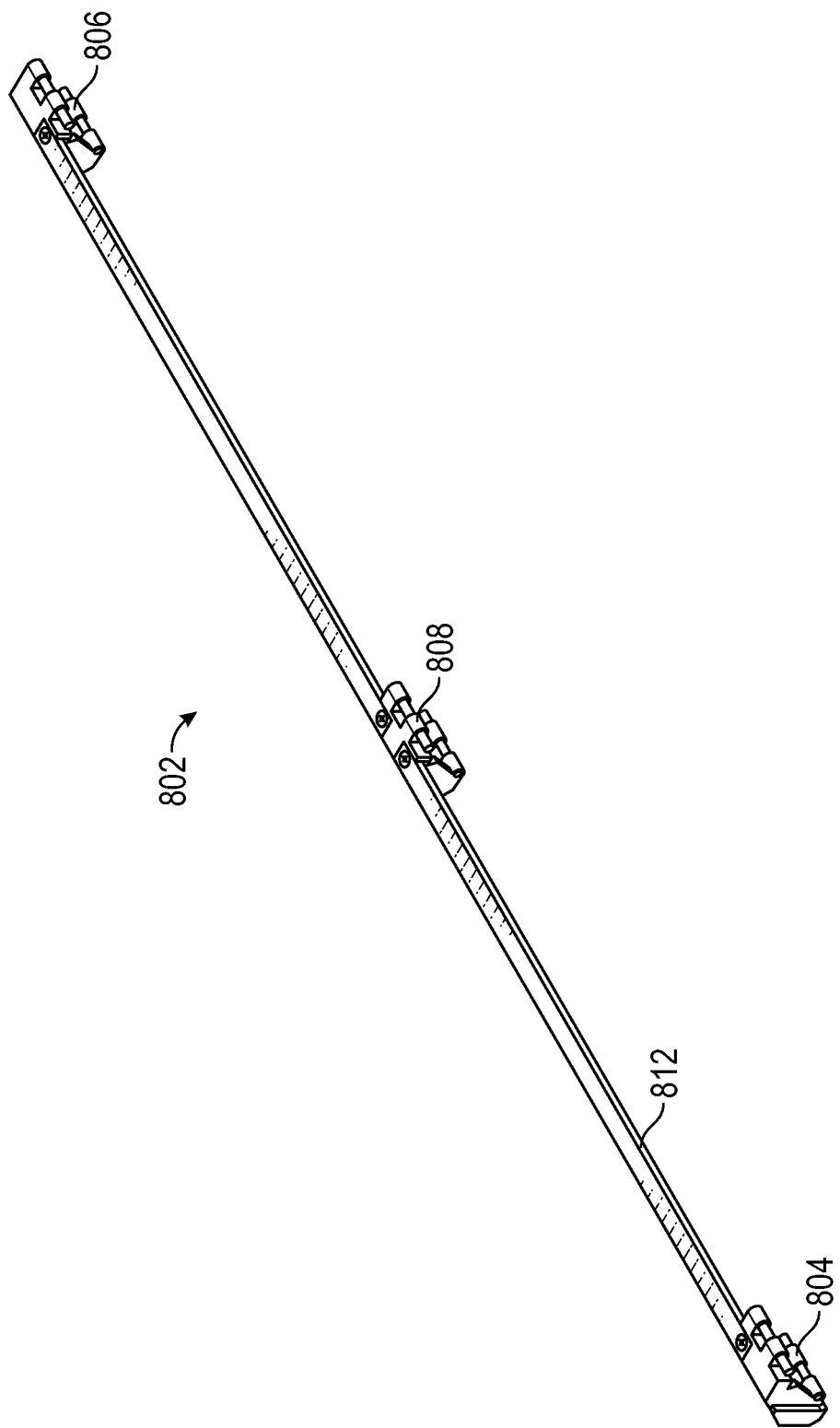
FIG. 57 is a perspective rear view of a leading edge assembly suitable for use with the second embodiment of the invention as disclosed herein.

FIGS. 57-64 relate to an exemplary embodiment of a leading edge assembly 802 suitable for use with the disclosed second embodiment. FIG. 57 is a perspective rear view of the leading edge assembly 802, and FIGS. 58-64 depict various components and subassemblies of the leading edge assembly 802. Some of the structures, features, and functional characteristics of the leading edge assembly 802 are similar, identical, or equivalent to those described above for the lower assembly 602 and/or the upper assembly 702. For simplicity and brevity, such similar, identical, or equivalent aspects may not be redundantly described in detail here in the context of the leading edge assembly 802.

The depicted embodiment of the leading edge assembly 802 includes, without limitation: a right leading edge link component 804; a left leading edge link component 806; a middle leading edge link component 808; a mounting bracket assembly 812; and at least one trim component (not shown in FIG. 57, but shown in FIGS. 69-72) that includes or is fabricated from decorative material. These main components of the leading edge assembly 802 are coupled together using appropriate hardware, subcomponents, and/or material. Although FIG. 57 depicts an arrangement that includes three leading edge link components, alternative embodiments of a leading edge assembly may include only one leading edge link component or more than three leading edge link components, as appropriate for the particular use case, the intended application of the load-bearing support structure, the shape and size of the deployable support surface, and various strength, durability, and load capacity requirements.

As shown and described in more detail below with reference to FIGS. 65-68, the link components 804, 806, 808 are suitably configured and arranged to form a top hinge structure and a bottom hinge structure for the leading edge assembly 802. The top hinge structure is arranged and configured for compatibility with the link components 710 of an upper assembly 702, and the bottom hinge structure is arranged and configured for compatibility with the link components 810 of a lower assembly 602. These hinge structures facilitate rotation of the corresponding upper and lower assemblies 702, 602 about the respective hinge axes of rotation defined by the hinge structures.

Figure 58:
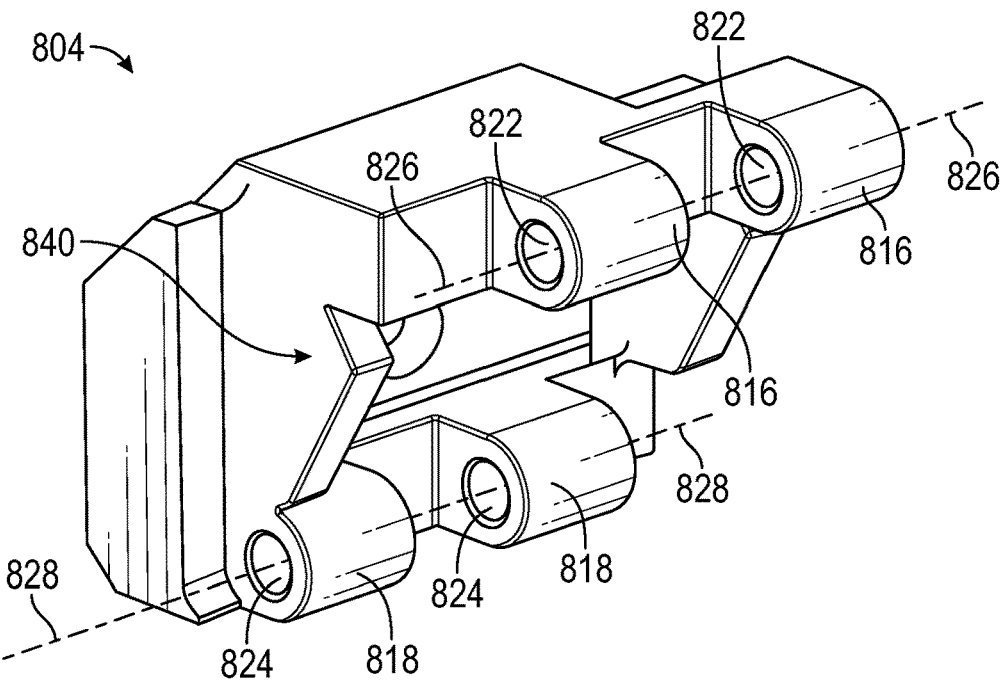
FIG. 58 is a perspective rear review of an exemplary embodiment of a leading edge link component suitable for use with the leading edge assembly shown in FIG. 57.
Figure 59:
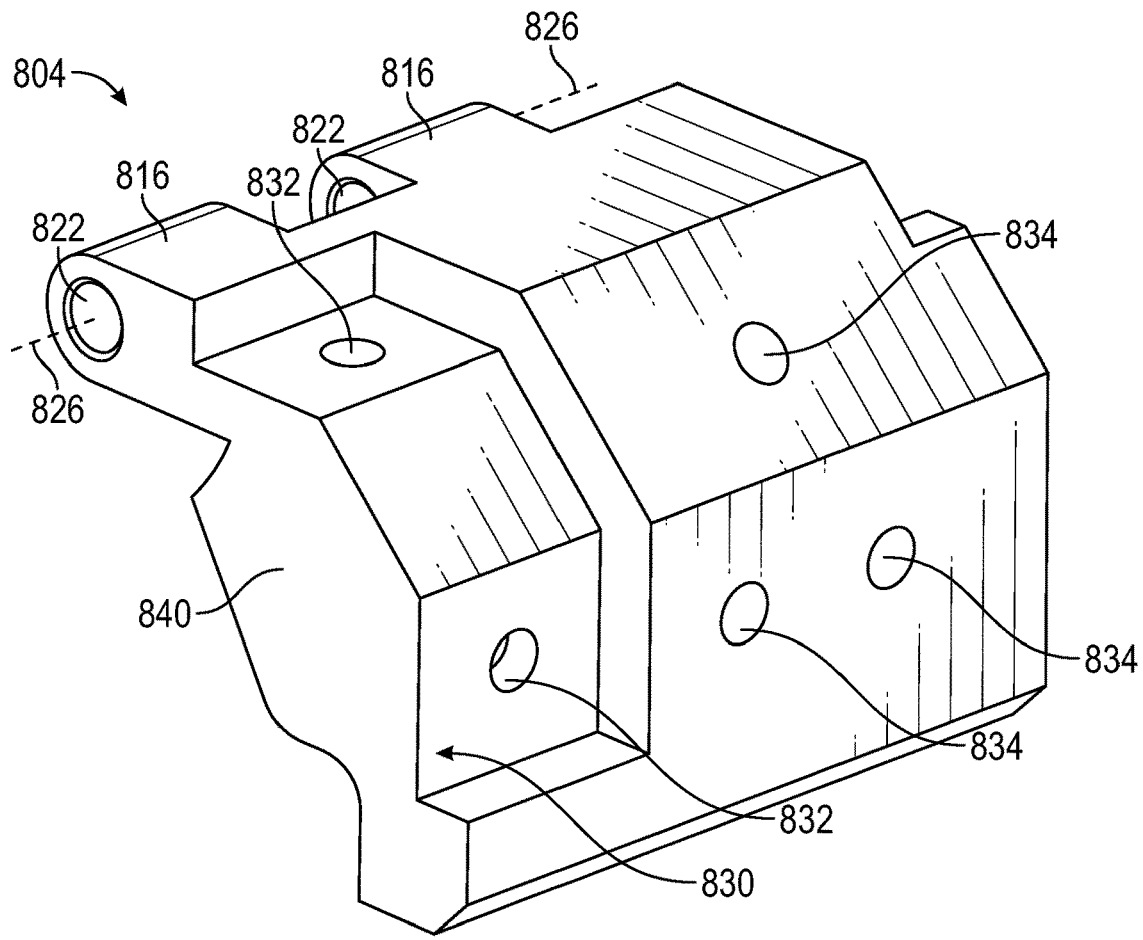
FIG. 59 is a perspective front view of the leading edge link component.
Figure 60:
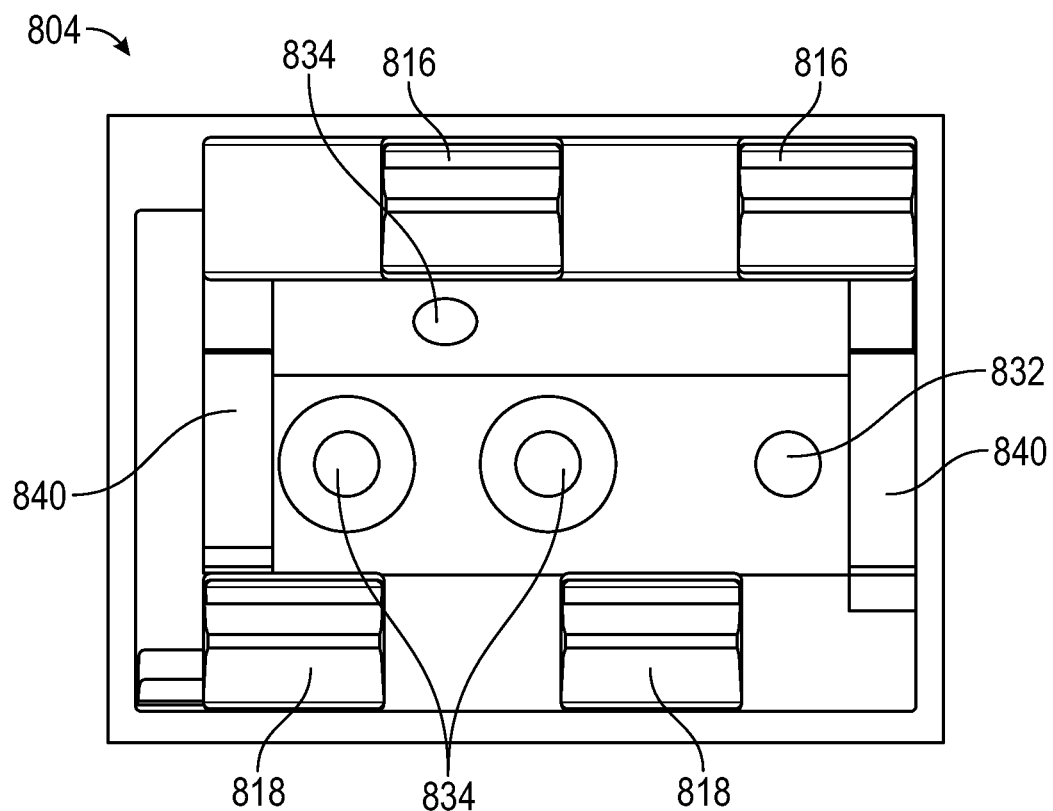
FIG. 60 is a rear view of the leading edge link component.
Figure 61:
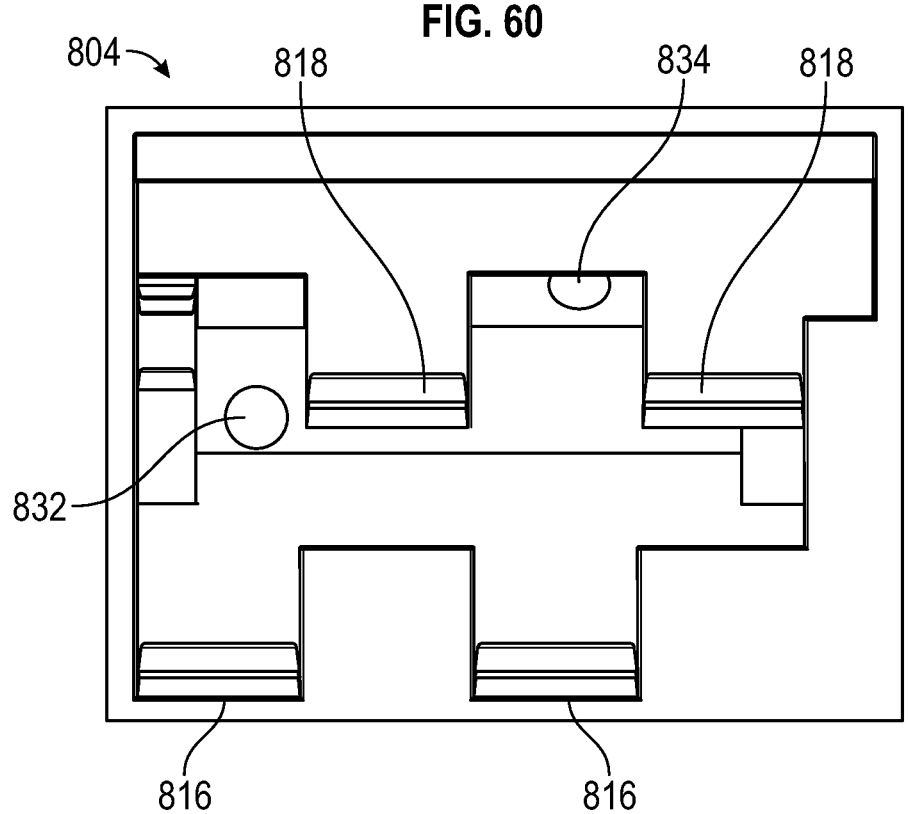
FIG. 61 is a bottom view of the leading edge link component.

FIGS. 58-61 depict different views of the right leading edge link component 804. The left leading edge link component 806 is similarly configured, with certain features and structures rearranged to accommodate the asymmetric nature of the right and left leading edge link components 804, 806. FIG. 58 is a rear perspective view, FIG. 59 is a front perspective view, FIG. 60 is a rear view, and FIG. 61 is a bottom view. The figures show the structural features that form the top hinge structure 816 and the bottom hinge structure 818 of the leading edge assembly 802. The top and bottom hinge structures 816, 818 are offset relative to each other to accommodate the linking/hinging of the upper and lower assemblies 702, 602. The top hinge structure 816 includes a hole 822 formed therein to accommodate a hinge pin, a rod, a bolt, or any suitably configured fastener or coupling element. Similarly, the bottom hinge structure 818 includes a hole 824 formed therein to accommodate another hinge pin, rod, bolt, fastener, coupling element, or the like. A line passing through the center of the hole 822 corresponds to a top hinge axis of rotation 826, and a line passing through the center of the hole 824 corresponds to a bottom hinge axis of rotation 828.

The illustrated embodiment of the link component 804 includes a contoured recess 830 formed therein. The contoured recess 830 curves from the top to the back of the link component 804, as shown in FIG. 59. The contoured recess 830 is shaped, sized, and positioned to receive an end section of the mounting bracket assembly 812 (see FIG. 64). To this end, the link component 804 may include any number of threaded holes 832 or threaded inserts to facilitate attachment to the mounting bracket assembly 812. The link component 804 may also include any number of additional threaded inserts, threaded holes, and/or through holes 834 to facilitate attachment of other components during assembly of the resulting support mechanism, e.g., trim pieces, mounting hardware, a handle or knob, a decorative outer surface sheet, or the like. Although not utilized in the illustrated embodiment, the sides of the link component 804 can be suitably configured in a way that allows it to receive a decorative endcap.

The link component 804 includes structural interlock features 840 for the leading edge assembly 802. Notably, the structural interlock features 840 are shaped, sized, arranged, and configured to cooperate with the protrusion structure 644 of a link component 610 of the lower assembly 602 and/or to cooperate with the protrusion structure 744 of a link component 710 of the upper assembly 702. For the illustrated embodiment, the structural interlock features 840 have a side profile shape that matches the side profile shape of the protrusion structure 644 (a triangle shaped notch receives the top section of the protrusion structure 644, a triangle shaped point receives the neck region 646 of the protrusion structure 644, and the long sloped wall follows the angled sidewall of the protrusion structure 644). This interlocking arrangement holds the link component 610 in position, and inhibits rotation of the link component 610 relative to the link component 804 about the hinge axis. FIGS. 66 and 67 depict link components 610 mated with counterpart link components 804, 806, 808.

Figure 62:
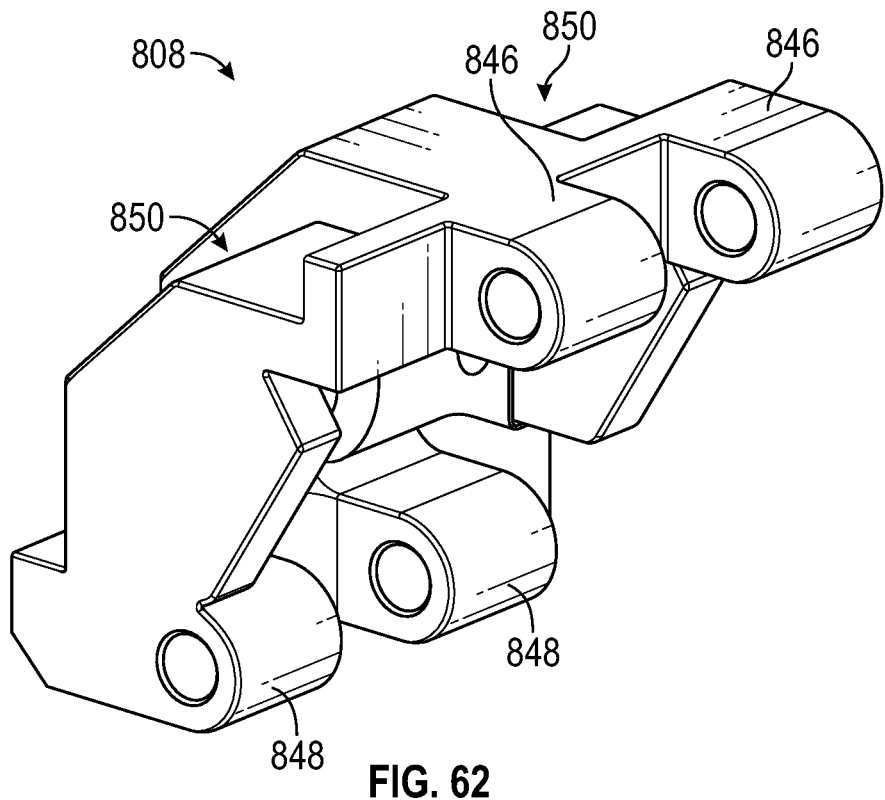
FIG. 62 is a perspective rear view of an exemplary embodiment of a middle leading edge link component suitable for use with the leading edge assembly shown in FIG. 57.
Figure 63:
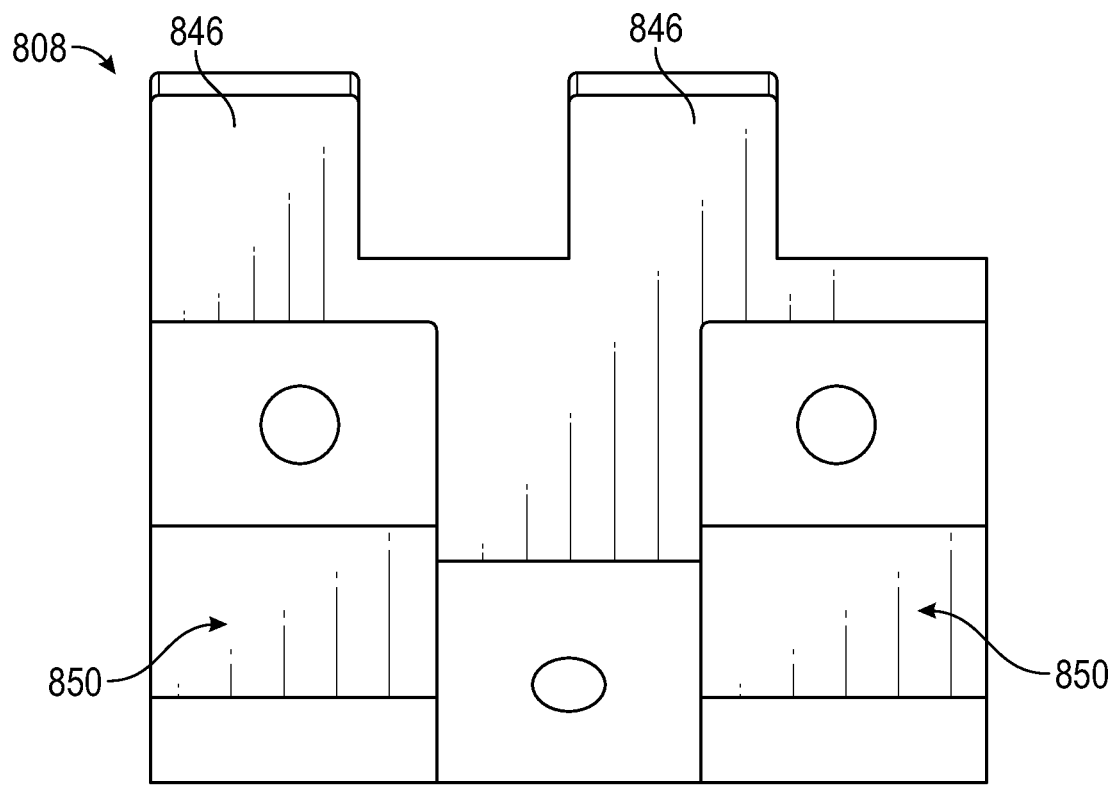
FIG. 63 is a top view of the middle leading edge link component.

FIG. 62 is a perspective rear view of an embodiment of the middle leading edge link component 808, and FIG. 63 is a top view of the link component 808. The link component 808 shares many of the features, structures, and functionality of the link component 804, and those common aspects will not be redundantly described in detail here. For example, the link component 808 includes: a top hinge structure 846 that provides the top hinge axis of rotation 826; a bottom hinge structure 848 that provides the bottom hinge axis of rotation 828; contoured recesses 850 to receive mounting bracket assemblies 812; and structural interlock features 852 that cooperate with structural features of the link component 610 of the lower assembly 602. Notably, the middle leading edge link component 808 includes two contoured recesses 850 to facilitate joining two mounting bracket assemblies 812 together, as shown in FIGS. 57 and 65-68.

Figure 64:
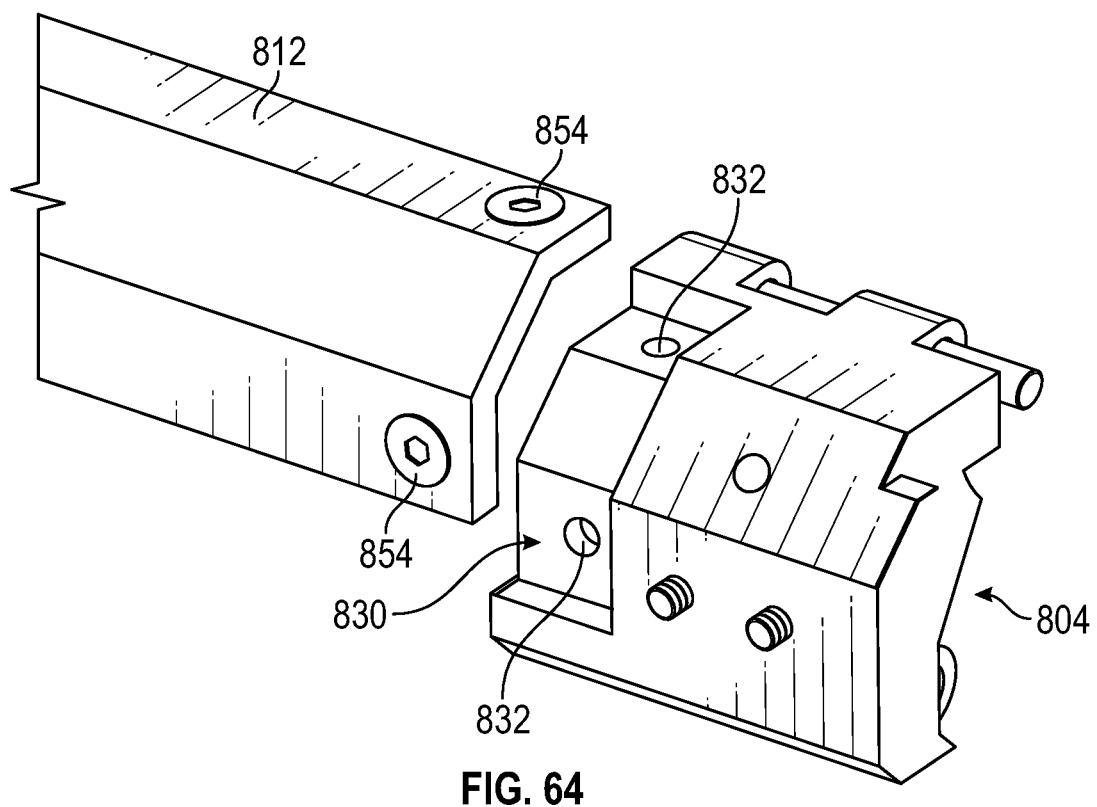
FIG. 64 is a perspective front view that depicts fabrication of the leading edge assembly shown in FIG. 57.

With reference to FIG. 57 and FIG. 64, the leading edge assembly 802 is fabricated by coupling two mounting bracket assemblies 812 to the link components 804, 806, 808 in the arrangement shown in FIG. 57. Threaded fasteners 854 can be used to secure the ends of the mounting bracket assemblies 812 to their respective link components. FIGS. 65-70 are perspective views that depict fabrication steps that involve the leading edge assembly 802. FIG. 65 shows the leading edge assembly 802 and a lower assembly 602 before they are coupled together. For visibility, one of the endcaps 616 is missing from the depicted lower assembly 602. FIG. 66 shows the leading edge assembly 802 and the lower assembly 602 coupled together. To this end, the leading hinge structures 626 of the lower assembly 602 mate with the bottom hinge structures 818 of the leading edge assembly 802, and are held together using appropriate hinge pins, bolts, or rods. FIG. 67 depicts the state after introducing an upper assembly 702. To this end, the leading hinge structures 626 of the upper assembly 702 mate with the top hinge structures 816 of the leading edge assembly 802, and are held together using appropriate hinge pins, bolts, or rods. When assembled in this manner, the trailing sections of the protrusion structures 644 mate and engage with the leading sections of the protrusion structures 744, which inhibits rotation of the upper assembly 702 relative to the lower assembly 602 about the hinge axis. FIG. 68 depicts the state after attaching the second endcap 616 to the lower assembly 602.

Figure 69:
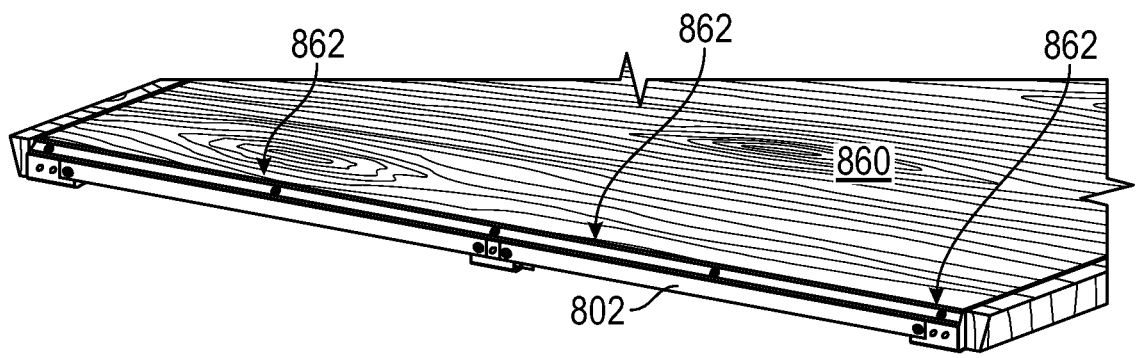

FIG. 68 depicts three final link components 610 of three respective chain assemblies (created with a plurality of lower assemblies 602 linked together in series), and three final link components 710 of three respective chain assemblies (created with a plurality of upper assemblies 702 linked together in series). FIG. 69 is a front perspective view that shows the leading edge assembly 802 after a number of lower assemblies 602 and a number of upper assemblies 702 have been coupled together. FIG. 69 shows the components in a deployed state, after the upper and lower assemblies 702, 602 have been coupled to each other in a load-bearing configuration.

Figure 70:
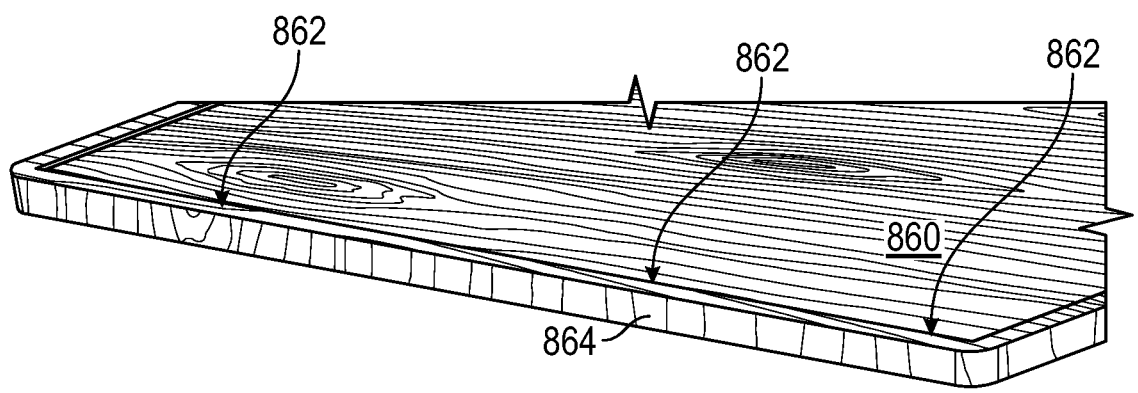

FIG. 69 also shows a portion of a flexible working surface component 860 overlying the deployed upper assemblies 702. The flexible working surface component 860 can be fabricated from a thin, pliable, sheet of metal having an outer layer of decorative material applied thereto. Alternatively or additionally, the flexible working surface component 860 can be fabricated from any flexible and bendable material that can be coated, painted, or otherwise processed to provide an appropriate decorative appearance, pattern, or graphic on its outer surface. In accordance with the illustrated embodiment, a leading section 862 of the flexible working surface component 860 is coupled to the leading edge assembly 802. The leading section 862 can be affixed to the leading edge assembly 802 using one or more of: a mounting bracket, fasteners, a clamping arrangement, a bonding agent, an adhesive, or the like. FIG. 70 depicts a state after attachment of a front trim component 864 to the leading edge assembly 802. In certain embodiments, the front trim component 864 is secured to the leading edge assembly 802 using fasteners that pass through the holes 834 located in the link components 804, 806, 808. When the support mechanism is deployed, at least some of the flexible working surface component 860 overlies a number of deployed upper assemblies 702 to form a deployed load-bearing working surface. When the support mechanism is retracted for storage, at least a portion of the flexible working surface component separates from the upper assemblies 702 for storage in response to concerted movement of the upper and lower assemblies 702, 602 along a stowage path. In the exemplary embodiment disclosed here, the magnetic blocks 737 of the upper assemblies 702 magnetically couple the bottom of the flexible working surface component 860 to the upper assemblies 702 when the support mechanism is deployed. The magnetic couplings are broken in response to retraction of the support mechanism, which facilitates separation of the flexible working surface component 860 for compact storage if so desired. In this regard, FIGS. 76-79 show a section of the flexible working surface component 860 separated from the underlying upper assemblies 702.

Figure 71:
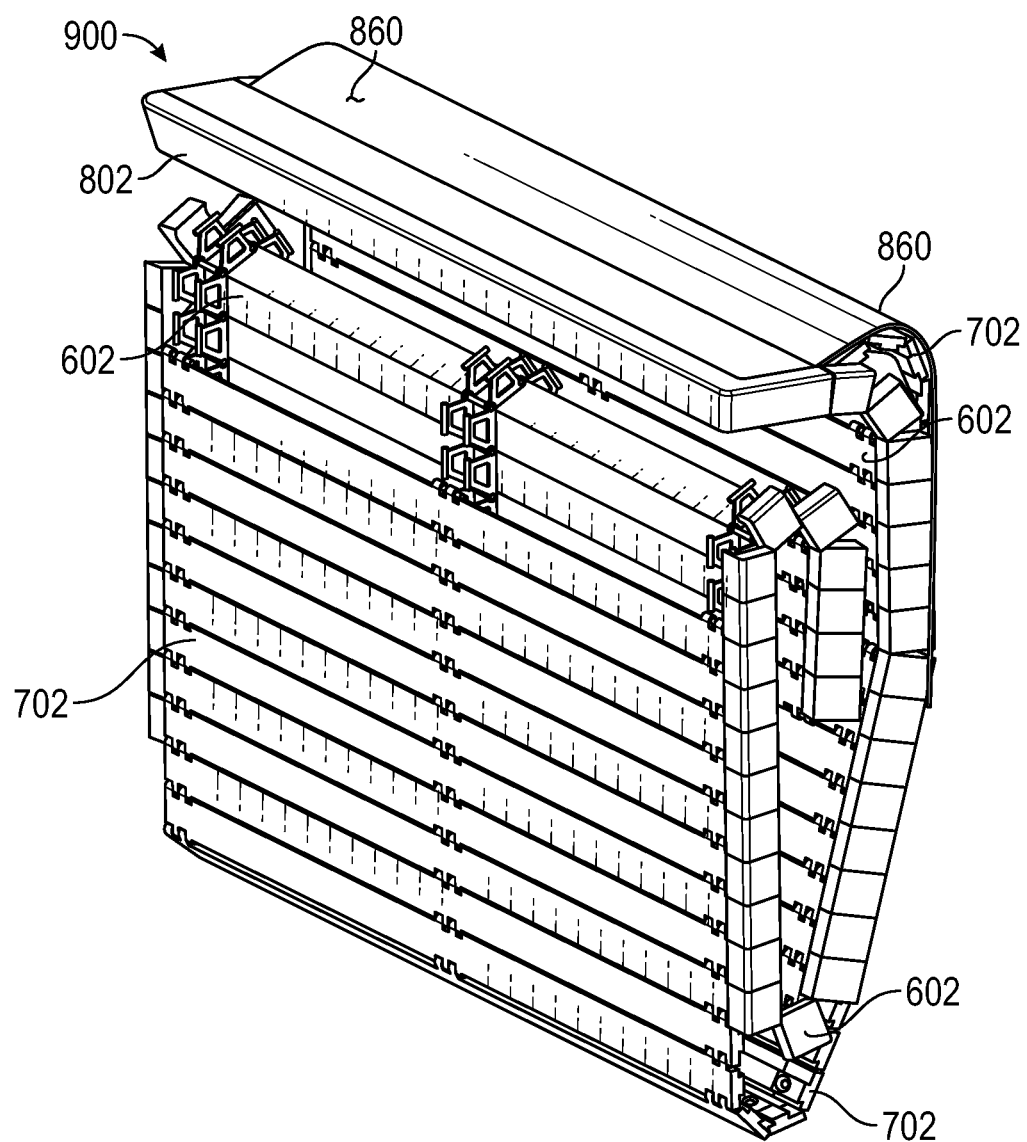
FIG. 71 is a perspective front view of an embodiment of a load-bearing support mechanism in a stowed state.
Figure 72:
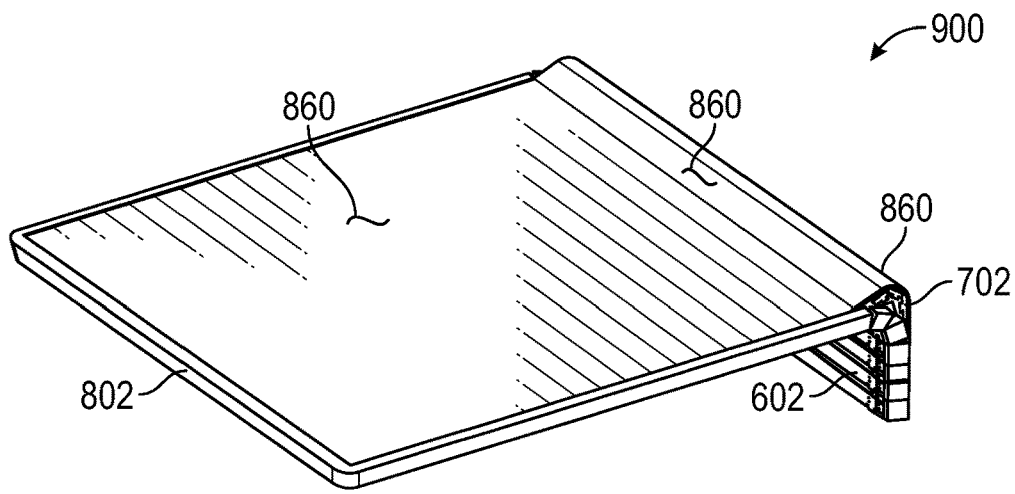
FIG. 72 is a perspective front view of a portion of the load-bearing support mechanism in a deployed state.

FIG. 71 and FIG. 72 depict an exemplary embodiment of a morphable load-bearing support mechanism 900 that uses a plurality of the lower assemblies 602, a plurality of the upper assemblies 702, and the leading edge assembly 802. The support mechanism 900 is consistent with, and can be utilized with, the load-bearing support structure 100 shown in FIG. 1 and FIG. 2. For simplicity and case of description, the support mechanism 900 is depicted without any surrounding structure or associated storage unit.

The support mechanism 900 includes a plurality of upper assemblies 702 hinged together in series, and a plurality of lower assemblies 602 hinged together in series. Referring to FIGS. 76-79, the linked arrangement of upper assemblies 702 terminates with a final upper assembly 702-1, and the linked arrangement of lower assemblies 602 terminates with a final lower assembly 602-1. The final assemblies 602-1, 702-1 are coupled to the leading edge assembly 802 by way of their respective final link components 610, 710. More specifically, the link components 610 of the final lower assembly 602-1 and the link components 710 of the final upper assembly 702-1 are coupled to the link components 804, 806, 808 of the leading edge assembly 802.

When assembled and deployed in the manner described herein, the lower link components 610 and the upper link components 710 are configured to function as chain links hinged together in series. The illustrated embodiment includes three upper chain assemblies (left, right, and middle) formed by the upper link components 710, and three lower chain assemblies (left, right, and middle) formed by the lower link components 610. Each upper chain link, which is realized with the upper link components 710, includes outward-facing structural features and inward-facing structural features opposing its outward-facing structural features. Likewise, each lower chain link, which is realized with the lower link components 610, includes outward-facing structural features and inward-facing structural features opposing its outward-facing structural features.

The inward-facing structural features of the upper link components 710 (e.g., the protrusion structures 744) and the inward-facing structural features of the lower link components 610 (e.g., the protrusion structures 644) are configured to releasably couple together in response to concerted movement of the upper and lower chain assemblies along a predefined deployment path. Conversely, the inward-facing structural features of the upper link components 710 and the inward-facing structural features of the lower link components 610 are configured to separate and decouple from each other in response to concerted movement of the upper and lower chain assemblies along a predefined stowage path.

A deployed number of the upper assemblies 702 cooperate to form a deployable support surface of the support mechanism 900. More specifically, the upper support slats 714 combine to form the deployable support surface (which may be covered by the flexible working surface component 860). When the upper and lower chain assemblies are deployed and coupled together in the manner described herein, the corresponding protrusion structures 744, 644 interlock with one another to be self-supporting. As a result, the deployable working surface is load-bearing when placed in the deployed position. In accordance with the depicted embodiment, the deployed section of the support mechanism 900 accommodates loading on the working surface and loading of the structure below/opposite the working surface.

Figure 76:
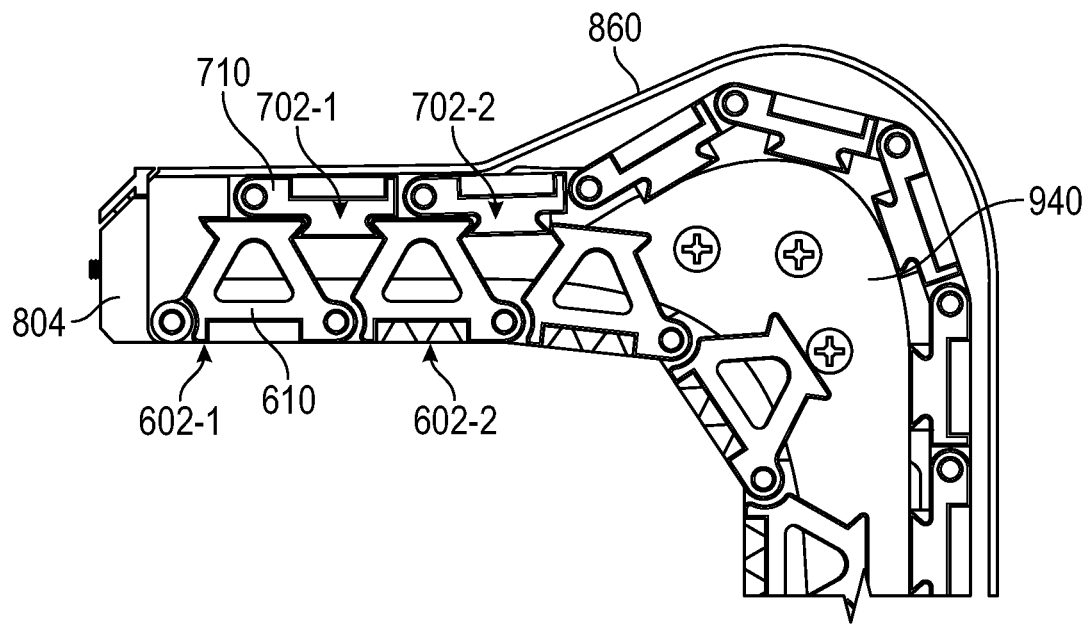
FIGS. 76 and 77 are side views of two chain assemblies, showing how the chain assemblies interlock with each other during deployment.
Figure 77:
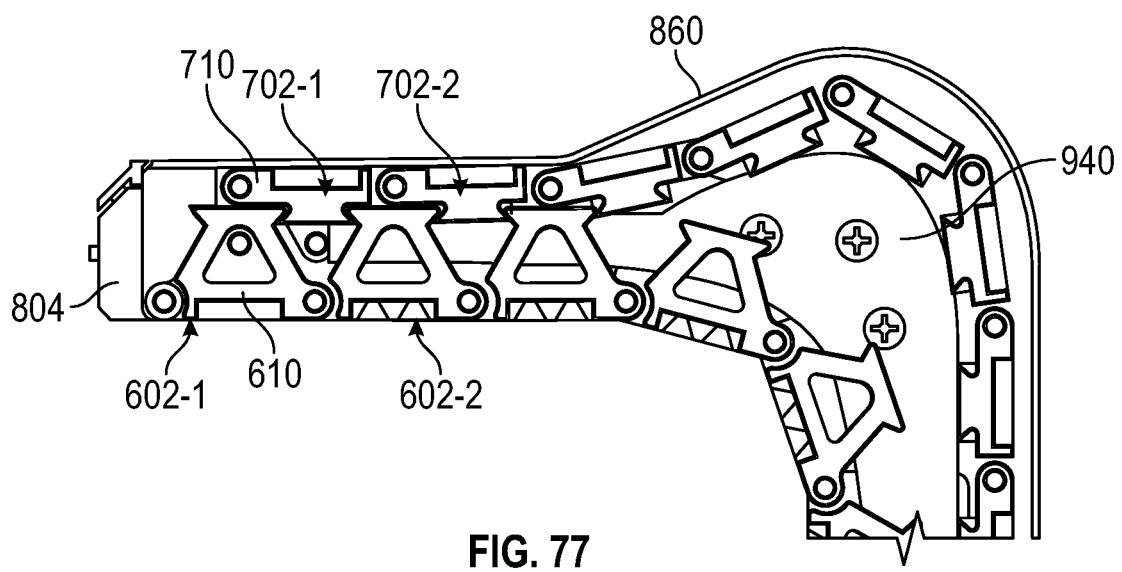

FIG. 76 and FIG. 77 demonstrate how the upper and lower link components 710, 610 cooperate with one another to transition between a decoupled and separated state and a coupled and interlocked state. For the sake of clarity and simplicity, FIG. 76 and FIG. 77 do not show some of the components that appear in other figures. FIG. 76 is a side view corresponding to a first position, which may represent an initial state before deployment of the morphable support mechanism 900. FIG. 77 is a side view corresponding to a second position, which may represent an intermediate state after deployment begins.

In FIG. 77, the protrusion structure of the upper assembly 702-1 is fully coupled to and interlocked with the protrusion structures of the lower assemblies 602-1, 602-2. More specifically, the protrusion structures of the two adjacent lower link components 610 flank and interlock with the protrusion structure of one upper link component 710. Similarly, the protrusion structure of the lower assembly 602-2 is flanked by the protrusion structures of the two upper assemblies 702-1, 702-2. As explained above, the chamfered sections and features of the protrusion structures engage, mate, and interlock with one another when the support mechanism 900 is in the deployed state. This mating arrangement is desirable to maintain the upper and lower assemblies 702, 602 in place, and to inhibit rotation of the assemblies 702, 602 relative to one another.

The sequence of FIGS. 76 and 77 demonstrates how the protrusion structures of the upper and lower assemblies 702, 602 dynamically interact and engage in response to concerted movement of the upper and lower assemblies 702, 602 along a predefined deployment path. The reverse sequence of FIGS. 76 and 77 demonstrates how the protrusion structures of the upper and lower assemblies 702, 602 dynamically interact and disengage in response to concerted movement of the upper and lower assemblies 702, 602 along a predefined stowage path. For this particular embodiment, the deployment and stowage paths follow a common path, but in opposite directions. As shown in FIGS. 76 and 77, movement of the upper and lower assemblies 702, 602 along the deployment path causes them to move closer together, and causes the lower link components 610 to pivot and move into alignment with two flanking instances of the upper link components 710. Continued movement along the deployment path brings the protrusion structures into the fully coupled state.

Referring to FIGS. 73-75, 78, and 79, the support mechanism 900 cooperates with a guide track arrangement having at least one guide track 910. The disclosed embodiment includes three guide tracks 910—one for the left side chain assemblies, one for the right side chain assemblies, and one for the middle chain assemblies. The guide track arrangement is suitably configured to receive the upper and lower assemblies 702, 602, and is designed to accommodate sliding movement of the upper and lower assemblies 702, 602 as required for deployment and stowage of the morphable support mechanism 900. More specifically, each guide track 910 is configured to receive an upper chain assembly (formed with the upper link components 710) and a lower chain assembly (formed with the lower link components 610), and each guide track 910 accommodates sliding movement of the chain assemblies as needed. To this end, each guide track 910 is shaped, sized, and arranged in a desired manner to define and provide the predefined deployment and stowage paths for the upper and lower assemblies 702, 602.

Figure 78:
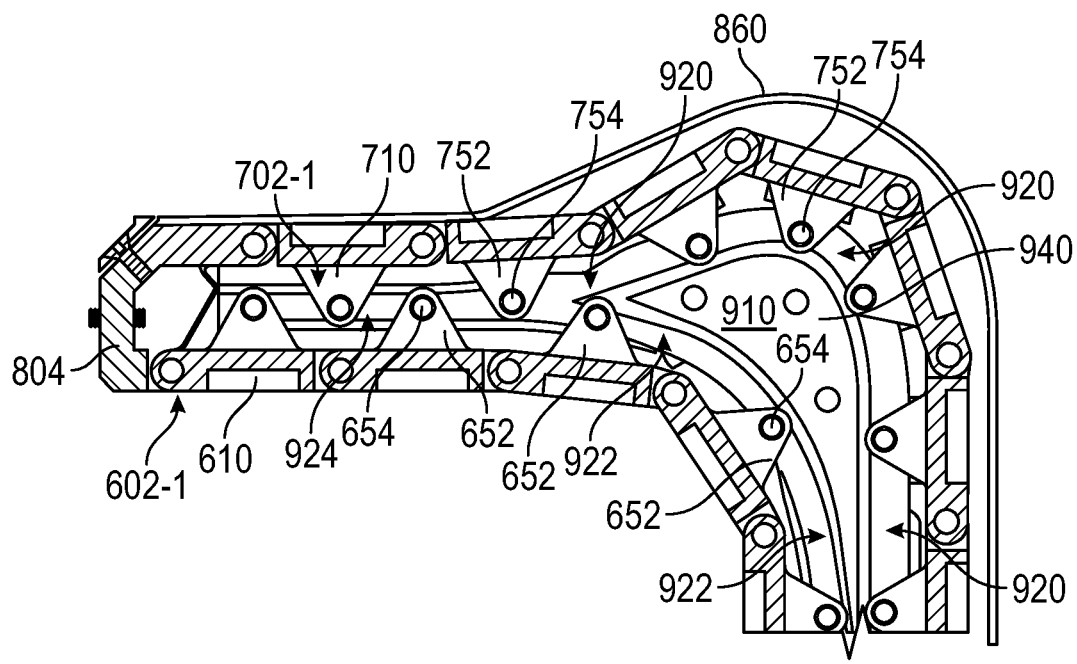
FIGS. 78 and 79 are cross-sectional side views of the two chain assemblies, with certain components removed to show the interaction between the chain assemblies and a guide track.
Figure 79:
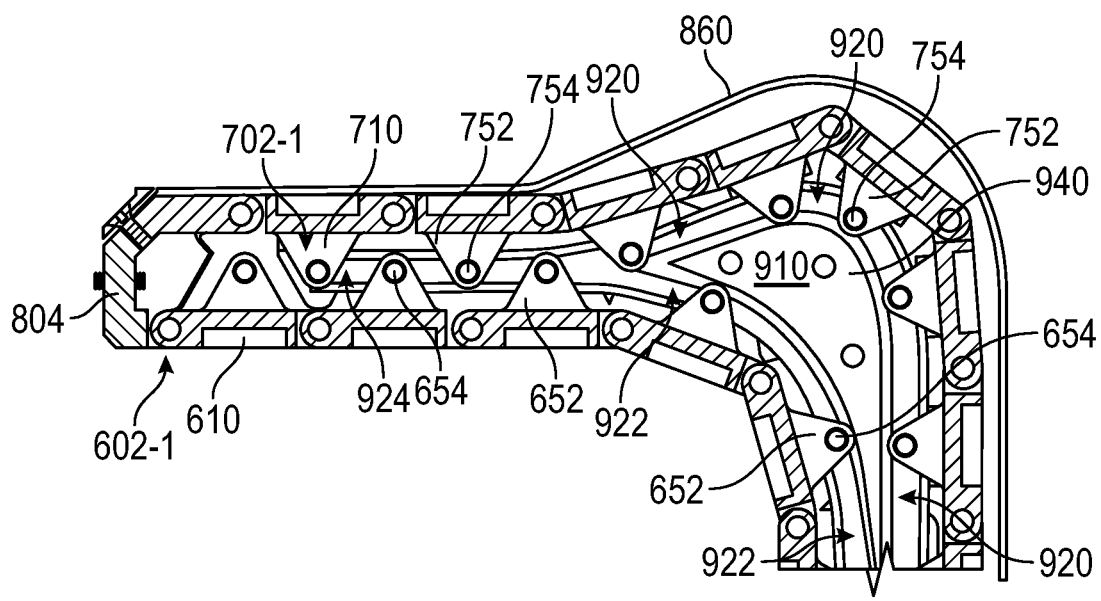

Each guide track 910 is also shaped, sized, arranged, and configured to transition the upper assembly protrusion structures 744 and the lower assembly protrusion structures 644 from a decoupled state to a coupled state in response to concerted movement of the chain assemblies along the deployment path defined by the guide track 910. Likewise, each guide track 910 is shaped, sized, arranged, and configured to transition the upper assembly protrusion structures 744 and the lower assembly protrusion structures 644 from the coupled state to the decoupled state in response to concerted movement of the chain assemblies along the stowage path defined by the guide track 910. FIGS. 78 and 79 depict the coupling/decoupling actions that result from such concerted movements.

Each guide track 910 of the illustrated embodiment includes various structural features that hold and guide the lower and upper assemblies 602, 702 as they move along the guide track 910. Depending on the particular embodiment, the guide track 910 may include any of the following structural features, without limitation and in any desired combination: one or more channels, one or more flanges, one or more rails, one or more tracks, one or more tunnels, one or more slots, one or more keys/keyways, one or more protrusions, one or more ribs, one or more grooves, or the like.

Although not always required, the depicted embodiment of the guide track 910 includes a first keyway slot 920 formed therein, a second keyway slot 922 formed therein, and a third keyway slot 924 formed therein. As depicted in the cross-sectional view of FIG. 75, the first and second keyway slots 920, 922 merge at an intersection 926 that is continuous with the third keyway slot 924. Thus, the third keyway slot 924 transitions and splits into the first and second keyway slots 920, 922. The guide track 910 also includes an upper slit 928 and a lower slit 930. The upper slit 928 provides an opening for immediate access to the first keyway slot 920, and for immediate access to the third keyway slot 924 (from above). The lower slit 930 provides an opening for immediate access to the second keyway slot 922, and for immediate access to the third keyway slot 924 (from below).

The third keyway slot 924 receives the guide pins 654, 754 of the link components 610, 710; the upper and lower slits 928, 930 receive the upper and lower pin supports 752, 652 (see FIGS. 50 and 56). This arrangement allows the guide pins 654, 754 and the pin supports 652, 752 to travel in a constrained and predefined manner as defined by the third keyway slot 924. The first keyway slot 920 receives the guide pins 754 of the upper link components 710, and the upper slit 928 receives the pin supports 752 of the upper link components 710. This arrangement allows the guide pins 754 and the pin supports 752 to travel in a constrained and predefined manner as defined by the first keyway slot 920. The second keyway slot 922 receives the guide pins 654 of the lower link component 610, and the lower slit 930 receives the lower pin supports 652. This arrangement allows the guide pins 654 and the pin supports 652 to travel in a constrained and predefined manner as defined by the second keyway slot 922.

Notably, the guide pin 654 and/or the pin support 652 of the lower link component 610 represent a key arrangement that is configured to engage and slide within the keyway slot 922 when the lower chain assembly (the series of lower link components 610) is decoupled from the upper chain assembly (the series of upper link components 710). Likewise, the guide pin 754 and/or the pin support 752 of the upper link component 710 represent another key arrangement that is configured to engage and slide within the keyway slot 920 when the upper chain assembly is decoupled from the lower chain assembly. Both of these key arrangements engage and slide within the keyway slot 924 when the upper and lower chain assemblies are coupled together. See, for example, FIG. 78 and FIG. 79. In this way, the guide pins 654 cooperate with the keyway slot 922 to maintain at least a portion of the lower assemblies 602 on the guide track 910 in a stowed state. Similarly, the guide pins 754 cooperate with the keyway slot 920 to maintain at least a portion of the upper assemblies 702 on the guide track 910 in the stowed state.

Figure 73:
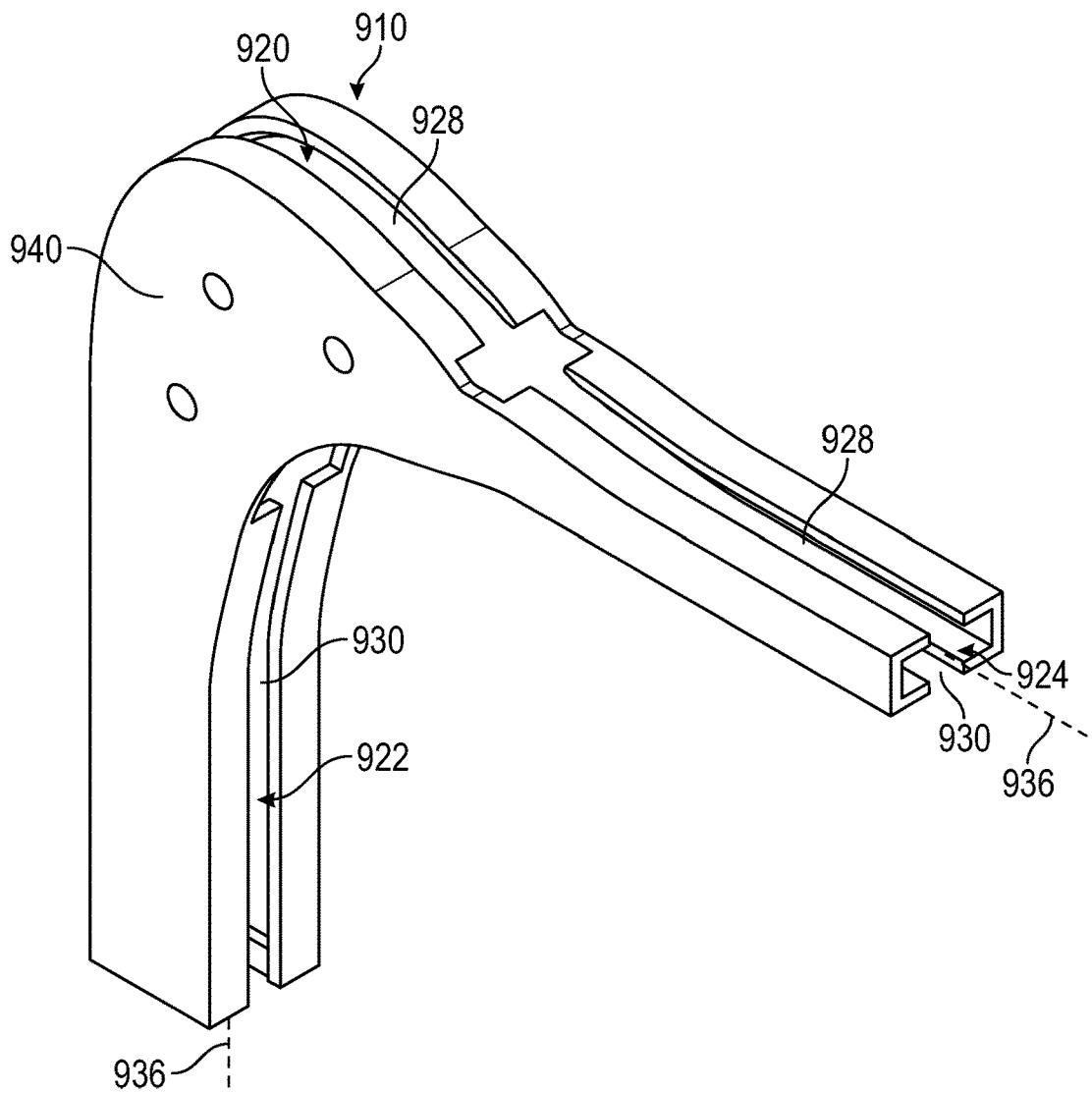
FIG. 73 is a perspective view of an exemplary embodiment of a guide track suitable for use with the load-bearing support structure shown in FIGS. 71 and 72.
Figure 74:
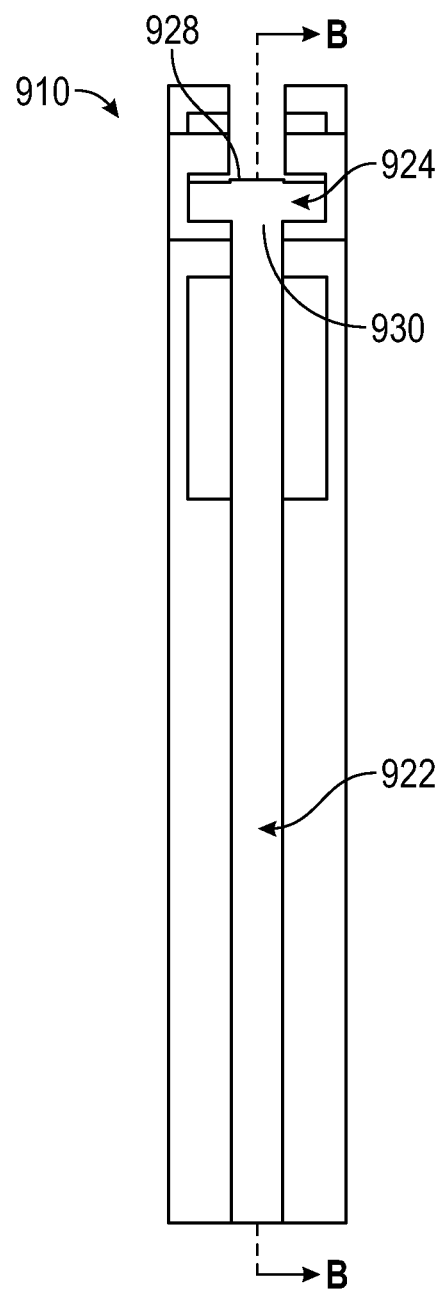
FIG. 74 is a front view of the guide track.
Figure 75:
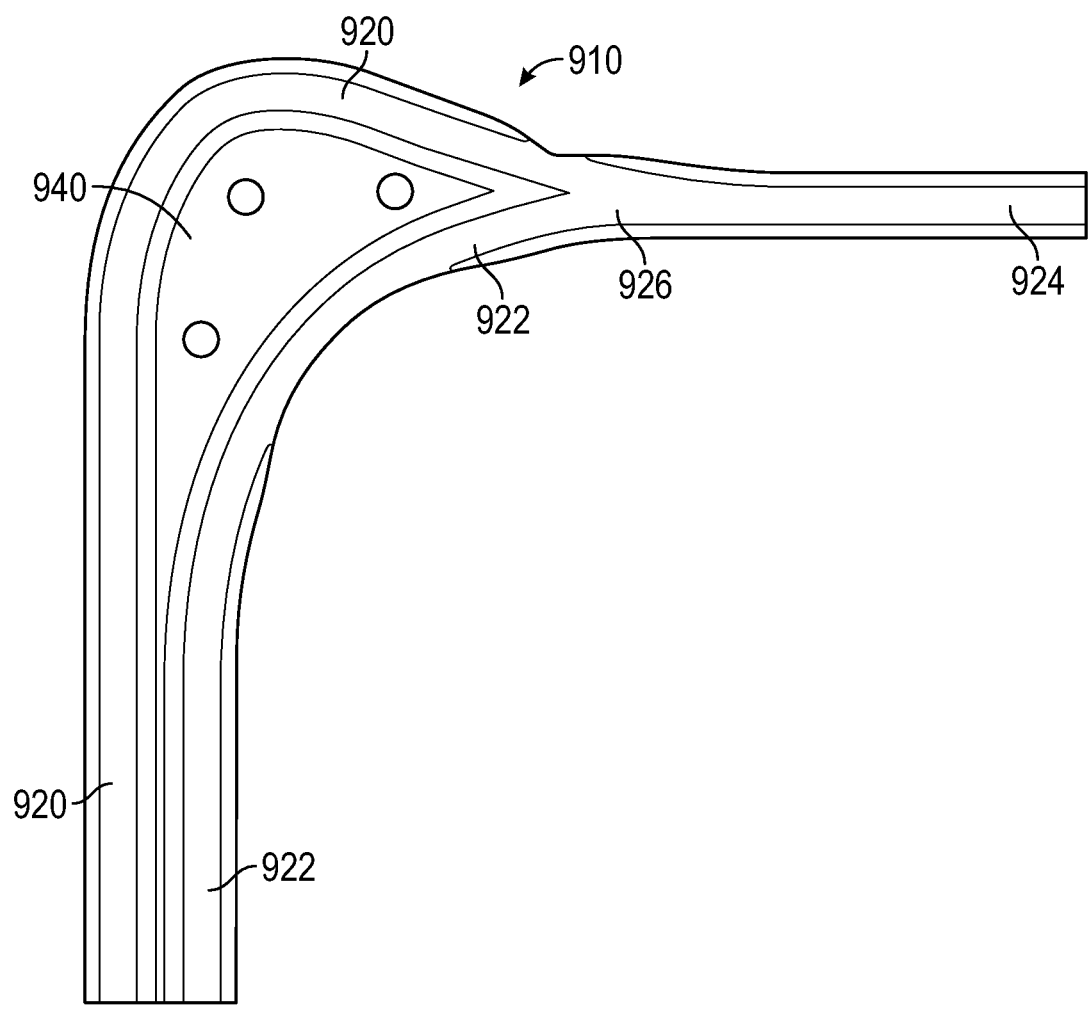
FIG. 75 is a cross-sectional view of the guide track, as viewed from line B-B in FIG. 74.

The guide track 910 has a major longitudinal axis 936 that is generally defined by a line centered within the interior space of the guide track 910 (see FIG. 73, which shows the longitudinal axis 936 entering and exiting the guide track 910). In certain exemplary embodiments, the guide track 910 employs a curved major longitudinal axis 936 that accommodates folded storage of the upper and lower chain assemblies when the protrusion structures 744, 644 are decoupled from each other and, therefore, folded storage of the corresponding lower and upper assemblies 602, 702. FIGS. 73-79 only show the transition region of the guide track 910, which has a curved shape. Although the guide tracks 910 are not depicted in FIG. 71, the curved shape of the retracted and stowed portion of the support mechanism 900 is clearly shown. For the implementation shown in FIG. 71, the guide tracks 910 are curved in an appropriate manner that forces the upper and lower assemblies 702, 602 to follow the curved paths as shown. In certain embodiments, the guide track arrangement, one or more of the individual guide tracks 910, and/or another guide or storage feature can be employed to receive, guide, and stow a portion of the flexible working surface component 860 when the support mechanism 900 is in the retracted state.

The guide track 910 includes a curved gooseneck region 940 that serves as a transition to couple/decouple the lower and upper assemblies 602, 702. For the depicted embodiment, the curved gooseneck region 940 accommodates a desired predefined humpback shape of the first keyway slot 902 (see FIG. 75), which is necessary to raise and lower the upper assemblies 702 relative to the lower assemblies 602 during concerted movement of the assemblies. Referring to FIGS. 76 and 77, the humpback shape of the first keyway slot 920 ensures that the upper link components 710 properly mate with the lower link components 610 at the appropriate location during deployment. The keyway slots 920, 922 can be brought closer together below the curved gooseneck region 940, while maintaining the desired separation between the lower and upper assemblies 602, 702 (see FIG. 75). The curved gooseneck region 940 enables the lower and upper assemblies 602, 702 to transition from the decoupled state to the coupled state (and vice versa) in response to concerted movement during deployment and stowage, as explained above with reference to FIGS. 76 and 77. The shape of the curved gooseneck region 940 and the variable spacing between the first and second keyway slots 920, 922 urge the lower and upper assemblies 602, 702 into the desired positions when they are moved in concert during extension and retraction.

As described above with reference to FIGS. 1 and 2, a load-bearing support structure that utilizes the support mechanism 900 may include a suitably configured storage unit that fully or partially surrounds the guide tracks 910. The storage unit can be shaped and sized to accommodate stowage of the morphable support mechanism 900 (including the chain assemblies, the upper and lower assemblies 702, 602, etc.) when in the stowed state. Moreover, the storage unit may include an opening defined or formed therein, wherein the opening is shaped and sized to accommodate passage of the morphable support mechanism 900 when the upper and lower assemblies 702, 602 are coupled together in the deployed state.

Supplemental or Optional Features

Various embodiments of the invention, including the first and second embodiments described above, may implement certain features, functionality, and/or structures as appropriate for the particular application or use case. A number of supplemental or optional features are described in this section.

Curved Support Surface—The first and second embodiments described above employ a relatively flat and straight support structure (once deployed). In this regard, the first and second embodiments are suitable for use as a table surface, a desk surface, a wall, a pocket door, an armrest, a seat tray, or the like. In accordance with alternative embodiments, the morphable support mechanism can be suitably configured to provide a curved or angled (non-flat, non-planar) support surface when deployed. To achieve a non-planar support surface, the upper and lower assemblies may be configured in an asymmetric manner. For example, the upper link components may be longer or shorter than the counterpart lower link components, resulting in a bent or curved arrangement after the upper and lower assemblies are coupled together.

Deployment Scheme—In accordance with certain implementations, the morphable support mechanism can be manually deployed into the desired position, and manually returned to its original stowed position. For example, the leading edge assembly may include a handle, a recess or hole that accommodates a user's hand or fingers, or tabs that can be used to pull/push the support mechanism as needed. In certain embodiments, movement of the support mechanism can be assisted (using, e.g., springs, a pneumatic mechanism, or the like). Alternatively or additionally, the support mechanism can be electronically controlled by way of a suitably configured motor system.

Locking Feature—The support mechanism is characterized by a fully stowed position and a fully deployed position. In certain embodiments, the support mechanism can also be placed into one or more intermediate positions between the fully stowed and fully deployed positions. Intermediate positions may be predefined (discrete lockable positions), or the support structure may be suitably configured such that the support mechanism can be continuously adjusted and locked into any position. To this end, the support structure may include one or more locking features or latching mechanisms to hold the support mechanism in place once deployed. For example, the support structure may include a manually actuated or electronically activated subsystem that physically limits travel of the upper and lower assemblies relative to their respective guide tracks, thus maintaining them in the desired deployed state.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A morphable support mechanism for a load-bearing support structure, the morphable support mechanism comprising:
    a first chain assembly comprising a plurality of first chain links hinged together in series, each of the first chain links comprising:
        first outward-facing structural features; and
        first inward-facing structural features opposing the first outward-facing structural features;
    a second chain assembly comprising a plurality of second chain links hinged together in series, each of the second chain links comprising second inward-facing structural features, wherein the first and second inward-facing structural features are configured to releasably couple together in response to concerted movement of the first and second chain assemblies along a predefined deployment path, and wherein the first and second inward-facing structural features are configured to separate and decouple from each other in response to concerted movement of the first and second chain assemblies along a predefined stowage path; and
    a plurality of working surface subcomponents respectively coupled to the plurality of first chain links, wherein a deployed number of the working surface subcomponents cooperate to form a deployable working surface, and wherein the first and second inward-facing structural features interlock to be self-supporting when deployed such that the deployable working surface is load-bearing.

2. The morphable support mechanism of claim 1, wherein:
    each of the working surface subcomponents comprises a slat having an inner side and an outer side opposing the inner side;
    the inner side comprises slat coupling features configured to mate and couple with at least some of the first outward-facing structural features of a respective first chain link; and
    the outer side defines a portion of the deployable working surface, such that outer sides of a deployed number of the slats cooperate to form the deployable working surface.

3. The morphable support mechanism of claim 2, wherein the slat comprises a layer of decorative material that defines the outer side.

4. The morphable support mechanism of claim 3, wherein the layer of decorative material comprises a wood veneer.

5. The morphable support mechanism of claim 1, wherein:
each of the first inward-facing structural features includes a hook structure that terminates with a hook protrusion extending in a first direction;
each of the second inward-facing structural features includes a finger structure that terminates with a finger protrusion extending in a second direction opposite the first direction; and
when in a deployed state, the hook protrusions mate and interlock with the finger protrusions.

6. The morphable support mechanism of claim 1, wherein:
the first chain assembly terminates with a final first chain link of the plurality of first chain links;
the second chain assembly terminates with a final second chain link of the plurality of second chain links; and
the morphable support mechanism further comprises a leading edge link coupled to the final first chain link and the final second chain link.

7. The morphable support mechanism of claim 6, further comprising:
a leading edge assembly coupled to the leading edge link and comprising decorative material that forms an exposed surface of the leading edge assembly.

8. The morphable support mechanism of claim 1, further comprising a number of decorative endcaps coupled to a respective number of the second chain links of the second chain assembly, wherein the decorative endcaps cooperate to provide an exposed sidewall surface when deployed.

9. The morphable support mechanism of claim 1, further comprising a guide track configured to receive the first and second chain assemblies, the guide track accommodating sliding movement of the first and second chain assemblies, and the guide track shaped and arranged to provide the predefined deployment and stowage paths for the first and second chain assemblies.

10. The morphable support mechanism of claim 9, wherein:
the guide track is shaped and arranged to transition the first and second inward-facing structural features from a decoupled state to a coupled state in response to concerted movement of the first and second chain assemblies along the predefined deployment path; and
the guide track is shaped and arranged to transition the first and second inward-facing structural features from the coupled state to the decoupled state in response to concerted movement of the first and second chain assemblies along the predefined stowage path.

11. The morphable support mechanism of claim 9, wherein at least a portion of the guide track has a curved major longitudinal axis to accommodate folded storage of the first and second chain assemblies with the first inward-facing structural features decoupled from the second inward-facing structural features.

12. A morphable support mechanism for a load-bearing support structure, the morphable support mechanism comprising:
a first chain assembly comprising a plurality of first chain links hinged together in series, each of the first chain links comprising:
first outward-facing structural features; and
first inward-facing structural features opposing the first outward-facing structural features; and
a second chain assembly comprising a plurality of second chain links hinged together in series, each of the second chain links comprising:
second outward-facing structural features; and
second inward-facing structural features opposing the second outward-facing structural features;
wherein the first and second inward-facing structural features are configured to releasably couple together in response to concerted movement of the first and second chain assemblies along a predefined deployment path;
wherein the first and second inward-facing structural features are configured to separate and decouple from each other in response to concerted movement of the first and second chain assemblies along a predefined stowage path; and
wherein the first and second inward-facing structural features interlock to be self-supporting when deployed, such that a deployed arrangement of the first and second chain assemblies is load-bearing.

13. The morphable support mechanism of claim 12, further comprising a guide track configured to receive the first and second chain assemblies, the guide track accommodating sliding movement of the first and second chain assemblies, and the guide track configured to provide the predefined deployment and stowage paths.

14. The morphable support mechanism of claim 13, wherein:
each of the first chain links comprises a first spring assembly to engage the guide track, and to maintain at least a portion of the first chain assembly on the guide track in a stowed state; and
each of the second chain links comprises a second spring assembly to engage the guide track, and to maintain at least a portion of the second chain assembly on the guide track in a stowed state.

15. The morphable support mechanism of claim 13, further comprising a storage unit at least partially surrounding the guide track, the storage unit shaped and sized to accommodate stowage of the first and second chain assemblies when in a stowed state.

16. The morphable support mechanism of claim 15, wherein the storage unit comprises an opening defined therein, the opening shaped and sized to accommodate passage of the first and second chain assemblies when coupled together in a deployed state.

17. The morphable support mechanism of claim 13, wherein at least a portion of the guide track has a curved major longitudinal axis to accommodate folded storage of the first and second chain assemblies with the first inward-facing structural features decoupled from the second inward-facing structural features.

18. The morphable support mechanism of claim 12, further comprising a number of working surface subcomponents coupled to a respective number of the first chain links, wherein a deployed number of the working surface subcomponents cooperate to form a load-bearing working surface.

19. A morphable load-bearing support structure comprising:
a plurality of upper assemblies hinged together in series, each comprising: an upper assembly leading edge section; an upper assembly leading hinge structure located at the upper assembly leading edge section; an upper assembly trailing edge section; an upper assembly trailing hinge structure located at the upper assembly trailing edge section; an outer surface that defines a portion of a deployable working surface; and upper assembly structural interlock features opposing the outer surface;

wherein the upper assembly leading hinge structure is configured to provide an upper assembly leading hinge axis of rotation, the upper assembly trailing hinge structure is configured to provide an upper assembly trailing hinge axis of rotation, and outer surfaces of a deployed number of the plurality of upper assemblies cooperate to form the deployable working surface;

a plurality of lower assemblies hinged together in series, each comprising: a lower assembly leading edge section; a lower assembly leading hinge structure located at the lower assembly leading edge section; a lower assembly trailing edge section; a lower assembly trailing hinge structure located at the lower assembly trailing edge section; and lower assembly structural interlock features;

wherein the lower assembly leading hinge structure is configured to provide a lower assembly leading hinge axis of rotation, and the lower assembly trailing hinge structure is configured to provide a lower assembly trailing hinge axis of rotation;

a guide track arrangement configured to receive the upper and lower assemblies, the guide track arrangement accommodating sliding movement of the upper and lower assemblies;

wherein the upper assembly structural interlock features and the lower assembly structural interlock features are configured to releasably couple together in response to concerted movement of the upper and lower assemblies along a deployment path defined by the guide track arrangement, and the upper and lower assemblies interlock to be self-supporting when deployed such that the deployable working surface is load-bearing; and wherein the upper assembly structural interlock features and the lower assembly structural interlock features are configured to separate and decouple from each other in response to concerted movement of the upper and lower assemblies along a stowage path defined by the guide track arrangement.

20. The morphable load-bearing support structure of claim 19, wherein:

the guide track arrangement is shaped and arranged to transition the upper assembly structural interlock features and the lower assembly structural interlock features from a decoupled state to a coupled state in response to concerted movement of the upper and lower assemblies along the deployment path;

the guide track arrangement is shaped and arranged to transition the upper assembly structural interlock features and the lower assembly structural interlock features from the coupled state to the decoupled state in response to concerted movement of the upper and lower assemblies along the stowage path; and at least a portion of the guide track arrangement has a curved major longitudinal axis to accommodate folded storage of the upper and lower assemblies with the upper assembly structural interlock features decoupled from the lower assembly structural interlock features.

21. The morphable load-bearing support structure of claim 19, wherein:

the plurality of upper assemblies terminates with a final upper assembly;

the plurality of lower assemblies terminates with a final lower assembly; and the morphable load-bearing support structure further comprises a leading edge assembly coupled to the final upper assembly and the final lower assembly.

22. The morphable load-bearing support structure of claim 19, each of the plurality of upper assemblies comprises a layer of decorative material that defines the outer surface of that upper assembly.

\* \* \* \* \*